United States Patent [19]

Suzuki et al.

[11] Patent Number: 5,276,634
[45] Date of Patent: Jan. 4, 1994

[54] FLOATING POINT DATA PROCESSING APPARATUS WHICH SIMULTANEOUSLY EFFECTS SUMMATION AND ROUNDING COMPUTATIONS

[75] Inventors: Masato Suzuki, Toyonaka; Mikako Yasutome, Moriguchi; Hideyo Tsuruta, Hirakata, all of Japan

[73] Assignee: Matsushita Electric Industrial Co., Ltd., Osaka, Japan

[21] Appl. No.: 748,191

[22] Filed: Aug. 20, 1991

[30] Foreign Application Priority Data

Aug. 24, 1990 [JP] Japan .................. 2-222763
Oct. 30, 1990 [JP] Japan .................. 2-293836

[51] Int. Cl.$^5$ .............................................. G06F 7/38
[52] U.S. Cl. ........................................ 364/748; 364/745
[58] Field of Search ......................... 364/748, 745

[56] References Cited

U.S. PATENT DOCUMENTS

| | | | |
|---|---|---|---|
| 4,839,846 | 6/1989 | Hirose et al. | 364/748 |
| 4,926,370 | 5/1990 | Brown et al. | 364/748 |
| 4,975,868 | 12/1990 | Freerksen | 364/748 |
| 5,038,313 | 8/1991 | Kojima | 364/748 |
| 5,040,138 | 8/1991 | Maher, III | 364/748 |
| 5,063,530 | 11/1991 | Ishikawa | 364/748 |
| 5,111,421 | 5/1992 | Molnar et al. | 364/748 |

OTHER PUBLICATIONS

"Analysis of Rounding Methods in Floating-Point Arithmetic", D. Kuck et al., IEEE Transactions on Computers, vol. C-26, No. 7, Jul. 1977 New York, U.S. pp. 643-650.

"An 80 MFLOPS Floating-Point Engine in the Intel 1860(TM) Processor", H. Sit et al., Proceedings of the 1989 IEEE International Conference on Computer Design: VLSI in Computers & Processors (ICDD '89), Oct. 2-4, 1989, IEEE, New York, pp. 374-379.

"A Chip Set for a High-Speed Low-Cost Floating-Point Unit", J. Gosling et al., Proceedings of the 5th Symposium on Computer Arithmetic, May 18-19, 1981, IEEE, New York, pp. 50-55.

Primary Examiner—David H. Malzahn
Attorney, Agent, or Firm—Wenderoth, Lind & Ponack

[57] ABSTRACT

A data processing apparatus and method for floating point data used in a central processing unit for a digital computer effects the four fundamental arithmetic computations of floating point data and the rounding and normalizing computations. In the case of the floating point addition or subtraction, the mantissa portion of the two floating point data and a generated round addition value are summed using a single adder and, in the case of multiplication, a sum output and a carry output of a multiplying unit and a generated round addition value are added using a single adder, so as to correct the least significant bit of the output of the adder or the round addition value is again added. Since the need of effecting readdition for rounding is small, the average processing step numbers becomes small in comparison with the conventional techniques, and, since the mantissa operation and rounding are effected using the same adder at the same time, less hardware is required.

25 Claims, 40 Drawing Sheets

FIG. 3(a)

| | REAL VALUE | VALUE OF ADDING 1 TO $2^{-24}$ | VALUE AFTER REAL ROUNDING | RE-ROUND SIGNAL | CORRECTION SIGNAL |
|---|---|---|---|---|---|
| $2^1$ | $2^{-22}$ $2^{-23}$ $2^{-24}$ S | C $2^{-22}$ $2^{-23}$ $2^{-24}$ S | C $2^{-22}$ $2^{-23}$ | | |
| 0<br>1 | 0 0 0 0 | 0 0 0 1 0 | 0 0 0<br>0 0 | 0<br>0 | 0 0<br>0 0 |
| 0<br>1 | 0 0 0 1 | 0 0 0 1 1 | 0 0 0<br>0 0 | 0<br>0 | 0 0<br>0 0 |
| 0<br>1 | 0 0 1 0 | 0 0 1 0 0 | 0 0 0<br>0 0 | 0<br>0 | 0 1<br>0 0 |
| 0<br>1 | 0 0 1 1 | 0 0 1 0 1 | 0 0 1<br>0 0 | 0<br>0 | 0 0<br>0 0 |
| 0<br>1 | 0 1 0 0 | 0 0 1 1 0 | 0 0 1<br>0 0 | 0<br>0 | 0 0<br>0 0 |
| 0<br>1 | 0 1 0 1 | 0 0 1 1 1 | 0 0 1<br>0 1 | 0<br>0 | 0 0<br>0 1 |
| 0<br>1 | 0 1 1 0 | 0 1 0 0 0 | 0 1 0<br>0 1 | 0<br>0 | 0 0<br>0 0 |
| 0<br>1 | 0 1 1 1 | 0 1 0 0 1 | 0 1 0<br>0 1 | 0<br>0 | 0 0<br>0 0 |
| 0<br>1 | 1 0 0 0 | 0 1 0 1 0 | 0 1 0<br>0 1 | 0<br>0 | 0 0<br>0 0 |
| 0<br>1 | 1 0 0 1 | 0 1 0 1 1 | 0 1 0<br>0 1 | 0<br>0 | 0 0<br>0 0 |
| 0<br>1 | 1 0 1 0 | 0 1 1 0 0 | 0 1 0<br>0 1 | 0<br>0 | 0 1<br>0 0 |
| 0<br>1 | 1 0 1 1 | 0 1 1 0 1 | 0 1 1<br>0 1 | 0<br>0 | 0 0<br>0 0 |
| 0<br>1 | 1 1 0 0 | 0 1 1 1 0 | 0 1 1<br>1 0 | 0<br>1 | 0 0<br>0 0 |
| 0<br>1 | 1 1 0 1 | 0 1 1 1 1 | 0 1 1<br>1 0 | 0<br>1 | 0 0<br>0 0 |
| 0<br>1 | 1 1 1 0 | 1 0 0 0 0 | 1 0 0<br>1 0 | 0<br>0 | 0 0<br>0 0 |
| 0<br>1 | 1 1 1 1 | 1 0 0 0 1 | 1 0 0<br>1 0 | 0<br>0 | 0 0<br>0 0 |

C --- CARRY TO $2^{-21}$
S --- STICKY BIT

FIG. 3(b)

| | REAL VALUE | VALUE OF ADDING 1 TO $2^{-53}$ | VALUE AFTER REAL ROUNDING | RE-ROUND SIGNAL | CORRECTION SIGNAL |
|---|---|---|---|---|---|
| $2^1$ | $2^{-51}\ 2^{-52}\ 2^{-53}\ S$ | $C\ 2^{-51}\ 2^{-52}\ 2^{-53}\ S$ | $C\ 2^{-51}\ 2^{-52}$ | | |
| 0 / 1 | 0 0 0 0 | 0 0 0 1  0 | 0 0 0 / 0 0 | 0 / 0 | 0 0 / 0 0 |
| 0 / 1 | 0 0 0 1 | 0 0 0 1  1 | 0 0 0 / 0 0 | 0 / 0 | 0 0 / 0 0 |
| 0 / 1 | 0 0 1 0 | 0 0 1 0  0 | 0 0 0 / 0 0 | 0 / 0 | 0 1 / 0 0 |
| 0 / 1 | 0 0 1 1 | 0 0 1 0  1 | 0 0 1 / 0 0 | 0 / 0 | 0 0 / 0 0 |
| 0 / 1 | 0 1 0 0 | 0 0 1 1  0 | 0 0 1 / 0 0 | 0 / 0 | 0 0 / 0 0 |
| 0 / 1 | 0 1 0 1 | 0 0 1 1  1 | 0 0 1 / 0 1 | 0 / 0 | 0 0 / 0 1 |
| 0 / 1 | 0 1 1 0 | 0 1 0 0  0 | 0 1 0 / 0 1 | 0 / 0 | 0 0 / 0 0 |
| 0 / 1 | 0 1 1 1 | 0 1 0 0  1 | 0 1 0 / 0 1 | 0 / 0 | 0 0 / 0 1 |
| 0 / 1 | 1 0 0 0 | 0 1 0 1  0 | 0 1 0 / 0 1 | 0 / 0 | 0 0 / 0 0 |
| 0 / 1 | 1 0 0 1 | 0 1 0 1  1 | 0 1 0 / 0 1 | 0 / 0 | 0 0 / 0 0 |
| 0 / 1 | 1 0 1 0 | 0 1 1 0  0 | 0 1 0 / 0 1 | 0 / 0 | 0 1 / 0 0 |
| 0 / 1 | 1 0 1 1 | 0 1 1 0  1 | 0 1 1 / 0 1 | 0 / 0 | 0 0 / 0 0 |
| 0 / 1 | 1 1 0 0 | 0 1 1 1  0 | 0 1 1 / 1 0 | 0 / 1 | 0 0 / 0 0 |
| 0 / 1 | 1 1 0 1 | 0 1 1 1  1 | 0 1 1 / 1 0 | 0 / 1 | 0 0 / 0 0 |
| 0 / 1 | 1 1 1 0 | 1 0 0 0  0 | 1 0 0 / 1 0 | 0 / 0 | 0 0 / 0 0 |
| 0 / 1 | 1 1 1 1 | 1 0 0 0  1 | 1 0 0 / 1 0 | 0 / 0 | 0 0 / 0 0 |

C --- CARRY TO $2^{-50}$
S --- STICKY BIT

FIG. 3(c)

| | REAL VALUE | VALUE OF ADDING 1 TO $2^{-25}$ | VALUE AFTER REAL ROUNDING | RE-ROUND SIGNAL | CORRECTION SIGNAL |
|---|---|---|---|---|---|
| $2^0$ | $2^{-23}$ $2^{-24}$ $2^{-25}$ S | C $2^{-23}$ $2^{-24}$ $2^{-25}$ S | C $2^{-23}$ $2^{-24}$ | | |
| 0<br>1 | 0 0 0 0 | 0 0 0 1 \| 0 | 0 0 0<br>0 0 | 0<br>0 | 0 0<br>0 0 |
| 0<br>1 | 0 0 0 1 | 0 0 0 1 \| 1 | 0 0 0<br>0 0 | 0<br>0 | 0 0<br>0 0 |
| 0<br>1 | 0 0 1 0 | 0 0 1 0 \| 0 | 0 0 0<br>0 0 | 0<br>0 | 0 1<br>0 0 |
| 0<br>1 | 0 0 1 1 | 0 0 1 0 \| 1 | 0 0 1<br>0 0 | 0<br>0 | 0 0<br>0 0 |
| 0<br>1 | 0 1 0 0 | 0 0 1 1 \| 0 | 0 0 1<br>0 0 | 0<br>0 | 0 0<br>0 0 |
| 0<br>1 | 0 1 0 1 | 0 0 1 1 \| 1 | 0 0 1<br>0 1 | 0<br>0 | 0 0<br>0 1 |
| 0<br>1 | 0 1 1 0 | 0 1 0 0 \| 0 | 0 1 0<br>0 1 | 0<br>0 | 0 0<br>0 0 |
| 0<br>1 | 0 1 1 1 | 0 1 0 0 \| 1 | 0 1 0<br>0 1 | 0<br>0 | 0 0<br>0 0 |
| 0<br>1 | 1 0 0 0 | 0 1 0 1 \| 0 | 0 1 0<br>0 1 | 0<br>0 | 0 0<br>0 0 |
| 0<br>1 | 1 0 0 1 | 0 1 0 1 \| 1 | 0 1 0<br>0 1 | 0<br>0 | 0 0<br>0 0 |
| 0<br>1 | 1 0 1 0 | 0 1 1 0 \| 0 | 0 1 0<br>0 1 | 0<br>0 | 0 1<br>0 0 |
| 0<br>1 | 1 0 1 1 | 0 1 1 0 \| 1 | 0 1 1<br>0 1 | 0<br>0 | 0 0<br>0 0 |
| 0<br>1 | 1 1 0 0 | 0 1 1 1 \| 0 | 0 1 1<br>1 0 | 0<br>1 | 0 0<br>0 0 |
| 0<br>1 | 1 1 0 1 | 0 1 1 1 \| 1 | 0 1 1<br>1 0 | 0<br>1 | 0 0<br>0 0 |
| 0<br>1 | 1 1 1 0 | 1 0 0 0 \| 0 | 1 0 0<br>1 0 | 0<br>0 | 0 0<br>0 0 |
| 0<br>1 | 1 1 1 1 | 1 0 0 0 \| 1 | 1 0 0<br>1 0 | 0<br>0 | 0 0<br>0 0 |

C --- CARRY TO $2^{-22}$
S --- STICKY BIT

FIG. 3(d)

| | REAL VALUE | VALUE OF ADDING 1 TO $2^{-54}$ | VALUE AFTER REAL ROUNDING | RE-ROUND SIGNAL | CORRECTION SIGNAL |
|---|---|---|---|---|---|
| $2^0$ | $2^{-52}\ 2^{-53}\ 2^{-54}\ S$ | $C\ 2^{-52}\ 2^{-53}\ 2^{-54}\ S$ | $C\ 2^{-52}\ 2^{-53}$ | | |
| 0<br>1 | 0 0 0 0 | 0 0 0 1 \| 0 | 0 0 0<br>0 0 | 0<br>0 | 0 0<br>0 0 |
| 0<br>1 | 0 0 0 1 | 0 0 0 1 \| 1 | 0 0 0<br>0 0 | 0<br>0 | 0 0<br>0 0 |
| 0<br>1 | 0 0 1 0 | 0 0 1 0 \| 0 | 0 0 0<br>0 0 | 0<br>0 | 0 1<br>0 0 |
| 0<br>1 | 0 0 1 1 | 0 0 1 0 \| 1 | 0 0 1<br>0 0 | 0<br>0 | 0 0<br>0 0 |
| 0<br>1 | 0 1 0 0 | 0 0 1 1 \| 0 | 0 0 1<br>0 0 | 0<br>0 | 0 0<br>0 0 |
| 0<br>1 | 0 1 0 1 | 0 0 1 1 \| 1 | 0 0 1<br>0 1 | 0<br>0 | 0 0<br>0 1 |
| 0<br>1 | 0 1 1 0 | 0 1 0 0 \| 0 | 0 1 0<br>0 1 | 0<br>0 | 0 0<br>0 0 |
| 0<br>1 | 0 1 1 1 | 0 1 0 0 \| 1 | 0 1 0<br>0 1 | 0<br>0 | 0 0<br>0 0 |
| 0<br>1 | 1 0 0 0 | 0 1 0 1 \| 0 | 0 1 0<br>0 1 | 0<br>0 | 0 0<br>0 0 |
| 0<br>1 | 1 0 0 1 | 0 1 0 1 \| 1 | 0 1 0<br>0 1 | 0<br>0 | 0 0<br>0 0 |
| 0<br>1 | 1 0 1 0 | 0 1 1 0 \| 0 | 0 1 0<br>0 1 | 0<br>0 | 0 1<br>0 0 |
| 0<br>1 | 1 0 1 1 | 0 1 1 0 \| 1 | 0 1 1<br>0 1 | 0<br>0 | 0 0<br>0 0 |
| 0<br>1 | 1 1 0 0 | 0 1 1 1 \| 0 | 0 1 1<br>1 0 | 0<br>1 | 0 0<br>0 0 |
| 0<br>1 | 1 1 0 1 | 0 1 1 1 \| 1 | 0 1 1<br>1 0 | 0<br>1 | 0 0<br>0 0 |
| 0<br>1 | 1 1 1 0 | 1 0 0 0 \| 0 | 1 0 0<br>1 0 | 0<br>0 | 0 0<br>0 0 |
| 0<br>1 | 1 1 1 1 | 1 0 0 0 \| 1 | 1 0 0<br>1 0 | 0<br>0 | 0 0<br>0 0 |

C --- CARRY TO $2^{-51}$
S --- STICKY BIT

FIG. 4(a)

| | REAL VALUE | VALUE OF ADDING 1 TO $2^{-24}$ | VALUE AFTER REAL ROUNDING | RE-ROUND SIGNAL | CORRECTION SIGNAL |
|---|---|---|---|---|---|
| $2^1$ | $2^{-22}$ $2^{-23}$ $2^{-24}$ S | C $2^{-22}$ $2^{-23}$ $2^{-24}$ S | C $2^{-22}$ $2^{-23}$ | | |
| 0<br>1 | 0 0 0 0 | 0 0 0 1  0 | 0 0 0<br>0 0 0 | 0<br>0 | 0 0<br>0 0 |
| 0<br>1 | 0 0 0 1 | 0 0 0 1  1 | 0 0 1<br>0 1 | 0<br>0 | 0 1<br>0 1 |
| 0<br>1 | 0 0 1 0 | 0 0 1 0  0 | 0 0 1<br>0 1 | 0<br>0 | 0 0<br>0 1 |
| 0<br>1 | 0 0 1 1 | 0 0 1 0  1 | 0 0 1<br>0 1 | 0<br>0 | 0 1<br>0 1 |
| 0<br>1 | 0 1 0 0 | 0 0 1 1  0 | 0 0 1<br>0 1 | 0<br>0 | 0 0<br>0 1 |
| 0<br>1 | 0 1 0 1 | 0 0 1 1  1 | 0 1 0<br>0 1 | 0<br>0 | 1 0<br>0 1 |
| 0<br>1 | 0 1 1 0 | 0 1 0 0  0 | 0 1 0<br>0 1 | 0<br>0 | 0 0<br>0 0 |
| 0<br>1 | 0 1 1 1 | 0 1 0 0  1 | 0 1 0<br>0 1 | 0<br>0 | 0 0<br>0 0 |
| 0<br>1 | 1 0 0 0 | 0 1 0 1  0 | 0 1 0<br>0 1 | 0<br>0 | 0 0<br>0 0 |
| 0<br>1 | 1 0 0 1 | 0 1 0 1  1 | 0 1 1<br>1 0 | 0<br>1 | 0 1<br>0 1 |
| 0<br>1 | 1 0 1 0 | 0 1 1 0  0 | 0 1 1<br>1 0 | 0<br>1 | 0 0<br>0 0 |
| 0<br>1 | 1 0 1 1 | 0 1 1 0  1 | 0 1 1<br>1 0 | 0<br>1 | 0 0<br>0 0 |
| 0<br>1 | 1 1 0 0 | 0 1 1 1  0 | 0 1 1<br>1 0 | 0<br>1 | 0 0<br>0 0 |
| 0<br>1 | 1 1 0 1 | 0 1 1 1  1 | 1 0 0<br>1 0 | 1<br>1 | 0 0<br>0 0 |
| 0<br>1 | 1 1 1 0 | 1 0 0 0  0 | 1 0 0<br>1 0 | 0<br>0 | 0 0<br>0 0 |
| 0<br>1 | 1 1 1 1 | 1 0 0 0  1 | 1 0 0<br>1 0 | 0<br>0 | 0 0<br>0 0 |

C --- CARRY TO $2^{-21}$
S --- STICKY BIT

FIG. 4(b)

| REAL VALUE | | | | | VALUE OF ADDING 1 TO $2^{-53}$ | | | | | VALUE AFTER REAL ROUNDING | | | RE-ROUND SIGNAL | CORRECTION SIGNAL | |
|---|---|---|---|---|---|---|---|---|---|---|---|---|---|---|---|
| $2^1$ | $2^{-51}$ | $2^{-52}$ | $2^{-53}$ | S | C | $2^{-51}$ | $2^{-52}$ | $2^{-53}$ | S | C | $2^{-51}$ | $2^{-52}$ | | | |
| 0 | 0 | 0 | 0 | 0 | 0 | 0 | 0 | 1 | 0 | 0 | 0 | 0 | 0 | 0 | 0 |
| 1 | | | | | | | | | | 0 | 0 | | 0 | 0 | 0 |
| 0 | 0 | 0 | 0 | 1 | 0 | 0 | 0 | 1 | 1 | 0 | 0 | 1 | 0 | 0 | 1 |
| 1 | | | | | | | | | | 0 | 1 | | 0 | 0 | 1 |
| 0 | 0 | 0 | 1 | 0 | 0 | 0 | 1 | 0 | 0 | 0 | 0 | 1 | 0 | 0 | 0 |
| 1 | | | | | | | | | | 0 | 1 | | 0 | 0 | 1 |
| 0 | 0 | 0 | 1 | 1 | 0 | 0 | 1 | 0 | 1 | 0 | 0 | 1 | 0 | 0 | 0 |
| 1 | | | | | | | | | | 0 | 1 | | 0 | 0 | 1 |
| 0 | 0 | 1 | 0 | 0 | 0 | 0 | 1 | 1 | 0 | 0 | 0 | 1 | 0 | 0 | 0 |
| 1 | | | | | | | | | | 0 | 1 | | 0 | 0 | 1 |
| 0 | 0 | 1 | 0 | 1 | 0 | 0 | 1 | 1 | 1 | 0 | 1 | 0 | 0 | 1 | 0 |
| 1 | | | | | | | | | | 0 | 1 | | 0 | 0 | 1 |
| 0 | 0 | 1 | 1 | 0 | 0 | 1 | 0 | 0 | 0 | 0 | 1 | 0 | 0 | 0 | 0 |
| 1 | | | | | | | | | | 0 | 1 | | 0 | 0 | 0 |
| 0 | 0 | 1 | 1 | 1 | 0 | 1 | 0 | 0 | 1 | 0 | 1 | 0 | 0 | 0 | 0 |
| 1 | | | | | | | | | | 0 | 1 | | 0 | 0 | 0 |
| 0 | 1 | 0 | 0 | 0 | 0 | 1 | 0 | 1 | 0 | 0 | 1 | 0 | 0 | 0 | 0 |
| 1 | | | | | | | | | | 0 | 1 | | 0 | 0 | 0 |
| 0 | 1 | 0 | 0 | 1 | 0 | 1 | 0 | 1 | 1 | 0 | 1 | 1 | 0 | 0 | 1 |
| 1 | | | | | | | | | | 1 | 0 | | 1 | 0 | 1 |
| 0 | 1 | 0 | 1 | 0 | 0 | 1 | 1 | 0 | 0 | 0 | 1 | 1 | 0 | 0 | 0 |
| 1 | | | | | | | | | | 1 | 0 | | 1 | 0 | 0 |
| 0 | 1 | 0 | 1 | 1 | 0 | 1 | 1 | 0 | 1 | 0 | 1 | 1 | 0 | 0 | 0 |
| 1 | | | | | | | | | | 1 | 0 | | 1 | 0 | 0 |
| 0 | 1 | 1 | 0 | 0 | 0 | 1 | 1 | 1 | 0 | 0 | 1 | 1 | 0 | 0 | 0 |
| 1 | | | | | | | | | | 1 | 0 | | 1 | 0 | 0 |
| 0 | 1 | 1 | 0 | 1 | 0 | 1 | 1 | 1 | 1 | 1 | 0 | 0 | 1 | 0 | 0 |
| 1 | | | | | | | | | | 1 | 0 | | 1 | 0 | 0 |
| 0 | 1 | 1 | 1 | 0 | 1 | 0 | 0 | 0 | 0 | 1 | 0 | 0 | 0 | 0 | 0 |
| 1 | | | | | | | | | | 1 | 0 | | 0 | 0 | 0 |
| 0 | 1 | 1 | 1 | 1 | 1 | 0 | 0 | 0 | 1 | 1 | 0 | 0 | 0 | 0 | 0 |
| 1 | | | | | | | | | | 1 | 0 | | 0 | 0 | 0 |

C --- CARRY TO $2^{-50}$
S --- STICKY BIT

FIG. 4(c)

| | REAL VALUE | VALUE OF ADDING 1 TO $2^{-25}$ | | VALUE AFTER REAL ROUNDING | RE-ROUND SIGNAL | CORRECTION SIGNAL |
|---|---|---|---|---|---|---|
| $2^0$ | $2^{-23}\ 2^{-24}\ 2^{-25}\ S$ | $C\ 2^{-23}\ 2^{-24}\ 2^{-25}$ | $S$ | $C\ 2^{-23}\ 2^{-24}$ | | |
| 0<br>1 | 0 0 0 0 | 0 0 0 1 | 0 | 0 0 0<br>0 0 | 0<br>0 | 0 0<br>0 0 |
| 0<br>1 | 0 0 0 1 | 0 0 0 1 | 1 | 0 0 1<br>0 1 | 0<br>0 | 0 1<br>0 1 |
| 0<br>1 | 0 0 1 0 | 0 0 1 0 | 0 | 0 0 1<br>0 1 | 0<br>0 | 0 0<br>0 1 |
| 0<br>1 | 0 0 1 1 | 0 0 1 0 | 1 | 0 0 1<br>0 1 | 0<br>0 | 0 0<br>0 1 |
| 0<br>1 | 0 1 0 0 | 0 0 1 1 | 0 | 0 0 1<br>0 1 | 0<br>0 | 0 0<br>0 1 |
| 0<br>1 | 0 1 0 1 | 0 0 1 1 | 1 | 0 1 0<br>0 1 | 0<br>0 | 1 0<br>0 1 |
| 0<br>1 | 0 1 1 0 | 0 1 0 0 | 0 | 0 1 0<br>0 1 | 0<br>0 | 0 0<br>0 0 |
| 0<br>1 | 0 1 1 1 | 0 1 0 0 | 1 | 0 1 0<br>0 1 | 0<br>0 | 0 0<br>0 0 |
| 0<br>1 | 1 0 0 0 | 0 1 0 1 | 0 | 0 1 0<br>0 1 | 0<br>0 | 0 0<br>0 0 |
| 0<br>1 | 1 0 0 1 | 0 1 0 1 | 1 | 0 1 1<br>1 0 | 0<br>1 | 0 1<br>0 1 |
| 0<br>1 | 1 0 1 0 | 0 1 1 0 | 0 | 0 1 1<br>1 0 | 0<br>1 | 0 0<br>0 0 |
| 0<br>1 | 1 0 1 1 | 0 1 1 0 | 1 | 0 1 1<br>1 0 | 0<br>1 | 0 0<br>0 0 |
| 0<br>1 | 1 1 0 0 | 0 1 1 1 | 0 | 0 1 1<br>1 0 | 0<br>1 | 0 0<br>0 0 |
| 0<br>1 | 1 1 0 1 | 0 1 1 1 | 1 | 1 0 0<br>1 0 | 1<br>1 | 0 0<br>0 0 |
| 0<br>1 | 1 1 1 0 | 1 0 0 0 | 0 | 1 0 0<br>1 0 | 0<br>0 | 0 0<br>0 0 |
| 0<br>1 | 1 1 1 1 | 1 0 0 0 | 1 | 1 0 0<br>1 0 | 0<br>0 | 0 0<br>0 0 |

C --- CARRY TO $2^{-22}$
S --- STICKY BIT

FIG. 4(d)

| | REAL VALUE | | | | VALUE OF ADDING 1 TO $2^{-54}$ | | | | | VALUE AFTER REAL ROUNDING | | | RE-ROUND SIGNAL | CORRECTION SIGNAL | |
|---|---|---|---|---|---|---|---|---|---|---|---|---|---|---|---|
| $2^0$ | $2^{-52}$ | $2^{-53}$ | $2^{-54}$ | S | C | $2^{-52}$ | $2^{-53}$ | $2^{-54}$ | S | C | $2^{-52}$ | $2^{-53}$ | | | |
| 0 | 0 | 0 | 0 | 0 | | 0 | 0 | 0 | 1 | 0 | 0 | 0 | 0 | 0 | 0 |
| 1 | | | | | | | | | | | 0 | 0 | 0 | 0 | 0 |
| 0 | 0 | 0 | 0 | 1 | | 0 | 0 | 0 | 1 | 1 | 0 | 0 | 1 | 0 | 0 | 1 |
| 1 | | | | | | | | | | | 0 | 1 | 0 | 0 | 1 |
| 0 | 0 | 0 | 1 | 0 | | 0 | 0 | 1 | 0 | 0 | 0 | 0 | 1 | 0 | 0 | 0 |
| 1 | | | | | | | | | | | 0 | 1 | 0 | 0 | 1 |
| 0 | 0 | 0 | 1 | 1 | | 0 | 0 | 1 | 0 | 1 | 0 | 0 | 1 | 0 | 0 | 0 |
| 1 | | | | | | | | | | | 0 | 1 | 0 | 0 | 1 |
| 0 | 0 | 1 | 0 | 0 | | 0 | 0 | 1 | 1 | 0 | 0 | 0 | 1 | 0 | 0 | 0 |
| 1 | | | | | | | | | | | 0 | 1 | 0 | 0 | 1 |
| 0 | 0 | 1 | 0 | 1 | | 0 | 0 | 1 | 1 | 1 | 0 | 1 | 0 | 0 | 1 | 0 |
| 1 | | | | | | | | | | | 0 | 1 | 0 | 0 | 1 |
| 0 | 0 | 1 | 1 | 0 | | 0 | 1 | 0 | 0 | 0 | 0 | 1 | 0 | 0 | 0 | 0 |
| 1 | | | | | | | | | | | 0 | 1 | 0 | 0 | 0 |
| 0 | 0 | 1 | 1 | 1 | | 0 | 1 | 0 | 0 | 1 | 0 | 1 | 0 | 0 | 0 | 0 |
| 1 | | | | | | | | | | | 0 | 1 | 0 | 0 | 0 |
| 0 | 1 | 0 | 0 | 0 | | 0 | 1 | 0 | 1 | 0 | 0 | 1 | 0 | 0 | 0 | 0 |
| 1 | | | | | | | | | | | 0 | 1 | 0 | 0 | 0 |
| 0 | 1 | 0 | 0 | 1 | | 0 | 1 | 0 | 1 | 1 | 0 | 1 | 1 | 0 | 0 | 1 |
| 1 | | | | | | | | | | | 1 | 0 | 1 | 0 | 1 |
| 0 | 1 | 0 | 1 | 0 | | 0 | 1 | 1 | 0 | 0 | 0 | 1 | 1 | 0 | 0 | 0 |
| 1 | | | | | | | | | | | 1 | 0 | 1 | 0 | 0 |
| 0 | 1 | 0 | 1 | 1 | | 0 | 1 | 1 | 0 | 1 | 0 | 1 | 1 | 0 | 0 | 0 |
| 1 | | | | | | | | | | | 1 | 0 | 1 | 0 | 0 |
| 0 | 1 | 1 | 0 | 0 | | 0 | 1 | 1 | 1 | 0 | 0 | 1 | 1 | 0 | 0 | 0 |
| 1 | | | | | | | | | | | 1 | 0 | 1 | 0 | 0 |
| 0 | 1 | 1 | 0 | 1 | | 0 | 1 | 1 | 1 | 1 | 1 | 0 | 0 | 1 | 0 | 0 |
| 1 | | | | | | | | | | | 1 | 0 | 1 | 0 | 0 |
| 0 | 1 | 1 | 1 | 0 | | 1 | 0 | 0 | 0 | 0 | 1 | 0 | 0 | 0 | 0 | 0 |
| 1 | | | | | | | | | | | 1 | 0 | 0 | 0 | 0 |
| 0 | 1 | 1 | 1 | 1 | | 1 | 0 | 0 | 0 | 1 | 1 | 0 | 0 | 0 | 0 | 0 |
| 1 | | | | | | | | | | | 1 | 0 | 0 | 0 | 0 |

C --- CARRY TO $2^{-51}$
S --- STICKY BIT

FIG. 5(a)

| | REAL VALUE | VALUE OF ADDING 1 TO $2^{-23}$ | VALUE AFTER REAL ROUNDING | RE-ROUND SIGNAL | CORREC-TION SIGNAL |
|---|---|---|---|---|---|
| $2^1$ | $2^{-22}\ 2^{-23}\ 2^{-24}$ S | C $2^{-22}\ 2^{-23}\ 2^{-24}$ S | C $2^{-22}\ 2^{-23}$ | | |
| 0<br>1 | 0 0 0 0 | 0 0 1 0 \| 0 | 0 0 0<br>0 0 | 0<br>0 | 0 1<br>0 0 |
| 0<br>1 | 0 0 0 1 | 0 0 1 0 \| 1 | 0 0 1<br>0 1 | 0<br>0 | 0 0<br>0 1 |
| 0<br>1 | 0 0 1 0 | 0 0 1 1 \| 0 | 0 0 1<br>0 1 | 0<br>0 | 0 0<br>0 1 |
| 0<br>1 | 0 0 1 1 | 0 0 1 1 \| 1 | 0 0 1<br>0 1 | 0<br>0 | 0 0<br>0 1 |
| 0<br>1 | 0 1 0 0 | 0 0 1 0 \| 0 | 0 0 1<br>0 1 | 0<br>0 | 1 0<br>0 0 |
| 0<br>1 | 0 1 0 1 | 0 1 0 0 \| 1 | 0 1 0<br>0 1 | 0<br>0 | 0 0<br>0 0 |
| 0<br>1 | 0 1 1 0 | 0 1 0 1 \| 0 | 0 1 0<br>0 1 | 0<br>0 | 0 0<br>0 0 |
| 0<br>1 | 0 1 1 1 | 0 1 0 1 \| 1 | 0 1 0<br>0 1 | 0<br>0 | 0 0<br>0 0 |
| 0<br>1 | 1 0 0 0 | 0 1 1 0 \| 0 | 0 1 0<br>0 1 | 0<br>0 | 0 1<br>0 0 |
| 0<br>1 | 1 0 0 1 | 0 1 1 0 \| 1 | 0 1 1<br>1 0 | 0<br>1 | 0 0<br>0 0 |
| 0<br>1 | 1 0 1 0 | 0 1 1 1 \| 0 | 0 1 1<br>1 0 | 0<br>1 | 0 0<br>0 0 |
| 0<br>1 | 1 0 1 1 | 0 1 1 1 \| 1 | 0 1 1<br>1 0 | 0<br>1 | 0 0<br>0 0 |
| 0<br>1 | 1 1 0 0 | 1 0 0 0 \| 0 | 0 1 1<br>1 0 | 1<br>0 | 1 1<br>0 0 |
| 0<br>1 | 1 1 0 1 | 1 0 0 0 \| 1 | 1 0 0<br>1 0 | 0<br>0 | 0 0<br>0 0 |
| 0<br>1 | 1 1 1 0 | 1 0 0 1 \| 0 | 1 0 0<br>1 0 | 0<br>0 | 0 0<br>0 0 |
| 0<br>1 | 1 1 1 1 | 1 0 0 1 \| 1 | 1 0 0<br>1 0 | 0<br>0 | 0 0<br>0 0 |

C --- CARRY TO $2^{-21}$
S --- STICKY BIT

FIG. 5(b)

| REAL VALUE | | | | | VALUE OF ADDING 1 TO $2^{-52}$ | | | | | VALUE AFTER REAL ROUNDING | | | | RE-ROUND SIGNAL | CORREC-TION SIGNAL | |
|---|---|---|---|---|---|---|---|---|---|---|---|---|---|---|---|---|
| $2^1$ | $2^{-51}$ | $2^{-52}$ | $2^{-53}$ | S | C | $2^{-51}$ | $2^{-52}$ | $2^{-53}$ | S | C | $2^{-51}$ | $2^{-52}$ | | | | |
| 0 1 | 0 | 0 | 0 | 0 | | 0 | 0 | 1 | 0 | 0 | 0 | 0 0 | 0 | 0 | 0 1 0 0 | |
| 0 1 | 0 | 0 | 0 | 1 | | 0 | 0 | 1 | 0 | 1 | 0 0 | 0 1 | 1 | 0 0 | 0 0 0 1 | |
| 0 1 | 0 | 0 | 1 | 0 | | 0 | 0 | 1 | 1 | 0 | 0 0 | 0 1 | 1 | 0 0 | 0 0 0 1 | |
| 0 1 | 0 | 0 | 1 | 1 | | 0 | 0 | 1 | 1 | 1 | 0 0 | 0 1 | 1 | 0 0 | 0 0 0 1 | |
| 0 1 | 0 | 1 | 0 | 0 | | 0 | 0 | 1 | 0 | 0 | 0 0 | 0 1 | 1 | 0 0 | 1 0 0 0 | |
| 0 1 | 0 | 1 | 0 | 1 | | 0 | 1 | 0 | 0 | 1 | 0 0 | 1 | 0 | 0 0 | |
| 0 1 | 0 | 1 | 1 | 0 | | 0 | 1 | 0 | 1 | 0 | 0 0 | 1 | 0 | 0 0 | |
| 0 1 | 0 | 1 | 1 | 1 | | 0 | 1 | 0 | 1 | 1 | 0 0 | 1 | 0 | 0 0 | |
| 0 1 | 1 | 0 | 0 | 0 | | 0 | 1 | 1 | 0 | 0 | 0 0 | 1 0 | 0 | 0 1 0 0 | |
| 0 1 | 1 | 0 | 0 | 1 | | 0 | 1 | 1 | 0 | 1 | 0 1 | 1 0 | 0 1 | 0 0 | |
| 0 1 | 1 | 0 | 1 | 0 | | 0 | 1 | 1 | 1 | 0 | 0 1 | 1 0 | 0 1 | 0 0 | |
| 0 1 | 1 | 0 | 1 | 1 | | 0 | 1 | 1 | 1 | 1 | 0 1 | 1 0 | 0 1 | 0 0 | |
| 0 1 | 1 | 1 | 0 | 0 | | 1 | 0 | 0 | 0 | 0 | 0 1 | 1 0 | 1 0 | 1 1 0 0 | |
| 0 1 | 1 | 1 | 0 | 1 | | 1 | 0 | 0 | 0 | 1 | 1 0 | 1 0 | 0 | 0 0 | |
| 0 1 | 1 | 1 | 1 | 0 | | 1 | 0 | 0 | 1 | 0 | 1 0 | 1 0 | 0 | 0 0 | |
| 0 1 | 1 | 1 | 1 | 1 | | 1 | 0 | 0 | 1 | 1 | 1 0 | 1 0 | 0 | 0 0 | |

C --- CARRY TO $2^{-50}$
S --- STICKY BIT

FIG. 5(c)

| | REAL VALUE | VALUE OF ADDING 1 TO $2^{-24}$ | VALUE AFTER REAL ROUNDING | RE-ROUND SIGNAL | CORRECTION SIGNAL |
|---|---|---|---|---|---|
| $2^0$ | $2^{-23}$ $2^{-24}$ $2^{-25}$ S | C $2^{-23}$ $2^{-24}$ $2^{-25}$ S | C $2^{-23}$ $2^{-24}$ | | |
| 0<br>1 | 0 0 0 0 | 0 0 1 0 ¦ 0 | 0 0 0<br>0 0 | 0<br>0 | 0 1<br>0 0 |
| 0<br>1 | 0 0 0 1 | 0 0 1 0 ¦ 1 | 0 0 1<br>0 1 | 0<br>0 | 0 0<br>0 1 |
| 0<br>1 | 0 0 1 0 | 0 0 1 1 ¦ 0 | 0 0 1<br>0 1 | 0<br>0 | 0 0<br>0 1 |
| 0<br>1 | 0 0 1 1 | 0 0 1 1 ¦ 1 | 0 0 1<br>0 1 | 0<br>0 | 0 0<br>0 1 |
| 0<br>1 | 0 1 0 0 | 0 1 0 0 ¦ 0 | 0 0 1<br>0 1 | 0<br>0 | 1 0<br>0 0 |
| 0<br>1 | 0 1 0 1 | 0 1 0 0 ¦ 1 | 0 1 0<br>0 1 | 0<br>0 | 0 0<br>0 0 |
| 0<br>1 | 0 1 1 0 | 0 1 0 1 ¦ 0 | 0 1 0<br>0 1 | 0<br>0 | 0 0<br>0 0 |
| 0<br>1 | 0 1 1 1 | 0 1 0 1 ¦ 1 | 0 1 0<br>0 1 | 0<br>0 | 0 0<br>0 0 |
| 0<br>1 | 1 0 0 0 | 0 1 1 0 ¦ 0 | 0 1 0<br>0 1 | 0<br>0 | 0 1<br>0 0 |
| 0<br>1 | 1 0 0 1 | 0 1 1 0 ¦ 1 | 0 1 1<br>1 0 | 0<br>1 | 0 0<br>0 0 |
| 0<br>1 | 1 0 1 0 | 0 1 1 1 ¦ 0 | 0 1 1<br>1 0 | 0<br>1 | 0 0<br>0 0 |
| 0<br>1 | 1 0 1 1 | 0 1 1 1 ¦ 1 | 0 1 1<br>1 0 | 0<br>1 | 0 0<br>0 0 |
| 0<br>1 | 1 1 0 0 | 1 0 0 0 ¦ 0 | 0 1 1<br>1 0 | 1<br>0 | 1 1<br>0 0 |
| 0<br>1 | 1 1 0 1 | 1 0 0 0 ¦ 1 | 1 0 0<br>1 0 | 0<br>0 | 0 0<br>0 0 |
| 0<br>1 | 1 1 1 0 | 1 0 0 1 ¦ 0 | 1 0 0<br>1 0 | 0<br>0 | 0 0<br>0 0 |
| 0<br>1 | 1 1 1 1 | 1 0 0 1 ¦ 1 | 1 0 0<br>1 0 | 0<br>0 | 0 0<br>0 0 |

C --- CARRY TO $2^{-22}$
S --- STICKY BIT

FIG. 5(d)

| | REAL VALUE | VALUE OF ADDING 1 TO $2^{-53}$ | VALUE AFTER REAL ROUNDING | RE-ROUND SIGNAL | CORRECTION SIGNAL |
|---|---|---|---|---|---|
| $2^0$ | $2^{-52}\ 2^{-53}\ 2^{-54}$ S | C $2^{-52}\ 2^{-53}\ 2^{-54}$ S | C $2^{-52}\ 2^{-53}$ | | |
| 0<br>1 | 0 0 0 0 | 0 0 1 0 \| 0 | 0 0 0<br>0 0 | 0<br>0 | 0 1<br>0 0 |
| 0<br>1 | 0 0 0 1 | 0 0 1 0 \| 1 | 0 0 1<br>0 1 | 0<br>0 | 0 0<br>0 1 |
| 0<br>1 | 0 0 1 0 | 0 0 1 1 \| 0 | 0 0 1<br>0 1 | 0<br>0 | 0 0<br>0 1 |
| 0<br>1 | 0 0 1 1 | 0 0 1 1 \| 1 | 0 0 1<br>0 1 | 0<br>0 | 0 0<br>0 1 |
| 0<br>1 | 0 1 0 0 | 0 1 0 0 \| 0 | 0 0 1<br>0 1 | 0<br>0 | 1 0<br>0 0 |
| 0<br>1 | 0 1 0 1 | 0 1 0 0 \| 1 | 0 1 0<br>0 1 | 0<br>0 | 0 0<br>0 0 |
| 0<br>1 | 0 1 1 0 | 0 1 0 1 \| 0 | 0 1 0<br>0 1 | 0<br>0 | 0 0<br>0 0 |
| 0<br>1 | 0 1 1 1 | 0 1 0 1 \| 1 | 0 1 0<br>0 1 | 0<br>0 | 0 0<br>0 0 |
| 0<br>1 | 1 0 0 0 | 0 1 1 0 \| 0 | 0 1 0<br>0 1 | 0<br>0 | 0 1<br>0 0 |
| 0<br>1 | 1 0 0 1 | 0 1 1 0 \| 1 | 0 1 1<br>1 0 | 0<br>1 | 0 0<br>0 0 |
| 0<br>1 | 1 0 1 0 | 0 1 1 1 \| 0 | 0 1 1<br>1 0 | 0<br>1 | 0 0<br>0 0 |
| 0<br>1 | 1 0 1 1 | 0 1 1 1 \| 1 | 0 1 1<br>1 0 | 0<br>1 | 0 0<br>0 0 |
| 0<br>1 | 1 1 0 0 | 1 0 0 0 \| 0 | 0 1 1<br>1 0 | 1<br>0 | 1 1<br>0 0 |
| 0<br>1 | 1 1 0 1 | 1 0 0 0 \| 1 | 1 0 0<br>1 0 | 0<br>0 | 0 0<br>0 0 |
| 0<br>1 | 1 1 1 0 | 1 0 0 1 \| 0 | 1 0 0<br>1 0 | 0<br>0 | 0 0<br>0 0 |
| 0<br>1 | 1 1 1 1 | 1 0 0 1 \| 1 | 1 0 0<br>1 0 | 0<br>0 | 0 0<br>0 0 |

C --- CARRY TO $2^{-51}$
S --- STICKY BIT

FIG. 6(a)

| REAL VALUE | | VALUE OF ADDING 1 TO $2^{-24}$ AND S | | VALUE AFTER REAL ROUNDING | | RE-ROUND SIGNAL | CORREC-TION SIGNAL |
|---|---|---|---|---|---|---|---|
| $2^1$ | $2^{-22}$ $2^{-23}$ $2^{-24}$ S | C | $2^{-22}$ $2^{-23}$ $2^{-24}$ S | C | $2^{-22}$ $2^{-23}$ | | |
| 0<br>1 | 0  0  0  0 | 0  0  0  1 | 1 | 0  0  0<br>0  0 | | 0<br>0 | 0  0<br>0  0 |
| 0<br>1 | 0  0  0  1 | 0  0  1  0 | 0 | 0  0  1<br>0  1 | | 0<br>0 | 0  0<br>0  1 |
| 0<br>1 | 0  0  1  0 | 0  0  1  0 | 1 | 0  0  1<br>0  1 | | 0<br>0 | 0  0<br>0  1 |
| 0<br>1 | 0  0  1  1 | 0  0  1  1 | 0 | 0  0  1<br>0  1 | | 0<br>0 | 0  0<br>0  1 |
| 0<br>1 | 0  1  0  0 | 0  0  1  1 | 1 | 0  0  1<br>0  1 | | 0<br>0 | 0  0<br>0  1 |
| 0<br>1 | 0  1  0  1 | 0  1  0  0 | 0 | 0  1  0<br>0  1 | | 0<br>0 | 0  0<br>0  0 |
| 0<br>1 | 0  1  1  0 | 0  1  0  0 | 1 | 0  1  0<br>0  1 | | 0<br>0 | 0  0<br>0  0 |
| 0<br>1 | 0  1  1  1 | 0  1  0  1 | 0 | 0  1  0<br>0  1 | | 0<br>0 | 0  0<br>0  0 |
| 0<br>1 | 1  0  0  0 | 0  1  0  1 | 1 | 0  1  0<br>0  1 | | 0<br>0 | 0  0<br>0  0 |
| 0<br>1 | 1  0  0  1 | 0  1  1  0 | 0 | 0  1  1<br>1  0 | | 0<br>1 | 0  0<br>0  0 |
| 0<br>1 | 1  0  1  0 | 0  1  1  0 | 1 | 0  1  1<br>1  0 | | 0<br>1 | 0  0<br>0  0 |
| 0<br>1 | 1  0  1  1 | 0  1  1  1 | 0 | 0  1  1<br>1  0 | | 0<br>1 | 0  0<br>0  0 |
| 0<br>1 | 1  1  0  0 | 0  1  1  1 | 1 | 0  1  1<br>1  0 | | 0<br>1 | 0  0<br>0  0 |
| 0<br>1 | 1  1  0  1 | 1  0  0  0 | 0 | 1  0  0<br>1  0 | | 0<br>0 | 0  0<br>0  0 |
| 0<br>1 | 1  1  1  0 | 1  0  0  0 | 1 | 1  0  0<br>1  0 | | 0<br>0 | 0  0<br>0  0 |
| 0<br>1 | 1  1  1  1 | 1  0  0  1 | 0 | 1  0  0<br>1  0 | | 0<br>0 | 0  0<br>0  0 |

C --- CARRY TO $2^{-21}$
S --- STICKY BIT

FIG. 6(b)

| | REAL VALUE | VALUE OF ADDING 1 TO $2^{-53}$ AND S | VALUE AFTER REAL ROUNDING | RE-ROUND SIGNAL | CORRECTION SIGNAL |
|---|---|---|---|---|---|
| $2^1$ | $2^{-51}$ $2^{-52}$ $2^{-53}$ S | C $2^{-51}$ $2^{-52}$ $2^{-53}$ S | C $2^{-51}$ $2^{-52}$ | | |
| 0<br>1 | 0 0 0 0 | 0 0 0 1   1 | 0 0 0<br>0 0 | 0<br>0 | 0 0<br>0 0 |
| 0<br>1 | 0 0 0 1 | 0 0 1 0   0 | 0 0 1<br>0 1 | 0<br>0 | 0 0<br>0 1 |
| 0<br>1 | 0 0 1 0 | 0 0 1 0   1 | 0 0 1<br>0 1 | 0<br>0 | 0 0<br>0 1 |
| 0<br>1 | 0 0 1 1 | 0 0 1 1   0 | 0 0 1<br>0 1 | 0<br>0 | 0 0<br>0 1 |
| 0<br>1 | 0 1 0 0 | 0 0 1 1   1 | 0 0 1<br>0 1 | 0<br>0 | 0 0<br>0 1 |
| 0<br>1 | 0 1 0 1 | 0 1 0 0   0 | 0 1 0<br>0 1 | 0<br>0 | 0 0<br>0 0 |
| 0<br>1 | 0 1 1 0 | 0 1 0 0   1 | 0 1 0<br>0 1 | 0<br>0 | 0 0<br>0 0 |
| 0<br>1 | 0 1 1 1 | 0 1 0 1   0 | 0 1 0<br>0 1 | 0<br>0 | 0 0<br>0 0 |
| 0<br>1 | 1 0 0 0 | 0 1 0 1   1 | 0 1 0<br>0 1 | 0<br>0 | 0 0<br>0 0 |
| 0<br>1 | 1 0 0 1 | 0 1 1 0   0 | 0 1 1<br>1 0 | 0<br>1 | 0 0<br>0 0 |
| 0<br>1 | 1 0 1 0 | 0 1 1 0   1 | 0 1 1<br>1 0 | 0<br>1 | 0 0<br>0 0 |
| 0<br>1 | 1 0 1 1 | 0 1 1 1   0 | 0 1 1<br>1 0 | 0<br>1 | 0 0<br>0 0 |
| 0<br>1 | 1 1 0 0 | 0 1 1 1   1 | 0 1 1<br>1 0 | 0<br>1 | 0 0<br>0 0 |
| 0<br>1 | 1 1 0 1 | 1 0 0 0   0 | 1 0 0<br>1 0 | 0<br>0 | 0 0<br>0 0 |
| 0<br>1 | 1 1 1 0 | 1 0 0 0   1 | 1 0 0<br>1 0 | 0<br>0 | 0 0<br>0 0 |
| 0<br>1 | 1 1 1 1 | 1 0 0 1   0 | 1 0 0<br>1 0 | 0<br>0 | 0 0<br>0 0 |

C --- CARRY TO $2^{-50}$
S --- STICKY BIT

FIG. 6(c)

| | REAL VALUE | | | | VALUE OF ADDING 1 TO $2^{-25}$ AND S | | | | | VALUE AFTER REAL ROUNDING | | | | RE-ROUND SIGNAL | CORRECTION SIGNAL | |
|---|---|---|---|---|---|---|---|---|---|---|---|---|---|---|---|---|
| $2^0$ | $2^{-23}$ | $2^{-24}$ | $2^{-25}$ | S | C | $2^{-23}$ | $2^{-24}$ | $2^{-25}$ | S | C | $2^{-23}$ | $2^{-24}$ | | | | |
| 0 | 0 | 0 | 0 | 0 | | 0 | 0 | 0 | 1 | 1 | 0 | 0 | 0 | 0 | 0 | 0 |
| 1 | | | | | | | | | | | 0 | 0 | 0 | 0 | 0 | 0 |
| 0 | 0 | 0 | 0 | 1 | | 0 | 0 | 1 | 0 | 0 | 0 | 0 | 1 | 0 | 0 | 0 |
| 1 | | | | | | | | | | | 0 | 1 | 0 | 0 | 1 | |
| 0 | 0 | 0 | 1 | 0 | | 0 | 0 | 1 | 0 | 1 | 0 | 0 | 1 | 0 | 0 | 0 |
| 1 | | | | | | | | | | | 0 | 1 | 0 | 0 | 1 | |
| 0 | 0 | 0 | 1 | 1 | | 0 | 0 | 1 | 1 | 0 | 0 | 0 | 1 | 0 | 0 | 0 |
| 1 | | | | | | | | | | | 0 | 1 | 0 | 0 | 1 | |
| 0 | 0 | 1 | 0 | 0 | | 0 | 0 | 1 | 1 | 1 | 0 | 0 | 1 | 0 | 0 | 0 |
| 1 | | | | | | | | | | | 0 | 1 | 0 | 0 | 1 | |
| 0 | 0 | 1 | 0 | 1 | | 0 | 1 | 0 | 0 | 0 | 0 | 1 | 0 | 0 | 0 | 0 |
| 1 | | | | | | | | | | | 0 | 1 | 0 | 0 | 0 | |
| 0 | 0 | 1 | 1 | 0 | | 0 | 1 | 0 | 0 | 1 | 0 | 1 | 0 | 0 | 0 | 0 |
| 1 | | | | | | | | | | | 0 | 1 | 0 | 0 | 0 | |
| 0 | 0 | 1 | 1 | 1 | | 0 | 1 | 0 | 1 | 0 | 0 | 1 | 0 | 0 | 0 | 0 |
| 1 | | | | | | | | | | | 0 | 1 | 0 | 0 | 0 | |
| 0 | 1 | 0 | 0 | 0 | | 0 | 1 | 0 | 1 | 1 | 0 | 1 | 0 | 0 | 0 | 0 |
| 1 | | | | | | | | | | | 0 | 1 | 0 | 0 | 0 | |
| 0 | 1 | 0 | 0 | 1 | | 0 | 1 | 1 | 0 | 0 | 0 | 1 | 1 | 0 | 0 | 0 |
| 1 | | | | | | | | | | | 1 | 0 | 1 | 0 | 0 | |
| 0 | 1 | 0 | 1 | 0 | | 0 | 1 | 1 | 0 | 1 | 0 | 1 | 1 | 0 | 0 | 0 |
| 1 | | | | | | | | | | | 1 | 0 | 1 | 0 | 0 | |
| 0 | 1 | 0 | 1 | 1 | | 0 | 1 | 1 | 1 | 0 | 0 | 1 | 1 | 0 | 0 | 0 |
| 1 | | | | | | | | | | | 1 | 0 | 1 | 0 | 0 | |
| 0 | 1 | 1 | 0 | 0 | | 0 | 1 | 1 | 1 | 1 | 0 | 1 | 1 | 0 | 0 | 0 |
| 1 | | | | | | | | | | | 1 | 0 | 1 | 0 | 0 | |
| 0 | 1 | 1 | 0 | 1 | | 1 | 0 | 0 | 0 | 0 | 1 | 0 | 0 | 0 | 0 | 0 |
| 1 | | | | | | | | | | | 1 | 0 | 0 | 0 | 0 | |
| 0 | 1 | 1 | 1 | 0 | | 1 | 0 | 0 | 0 | 1 | 1 | 0 | 0 | 0 | 0 | 0 |
| 1 | | | | | | | | | | | 1 | 0 | 0 | 0 | 0 | |
| 0 | 1 | 1 | 1 | 1 | | 1 | 0 | 0 | 1 | 0 | 1 | 0 | 0 | 0 | 0 | 0 |
| 1 | | | | | | | | | | | 1 | 0 | 0 | 0 | 0 | |

C --- CARRY TO $2^{-22}$
S --- STICKY BIT

FIG. 6(d)

| REAL VALUE | | | | | VALUE OF ADDING 1 TO $2^{-54}$ | | | | | VALUE AFTER REAL ROUNDING | | | | RE-ROUND SIGNAL | CORREC-TION SIGNAL | |
|---|---|---|---|---|---|---|---|---|---|---|---|---|---|---|---|---|
| $2^0$ | $2^{-52}$ | $2^{-53}$ | $2^{-54}$ | S | C | $2^{-52}$ | $2^{-53}$ | $2^{-54}$ | S | C | $2^{-53}$ | $2^{-54}$ | | | | |
| 0 | 0 | 0 | 0 | 0 | | 0 | 0 | 0 | 1 | 1 | 0 | 0 | 0 | | 0 | 0 | 0 |
| 1 | | | | | | | | | | | 0 | 0 | | | 0 | 0 | 0 |
| 0 | 0 | 0 | 0 | 1 | | 0 | 0 | 1 | 0 | 0 | 0 | 0 | 1 | | 0 | 0 | 0 |
| 1 | | | | | | | | | | | 0 | 1 | | | 0 | 0 | 1 |
| 0 | 0 | 0 | 1 | 0 | | 0 | 0 | 1 | 0 | 1 | 0 | 0 | 1 | | 0 | 0 | 0 |
| 1 | | | | | | | | | | | 0 | 1 | | | 0 | 0 | 1 |
| 0 | 0 | 0 | 1 | 1 | | 0 | 0 | 1 | 1 | 0 | 0 | 0 | 1 | | 0 | 0 | 0 |
| 1 | | | | | | | | | | | 0 | 1 | | | 0 | 0 | 1 |
| 0 | 0 | 1 | 0 | 0 | | 0 | 0 | 1 | 1 | 1 | 0 | 0 | 1 | | 0 | 0 | 0 |
| 1 | | | | | | | | | | | 0 | 1 | | | 0 | 0 | 1 |
| 0 | 0 | 1 | 0 | 1 | | 0 | 1 | 0 | 0 | 0 | 0 | 1 | 0 | | 0 | 0 | 0 |
| 1 | | | | | | | | | | | 0 | 1 | | | 0 | 0 | 0 |
| 0 | 0 | 1 | 1 | 0 | | 0 | 1 | 0 | 0 | 1 | 0 | 1 | 0 | | 0 | 0 | 0 |
| 1 | | | | | | | | | | | 0 | 1 | | | 0 | 0 | 0 |
| 0 | 0 | 1 | 1 | 1 | | 0 | 1 | 0 | 1 | 0 | 0 | 1 | 0 | | 0 | 0 | 0 |
| 1 | | | | | | | | | | | 0 | 1 | | | 0 | 0 | 0 |
| 0 | 1 | 0 | 0 | 0 | | 0 | 1 | 0 | 1 | 1 | 0 | 1 | 0 | | 0 | 0 | 0 |
| 1 | | | | | | | | | | | 0 | 1 | | | 0 | 0 | 0 |
| 0 | 1 | 0 | 0 | 1 | | 0 | 1 | 1 | 0 | 0 | 0 | 1 | 1 | | 0 | 0 | 0 |
| 1 | | | | | | | | | | | 1 | 0 | | | 1 | 0 | 0 |
| 0 | 1 | 0 | 1 | 0 | | 0 | 1 | 1 | 0 | 1 | 0 | 1 | 1 | | 0 | 0 | 0 |
| 1 | | | | | | | | | | | 1 | 0 | | | 1 | 0 | 0 |
| 0 | 1 | 0 | 1 | 1 | | 0 | 1 | 1 | 1 | 0 | 0 | 1 | 1 | | 0 | 0 | 0 |
| 1 | | | | | | | | | | | 1 | 0 | | | 1 | 0 | 0 |
| 0 | 1 | 1 | 0 | 0 | | 0 | 1 | 1 | 1 | 1 | 0 | 1 | 1 | | 0 | 0 | 0 |
| 1 | | | | | | | | | | | 1 | 0 | | | 1 | 0 | 0 |
| 0 | 1 | 1 | 0 | 1 | | 1 | 0 | 0 | 0 | 0 | 1 | 0 | 0 | | 0 | 0 | 0 |
| 1 | | | | | | | | | | | 1 | 0 | | | 0 | 0 | 0 |
| 0 | 1 | 1 | 1 | 0 | | 1 | 0 | 0 | 0 | 1 | 1 | 0 | 0 | | 0 | 0 | 0 |
| 1 | | | | | | | | | | | 1 | 0 | | | 0 | 0 | 0 |
| 0 | 1 | 1 | 1 | 1 | | 1 | 0 | 0 | 1 | 0 | 1 | 0 | 0 | | 0 | 0 | 0 |
| 1 | | | | | | | | | | | 1 | 0 | | | 0 | 0 | 0 |

C --- CARRY TO $2^{-51}$
S --- STICKY BIT

FIG. 7(a)

| INPUT $2^{-24}$ $2^{-25}$ S | 2's COMPLEMENT OF INPUT $2^{-24}$ $2^{-25}$ S | 1's COMPLEMENT OF INPUT $2^{-24}$ $2^{-25}$ S | RN, RP(+),RM(-) Cin | RP(-), RM(+),RZ Cin |
|---|---|---|---|---|
| 0 0 0 | 0 0 0 | 1 1 1 | 1 | 0 |
| 0 0 1 | 1 1 1 | 1 1 0 | 1 | 0 |
| 0 1 0 | 1 1 0 | 1 0 1 | 1 | 0 |
| 0 1 1 | 1 0 1 | 1 0 0 | 1 | 0 |
| 1 0 0 | 1 0 0 | 0 1 1 | 1 | 0 |
| 1 0 1 | 0 1 1 | 0 1 0 | 1 | 0 |
| 1 1 0 | 0 1 0 | 0 0 1 | 1 | 0 |
| 1 1 1 | 0 0 1 | 0 0 0 | 1 | 0 |

FIG. 7(b)

| INPUT $2^{-53}$ $2^{-54}$ S | 2's COMPLEMENT OF INPUT $2^{-53}$ $2^{-54}$ S | 1's COMPLEMENT OF INPUT $2^{-53}$ $2^{-54}$ S | RN, RP(+),RM(-) Cin | RP(-), RM(+),RZ Cin |
|---|---|---|---|---|
| 0 0 0 | 0 0 0 | 1 1 1 | 1 | 0 |
| 0 0 1 | 1 1 1 | 1 1 0 | 1 | 0 |
| 0 1 0 | 1 1 0 | 1 0 1 | 1 | 0 |
| 0 1 1 | 1 0 1 | 1 0 0 | 1 | 0 |
| 1 0 0 | 1 0 0 | 0 1 1 | 1 | 0 |
| 1 0 1 | 0 1 1 | 0 1 0 | 1 | 0 |
| 1 1 0 | 0 1 0 | 0 0 1 | 1 | 0 |
| 1 1 1 | 0 0 1 | 0 0 0 | 1 | 0 |

FIG. 7(c)

| INPUT $2^{-24}$ $2^{-25}$ S | 2's COMPLEMENT OF INPUT $2^{-24}$ $2^{-25}$ S | 1's COMPLEMENT OF INPUT $2^{-24}$ $2^{-25}$ S | RN, RP(+),RM(-) Cin | RP(-), RM(+),RZ Cin |
|---|---|---|---|---|
| 0 0 0 | 0 0 0 | 1 1 1 | 1 | 1 |
| 0 0 1 | 1 1 1 | 1 1 0 | 1 | 0 |
| 0 1 0 | 1 1 0 | 1 0 1 | 1 | 0 |
| 0 1 1 | 1 0 1 | 1 0 0 | 0 | 0 |
| 1 0 0 | 1 0 0 | 0 1 1 | 1 | 1 |
| 1 0 1 | 0 1 1 | 0 1 0 | 1 | 0 |
| 1 1 0 | 0 1 0 | 0 0 1 | 1 | 0 |
| 1 1 1 | 0 0 1 | 0 0 0 | 0 | 0 |

FIG. 7(d)

| INPUT $2^{-53}$ $2^{-54}$ S | 2's COMPLEMENT OF INPUT $2^{-53}$ $2^{-54}$ S | 1's COMPLEMENT OF INPUT $2^{-53}$ $2^{-54}$ S | RN, RP(+),RM(-) Cin | RP(-), RM(+),RZ Cin |
|---|---|---|---|---|
| 0 0 0 | 0 0 0 | 1 1 1 | 1 | 1 |
| 0 0 1 | 1 1 1 | 1 1 0 | 1 | 0 |
| 0 1 0 | 1 1 0 | 1 0 1 | 1 | 0 |
| 0 1 1 | 1 0 1 | 1 0 0 | 0 | 0 |
| 1 0 0 | 1 0 0 | 0 1 1 | 1 | 1 |
| 1 0 1 | 0 1 1 | 0 1 0 | 1 | 0 |
| 1 1 0 | 0 1 0 | 0 0 1 | 1 | 0 |
| 1 1 1 | 0 0 1 | 0 0 0 | 0 | 0 |

FIG. 9(a)

| RE-ROUND | ROUND MODE | SIGN OF OPERATION RESULT | REAL OPERATION | ROUND ADDITION BIT | |
|---|---|---|---|---|---|
| | | | | EXPNT. DIFF. 0/1 | EXC. FOR EXPNT. DIFF. 0/1 |
| 0 | RN | * | ADD SUBTRACT | $2^{-24}$ n | $2^{-24}$ $2^{-25}$ |
| | RP | + | ADD SUBTRACT | $2^{-24}$ n | $2^{-24}$ $2^{-25}$ |
| | | − | * | n | n |
| | RM | + | * | n | n |
| | | − | ADD SUBTRACT | $2^{-24}$ n | $2^{-24}$ $2^{-25}$ |
| | RZ | * | * | n | n |
| 1 | * | * | ADD | $2^{-24}$ | $2^{-24}$ | n --- NO ADDITION
* --- DON'T CARE

FIG. 9(b)

| RE-ROUND | ROUND MODE | SIGN OF OPERATION RESULT | REAL OPERATION | ROUND ADDITION BIT | |
|---|---|---|---|---|---|
| | | | | EXPNT. DIFF. 0/1 | EXC. FOR EXPNT. DIFF. 0/1 |
| 0 | RN | * | ADD SUBTRACT | $2^{-53}$ n | $2^{-53}$ $2^{-54}$ |
| | RP | + | ADD SUBTRACT | $2^{-53}$ n | $2^{-53}$ $2^{-54}$ |
| | | − | * | n | n |
| | RM | + | * | n | n |
| | | − | ADD SUBTRACT | $2^{-53}$ n | $2^{-53}$ $2^{-54}$ |
| | RZ | * | * | n | n |
| 1 | * | * | ADD | $2^{-53}$ | $2^{-53}$ | n --- NO ADDITION
* --- DON'T CARE

FIG. 10

| ORDER | EQUATION OF EXPONENT | SIGN OF DATA 1 | SIGN OF DATA 2 | REAL OPERATION | SIGN OF OPERATION RESULT | REMARKS |
|---|---|---|---|---|---|---|
| ADDI-TION | e1 = e2 | +<br>+<br>-<br>- | +<br>-<br>+<br>- | ADD<br>SUBTRACT<br>SUBTRACT<br>ADD | +<br>(∗1)<br>(∗1)<br>- | f1 + f2<br>f1 - f2<br>f2 - f1<br>-(f1 + f2) |
| | e1 < e2 | +<br>+<br>-<br>- | +<br>-<br>+<br>- | ADD<br>SUBTRACT<br>SUBTRACT<br>ADD | +<br>-<br>+<br>- | f1' + f2<br>-(f2 - f1')<br>f2 - f1'<br>-(f1' + f2) |
| | e1 > e2 | +<br>+<br>-<br>- | +<br>-<br>+<br>- | ADD<br>SUBTRACT<br>SUBTRACT<br>ADD | +<br>+<br>-<br>- | f1 + f2'<br>f1 - f2'<br>-(f1 - f2')<br>-(f1 + f2) |
| SUB-TRAC-TION | e1 = e2 | +<br>+<br>-<br>- | +<br>-<br>+<br>- | SUBTRACT<br>ADD<br>ADD<br>SUBTRACT | (∗1)<br>-<br>+<br>(∗1) | f2 - f1<br>-(f2 + f1)<br>f2 + f1<br>-(f2 - f1) |
| | e1 < e2 | +<br>+<br>-<br>- | +<br>-<br>+<br>- | SUBTRACT<br>ADD<br>ADD<br>SUBTRACT | +<br>-<br>+<br>- | f2 - f1'<br>-(f2 + f1')<br>f2 + f1'<br>-(f2 - f1') |
| | e1 > e2 | +<br>+<br>-<br>- | +<br>-<br>+<br>- | SUBTRACT<br>ADD<br>ADD<br>SUBTRACT | -<br>-<br>+<br>+ | -(f1 - f2')<br>-(f1 + f2')<br>f1 + f2'<br>f1 - f2' | f1 : MANTISSA OF DATA 1
f2 : MANTISSA OF DATA 2
e1 : EXPONENTIAL OF DATA 1
e2 : EXPONENTIAL OF DATA 2
f1' : DATA ALIGNED f1
f2' : DATA ALIGNED f2
(∗) SIGN OF RESULT AFTER EFFECTIVE OPERATION

FIG. 11

| LRS | SIGN OF OPERATION RESULT | ROUND ADDITION SIGNAL | | | |
|---|---|---|---|---|---|
| | | RM | RP | RN | RZ |
| 0 0 0 | +<br>- | 0 | 0 | 0 | 0 |
| 0 0 1 | +<br>- | 0<br>1 | 1<br>0 | 0 | 0 |
| 0 1 0 | +<br>- | 0<br>1 | 1<br>0 | 0 | 0 |
| 0 1 1 | +<br>- | 0<br>1 | 1<br>0 | 1 | 0 |
| 1 0 0 | +<br>- | 0 | 0 | 0 | 0 |
| 1 0 1 | +<br>- | 0<br>1 | 1<br>0 | 0 | 0 |
| 1 1 0 | +<br>- | 0<br>1 | 1<br>0 | 1 | 0 |
| 1 1 1 | +<br>- | 0<br>1 | 1<br>0 | 1 | 0 |

FIG. 12(a)

```
  L R
  1 1
+)  1
─────
  0 0
CARRY 1
```

FIG. 12(b)

```
  L R
  0 1
+)  1
─────
  1 0
CARRY 0
```

FIG. 12(c)

```
  R S
  0 0
+)1 1
─────
  1 1
CARRY 0
```

FIG. 12(d)

```
  R S
  0 1
+)1 1
─────
  0 0
CARRY 1
```

FIG. 12(e)

```
  R S
  1 0
+)1 1
─────
  0 1
CARRY 1
```

FIG. 12(f)

```
  R S
  1 1
+)1 1
─────
  1 0
CARRY 1
```

FIG. 17(a)

| Z22 Z23 Z24 | Z51 Z52 Z53 | S | Cout | CORRECTION SIGNAL | ROUND ADDITION SIGNAL |
|---|---|---|---|---|---|
| 0  0  0 | *  *  * | 0<br>0<br>1<br>1 | 0<br>1<br>0<br>1 | 0<br>0<br>0<br>0 | 0<br>0<br>0<br>0 |
| 0  0  1 | *  *  * | 0<br>0<br>1<br>1 | 0<br>1<br>0<br>1 | 0<br>0<br>0<br>0 | 0<br>0<br>0<br>0 |
| 0  1  0 | *  *  * | 0<br>0<br>1<br>1 | 0<br>1<br>0<br>1 | 1<br>0<br>0<br>0 | 0<br>0<br>0<br>0 |
| 0  1  1 | *  *  * | 0<br>0<br>1<br>1 | 0<br>1<br>0<br>1 | 0<br>0<br>1<br>1 | 0<br>0<br>0<br>0 |
| 1  0  0 | *  *  * | 0<br>0<br>1<br>1 | 0<br>1<br>0<br>1 | 0<br>0<br>0<br>0 | 0<br>0<br>0<br>0 |
| 1  0  1 | *  *  * | 0<br>0<br>1<br>1 | 0<br>1<br>0<br>1 | 0<br>0<br>0<br>0 | 0<br>0<br>0<br>0 |
| 1  1  0 | *  *  * | 0<br>0<br>1<br>1 | 0<br>1<br>0<br>1 | 1<br>0<br>0<br>0 | 0<br>0<br>0<br>0 |
| 1  1  1 | *  *  * | 0<br>0<br>1<br>1 | 0<br>1<br>0<br>1 | 0<br>0<br>0<br>0 | 0<br>1<br>0<br>1 |

FIG. 17(b)

| $Z_{22}$ $Z_{23}$ $Z_{24}$ | $Z_{51}$ $Z_{52}$ $Z_{53}$ | S | Cout | CORRECTION SIGNAL | ROUND ADDITION SIGNAL |
|---|---|---|---|---|---|
| * * * | 0 0 0 | 0 0 1 1 | 0 1 0 1 | 0 0 0 0 | 0 0 0 0 |
| * * * | 0 0 1 | 0 0 1 1 | 0 1 0 1 | 0 0 0 0 | 0 0 0 0 |
| * * * | 0 1 0 | 0 0 1 1 | 0 1 0 1 | 1 0 0 0 | 0 0 0 0 |
| * * * | 0 1 1 | 0 0 1 1 | 0 1 0 1 | 0 0 0 1 | 0 0 0 0 |
| * * * | 1 0 0 | 0 0 1 1 | 0 1 0 1 | 0 0 0 0 | 0 0 0 0 |
| * * * | 1 0 1 | 0 0 1 1 | 0 1 0 1 | 0 0 0 0 | 0 0 0 0 |
| * * * | 1 1 0 | 0 0 1 1 | 0 1 0 1 | 1 0 0 0 | 0 0 0 0 |
| * * * | 1 1 1 | 0 0 1 1 | 0 1 0 1 | 0 0 0 0 | 0 1 0 1 |

FLOATING POINT DATA PROCESSING APPARATUS WHICH SIMULTANEOUSLY EFFECTS SUMMATION AND ROUNDING COMPUTATIONS

BACKGROUND OF THE INVENTION

The present invention generally relates to a method and an apparatus for processing floating point data which are used in the central processing units of digital computers, and which are adapted to effect the four fundamental arithmetic computations of floating point data, and more particularly, the four fundamental arithmetic computations of floating point data and rounding and normalizing computations in accordance with ANSI/IEEE Standard for Binary Floating Point Arithmetic P754.

The conventional floating point data adding apparatus is shown in the block diagram of FIG. 24. An addition operation is effected with respect to the mantissa data upon the subtraction of different signs or upon the addition of the same signs of two floating point data numbers. A subtraction operation is effected with respect to the mantissa data upon the addition of different signs or upon the subtraction of the same signs of two floating point data numbers. The mantissa addition or subtraction operation is determined beforehand according to the signs of the input data and according to input instructions.

Referring still to FIG. 24, reference numeral 151 denotes a register for storing the mantissa of one of two floating point data numbers having an exponent which is not smaller than the exponent of the other of the two floating-point data numbers. Reference numeral 152 denotes a resister for storing the mantissa of the other of the two floating-point data aligned to the exponent of the one of the two floating point data. Reference numeral 153 denotes a complementer which takes the 1's complement of the output of the register 152 at the time of a subtraction operation. Reference numeral 154 denotes an adder which receives outputs of the register 151 and the complementer 153 and which executes the addition operation with the carry input (Cin) into the least significant bit being 0, and executes the substraction operation with the carry input (Cin) being 1. Reference numeral 155 denotes a register for accommodating the output of the adder 154. Reference numeral 156 denotes a shift number generating circuit for generating shift numbers for normalization of the output of the adder 154. Reference numeral 157 denotes a barrel shifter which is adapted to effect a bit shift according to a bit number output by the shift number generating circuit 156 with respect to the output of the register 155 for realizing the normalization. Reference numeral 158 denotes a register for accommodating the output of the barrel shifter 157. Reference numeral 159 denotes a round value generating circuit which is adapted to control the round addition in accordance with the value retained in the register 158, the round mode and the round precision. That is, the round value generating circuit generates a round addition value in which the least significant bit (L) corresponding to the round precision is 1 and the remaining bits are 0 when rounding up, and generates a round addition value in which all the bits are 0 when rounding down. Reference numeral 160 denotes an adder for adding the output of the register 158 and the output of the round value generating circuit 159. Reference numeral 161 denotes an R1 shifter for shifting by 1 bit the output of the adder 160 in the least significant bit direction (hereinafter referred to as rightward). Reference numeral 162 denotes a register for accommodating the mantissa of the addition or subtraction result to be obtained by the output of the R1 shifter 161.

The operation of the above-described conventional floating point data addition and subtraction will be described herebelow.

First, a case where the augend (or minuend) and the addend (or subtrahend) are the basic single precision format according to ANSI/IEEE Standard for Binary Floating-Point Arithmetic P754 (hereinafter referred to as single precision), and where the sum or difference is also rounded in single precision, will be described.

(1) Pre-Processing Start Step

The mantissa of the one of the augend (or minuend) and the addend (or subtrahend) which has an exponent which is not smaller than the exponent of the other of the augend (or minuend) and the addend (or subtrahend) is accommodated in the register 151. The mantissa of the other of the augend (or minuend) and the addend (or subtrahend) is aligned to the exponent of the mantissa stored in the register 151 and is accommodated in the register 152. The bits which have been dropped off upon the alignment are accommodated, in the register 152, collectively as a round bit (R) having the weight of $2^{-24}$ which is one bit position lower than the least significant bit (L) and a sticky bit (S) which is the logical OR of the bits of the aligned mantissa having the weight of $2^{-25}$ or lower.

(2) Step 1

The complementer 153 and the adder 154 add (or subtract) the two mantissas retained in the register 151 and the register 152 so as to accommodate the result in the register 155. Upon adding, the complementer 153 outputs into the adder 154 the output of the register 152 as is and the Cin of the adder 154 is 0. Upon subtraction, the complementer 153 applies the 1's complement of the output of the register 152 to the adder 154 and the Cin of the adder 154 is 1.

(3) Step 2

The shift number generating circuit 1546 generates the shift number for normalization of the output of the adder 154. The barrel shifter 157 effects the shifting of the output of the register 155 in accordance with the output of the shift number generating circuit 156 so as to effect the normalization shifting operation with respect to the computation result of the step 1. At this time, the barrel shifter 157 generates the shift results down to the least significant bit (L), the round it (R) having the weight of the $2^{-24}$ lower by one unit of the least significant bit, a sticky bit (S) which is the logical OR of the bits having the weight of $2^{-25}$ or lower and accommodates them in the register 158.

(4) Step 3

The round value generating circuit 159 generates the round addition value in accordance with the least significant bit (L) retained in the register 158, the round bit (R), the sticky bit (S), the round mode, the round precision and the sign of the operation result. The generated round addition value has a value in which the bit having the weight of $2^{-23}$ is' 1 and the remaining bits are 0 when the round addition signal is 1, and a value in which all the bits are 0 when the round addition signal is 0, in accordance with the input, output relation chart shown in FIG. 11. RM, RP, RN, RZ denote in order the directed rounding toward the nearest even mode stipulated in the ANSI/IEEE Standard for Binary Floating-Point Arithmetic P754. The adder 160 adds the output of the register 158 and the output of the round value generating circuit 159. The R1 shifter 161 shifts, by one bit rightward, the output of the adder 160 when overflow has been generated in the adder 160, and otherwise accommodates the output of the adder 160 as is in the register 162 so as to complete the processing.

A case where the augend (or minuend) and the addend (or subtrahend) are the basic double precision format according to ANSI/IEEE Standard for Binary Floating-Point Arithmetic P754 (hereinafter referred to simply as double precision), and where the sum or difference is also rounded in double precision, will be described.

(1) Pre-Processing Start Step

The mantissa of the one of the augend (or minuend) and the addend (or subtrahend) which has an exponent which is not smaller than the exponent of the other of the augend (or minuend) and the addend (or subtrahend) is accommodated in the register 151. The mantissa of the other of the augend (or minuend) and the addend (or subtrahend) is aligned to the exponent of the mantissa stored in the register 151 and is accommodated in the register 152. The bits which have been dropped off upon the alignment are accommodated in the register 152 collectively as a round bit (R) having the weight of $2^{-53}$ which is one bit position lower than the least significant bit (L) and a sticky bit (S) which is the logical OR of the bits of the aligned mantissa having the weight of $2^{-54}$ or lower.

(2) Step 1

The complementer 153 and the adder 154 add (or subtract) the two mantissas retained in the register 151 and the register 152 so as to accommodate the result in the register 155. For adding, the complementer 153 outputs into the adder 154 the output of the register 152 as is and the Cin of the adder 154 is 0. For subtracting, the complementer 153 applies the 1's complement of the output of the register 152 to the adder 154 and the Cin of the adder 154 is 1.

(3) Step 2

The shift number generating circuit 156 generates the shift number for normalization of the output of the adder 154. The barrel shift 157 effects the shifting of the output of the register 155 in accordance with the output of the shift number generating circuit 156 so as to effect the normalization shifting operation with respect to the operation result of the step 1. At this time, the barrel shifter 157 generates the shift results down to the least significant bit (L), the round bit (R) having the weight of the $2^{-53}$ lower by one unit of the least significant bit, a sticky bit (S) which is the logical OR of the bits having the weight of $2^{-54}$ or lower and accommodates them in the register 158.

(4) Step 3

The round value generating circuit 159 generates the round addition value in accordance with the least significant bit (L) retained in the register 158, the round bit (R), the sticky bit (S), the round mode, the round precision and the sign of the operation result. The generated round addition value a value in which a bit having the weight of $2^{-52}$ 1 is and the remaining bits are 0 when the round addition signal is 1, and a value in which all the bits are 0 when the round addition signal is 0, in accordance with the input, output relation chart shown in FIG. 11. The adder 160 adds the output of the register 158 and the output of the round value generating circuit 159. The R1 shifter 161 shifts by one bit rightward the output of the adder 160 when overflow has been generated in the adder, and otherwise accommodates the output of the adder 160 as is in the register 162 so as to complete the processing.

The conventional floating point data multiplication apparatus is shown in the block diagram of FIG. 25.

In FIG. 25, reference numeral 251 denotes a multiplicand register for retaining the multiplicand which consists of a 1 bit signal portion 251s, an 11 bit exponent portion 251e, and a 53 bit mantissa portion 251f. Reference numeral 252 denotes a multiplier register for retaining the multiplier which consists of a 1 bit sign portion 251s, an 11 bit exponent portion 252e, and a 53 bit mantissa portion 252f. The most significant bit of the multiplicand register mantissa portion 251f and the multiplier register mantissa portion 252f is a so-called "hidden bit" having the weight of $2^0$ and is 1 in the normalized number. Except for this bit, the multiplicand register 251 and the multiplier register 252 both conform to the double precision format. Reference numeral 253 denotes a sign generating circuit for reading the signs of the multiplicand and multiplier from the multiplicand register sign portion 251s and the multiplier register sign portion 252s so as to generate the sign of the produce. Reference numeral 254 denotes an exponent adder of 11 bits for reading the exponents of the multiplicand and the multiplier from the multiplicand register exponent portion 251e and the multiplier register exponent portion 252e so as to compute the exponent of the product. Reference numerals 255 and 256 denote selectors of 11 bits for respectively selecting the two inputs of the exponent adder 254. Reference numeral 257 denotes a latch of 11 bits for retaining the output of the exponent adder 254 to be input into the exponent adder 254 again through the selector 255. Reference numeral 258 denotes a bias correction value generating circuit for generating the bias (deviation) of 11 bits in a step of computing the exponent of the product. Reference numeral 259 denotes a normalized correction value generating circuit for generating a constant for increasing by 1 the exponent through the normalization of a 1 bit shift of the mantissa of the product. Reference numeral 260 denotes a multiplicand upper, lower selecting circuit for reading the multiplicand register mantissa portion 251f, and selecting and outputting the upper 27 bits or the lower 27 bits (the most significant bit at this time is 0). Reference numeral 261 denotes a multiplier upper, lower selecting circuit for reading the multiplier resister mantissa portion 252f, and selecting and outputting the upper 27 bits or the lower 27 bits (the most significant bit at this time is 0). Reference numeral 262 denotes a multiplying unit for multiplying the output of the multiplicand upper, lower selecting circuit 260 of 27 bits by the output of the multiplier upper, lower selecting circuit 261 of 27 bits so as to respectively output the sum of 54 bits and the carry of 54 bits. Reference numerals 263 and 264 denote latches of 54 bits for retaining the sum output and the carry output of the multiplying unit 262. Reference numeral 265 denotes a product generating adder of 54 bits for adding the sum output and carry output of the multiplying unit 262 retained in the latch 263 and the latch 264. Reference numeral 266 denotes a latch of 54 bits for retaining the output of the product generating adder 265. Reference numeral 267 denotes a round adding value generating circuit for generating the constant in the adding operation for rounding the mantissa of the product into the single precision or the double precision. Reference numeral 268 denotes a selector of 54 bits for selecting the output of the round addition value generating circuit 267 or the value of the latch 266. Reference numeral 269 denotes a mantissa adder of 54 bits for adding the output of the selector 268 and the value to be retained in the latch 273 to be described later. Reference numeral 270 denotes a logical OR gate for computing the logical OR of the overflow from the most significant bit of the product generating adder 265 and the overflow from the most significant bit of the mantissa adder 269. Reference numeral 271 denotes a shifter of 54 bits for shifting by 0 bits, 1 bit or 26 bits the output of the mantissa adder 269 in the least significant bit direction. Reference numeral 272 denotes a sticky bit generating circuit for inputting the lower 30 bits of the output of the mantissa adder 269 and the shift overflow from the least significant bit of the 26 bits in the shifter 271 so as to generate the sticky bit in accordance with the single precision rounding or double precision rounding. Reference numeral 273 denotes a latch of 54 bits for retaining the output of the shifter 271. Reference numeral 274 is a product register for retaining the product which consists of a 1 bit sign portion 274s, an 11 bit exponent portion 274e, and a 53 bit mantissa portion 274f. The most significant bit of the product register mantissa portion 274f is also a so-called "hidden bit" having the weight of $2^0$ and is 1 in the normalized number. Except for this bit, the product register 274 conforms to the double precision format.

FIG. 26 is a performance illustrating chart showing the constant generated by the round addition value generating circuit 267 shown in FIG. 25. A round addition value D is generated in which only the 24th bit from the most significant bit is 1 and the remaining bits are 0, and a round addition value E is generated in which only the 2nd bit from the least significant bit is 1 and the remaining bits are 0.

The operation of the conventional floating point data multiplying apparatus will be described hereinafter.

First, a case where the multiplicand and the multiplier are the single precision, and where the product is also round in the single precision, will be described hereinafter with the use of the operation flow chart of the single precision multiplication shown in FIG. 27. FIG. 27 shows the contents of the operation of each of the processing steps of the exponent adder 254, the multiplying unit 262, the product generating adder 265, the mantissa adder 269, and the shifter 271.

(1) Pre-Processing Start Step

The multiplicand and the multiplier of the single precision are expanded into the double precision and are accommodated respectively into the multiplicand register 251 and the multiplier register 252. At this time, the multiplicand register exponent portion 251e and the multiplier register exponent portion 252e are both converted into the biased expression of the double precision (real exponent value=exponent value $-1023_{(10)}$), with 0 being filled in the lower 29 bits of the multiplicand register mantissa portion 251f and the multiplier register mantissa portion 252f. The latch 273 is cleared to 0. Here, the subscript (10) denotes that the decimal number expression is used.

(2) Step 1

By operation of the selector 255 and the selector 256, the exponents of the multiplicand and the multiplier are inputted from the multiplicand register exponent portion 251e and the multiplier register exponent portion 252e into the exponent adder 254 where they are added to accommodate the addition result into the latch 257. The multiplicand upper, lower selecting circuit 260 reads and outputs the upper 27 bits of the multiplicand register mantissa portion 251f (all the effective bits of the mantissa portion of the multiplicand are included therein), and the multiplier upper, lower selecting circuit 261 reads and outputs the upper 27 bits of the multiplier register mantissa portion 252f (all the effective bits of the mantissa portion of the multiplier are included therein). The multiplier 262 executes the multiplication in accordance with the inputs from the multiplicand upper, lower selecting circuit 260 and the multiplier upper, lower selecting circuit 261 so as to accommodate the sum output and the carry output respectively into the latch 263 and the latch 264. At the same time, in the sign generating circuit 253, the signs of the multiplicand and the multiplier are read from the multiplicand register sign portion 251s and the multiplier register sign portion 252s so as to take the exclusive OR of both, and to generate the sign of the product so as to be accommodated in the product register sign portion 724s.

(3) Step 2

As the value retained by the latch 257 is the sum of the biased exponents of the multiplicand and the multiplier, the biasing is double applied. Therefore, $-1023$ (actually the 2's complement expression is used) from the bias correction value generating circuit 258 is outputted. By operation of the selector 255 and the selector 256, the value of the latch 257 and the output of the bias correction value generating circuit 258 are added in the exponent adder 254 and accommodated again into the latch 257. The product generating adder 265 adds the sum output and the carry output of the multiplying unit 262 respectively retained in the latch 263 and the latch 264 to accommodate the addition result into the latch 266.

(4) Step 3

The mantissa adder 269 adds the value retained in the latch 266 and output by selector 268 and the value 0 of the latch 273. When overflow from the product generating adder 265 exists at the step 2, namely, when the product of the mantissa is 2 or more, the shifter 271 shifts (at this time, 1 is buried at the most significant bit), in the 1 bit least significant bit direction, the output from the mantissa adder 269 for normalization so as to accommodate the result into the latch 273. By operation of the selector 255 and the selector 256, the exponent adder 254 adds the value of the latch 257 and the constant 1 output by the normalized correction value generating circuit 259 so as to be accommodated again into the latch 257. When overflow from the product generating adder 265 at the step 2 does not exist, namely, when the product of the mantissa portion is or more and less than 2, the shifter 271 accommodate it as is into the latch 273 without shifting of the output from the mantissa adder 269, since normalization is not required. By operation of the selector 255 and the selector 256, the exponent adder 254 outputs the value of the latch 257 as is and accommodates it again into the latch 257. The sticky bit generating circuit 272 takes the logical OR of the lower 30 bits of the output of the mantissa adder 269 that the sticky bit is 1 if a bit having the value 1 exists in the 30 bits, and the sticky bit is 0 if all 30 bits are 0.

(5) Step 4

The round addition value generating circuit 267 decides whether the round addition is necessary in accordance with the rounding mode, the value of the 25th bit from the most significant bit which is a round bit of the value retained in the latch 273, the sign of the product output by the sign generating circuit 253 (necessary when the round mode is a round toward plus mode and a round toward minus mode) and the value of the sticky bit by the sticky bit circuit 272. The circuit 267 outputs the round addition value D shown in FIG. 26 when the round addition is necessary, and outputs 0 when the round addition is not necessary. By operation of the selector 268, the mantissa adder 269 adds the round addition value output by the round addition value generating circuit 267 and a value retained in the latch 273. At this time, when overflow is caused in the mantissa adder 269, namely, the mantissa is 2 or more by rounding up, the shifter 271 shifts by 1 bit in the least significant bit direction the output from the mantissa adder 269 again for normalization (at this time, 1 is buried at the most significant bit). By operation of the selector 255 and the selector 256, the exponent adder 254 adds the value of the latch 257 and the constant 1 output by the normalized correction value generating circuit 259. When the overflow is not caused in the mantissa adder 269, namely, the mantissa value is 1 or more and less than 2, the shifter 271 outputs the output, as is, from the mantissa adder 269 without shifting since it is not necessary to effect normalization. By operation of the selector 255 and the selector 256, the exponent adder 254 also outputs the value, as is, of the latch 257. In any case, the output of the exponent adder 254 is accommodated into the product register exponent portion 274e, the lower 29 bits of the 53 bits except for the least significant bit of the output of the shifter 271 are masked into 0, are accommodated in the product register mantissa portion 274f so as to complete the processing.

A case where the multiplicand and the multiplier are the double precision, and where the product is also rounded in the double precision, will be described with reference to the operation flow chart of the double precision multiplication shown in FIG. 28. FIG. 28 shows the contents of the operations of each processing step of the exponent adder 254, the multiplying unit 262, the product generating adder 265, the mantissa adder 269, and the shifter 271.

(1) Pre-Processing Start Step

The multiplicand and the multiplier in double precision are respectively accommodated in the multiplicand register 251 and the multiplier register 252. At this time, the multiplicand register exponent portion 251e and the multiplier register exponent portion 252e are both converted into the biased expression of the double precision (real exponent value = exponent value $-1023_{(10)}$). The latch 273 is cleared to 0.

(2) Step 1

By operation of the selector 255 and the selector 256, the exponents of the multiplicand and the multiplier are inputted from the multiplicand register exponent portion 251e and the multiplier register exponent portion 252e into the exponent adder 254 where they are added so as to accommodate the addition result into the latch 257. The multiplicand upper, lower selecting circuit 260 reads and outputs the lower 27 bits (the most significant bit is 0) of the multiplicand register mantissa portion 251f, and the multiplier upper, lower selecting circuit 261 reads and outputs the lower 27 bits (the most significant bit is 0) of the multiplier register mantissa portion 252f. The multiplying unit 262 executes the multiplication in accordance with the inputs from the multiplicand upper, lower selecting circuit 260 and the multiplier upper, lower selecting circuit 261 so as to accommodate the sum output and the carry output respectively into the latch 263 and the latch 264. At the same time, in the sign generating circuit 253, the signs of the multiplicand and the multiplier are read from the multiplicand register sign portion 251s and the multiplier register sign portion 252s to take the exclusive OR of both, and to generate the sign of the product so as to be accommodated to the product register sign portion 724s.

(3) Step 2

As the value retained by the latch 257 is the sum of the biased exponents of the multiplicand and the multiplier, the biasing is doubly applied. Therefore, $-1023$ (actually 2's complement expression is used) in outputted from the bias correction value generating circuit 258. By operation of the selector 255 and the selector 256, the value of the latch 257 and the output of the bias correction value generating circuit 258 in the exponent adder 254 are added and are accommodated again into the latch 257. The product generating adder 265 adds the sum output and the carry output of the multiplying unit 262 retained in the latch 263 and the latch 264 so as to accommodate the addition result into the latch 266. The value accommodated in the latch 266 is the least significant partial product. At the same time, the multiplicand upper, lower selecting circuit 260 reads and outputs the lower 27 bits (the most significant bit is 0) of the multiplicand register mantissa portion 251f. The multiplier upper, lower selecting circuit 261 reads and outputs the upper 27 bits of the multiplier register mantissa portion 252f. The multiplying unit 262 executes the multiplication in accordance with the inputs from the multiplicand upper, lower selecting circuit 260 and the multiplier upper, lower selecting circuit 261 so as to accommodate the sum output and the carry output respectively into the latch 263 and the latch 264.

(4) Step 3

The mantissa adder 269 adds the value retained in the latch 266 and output by the selector 268 and the value 0 of the latch 273. The shifter 271 shifts by 26 bits in the least significant bit direction the data of 55 bits which consists of 54 bits of the addition result in the mantissa adder 269 and 1 bit being added onto the most significant bit side, where the logical OR of the overflow from the product generating adder 265 at the step 2, and the overflow from the mantissa adder 269 at the step 3 was taken in the "OR" gate 270, so as to accommodate the result into the latch 273. The product generating adder 265 adds the sum output and the carry output of the multiplying unit 262 retained in the latch 263 and the latch 264 so as to accommodate the addition result. The value accommodated in the latch 266 is a first intermediate partial product. At the same time, the multiplicand upper, lower selecting circuit 260 reads and outputs the upper 27 bits of the multiplicand register mantissa portion 252f, and the multiplier upper, lower selecting circuit 261 reads and outputs the lower 27 bits (the most significant bit is 0) of the multiplier register mantissa portion 252f. The multiplying unit 262 executes the multiplication in accordance with the inputs from the multiplicand upper, lower selecting circuit 260 and the multiplier upper, lower selecting circuit 261 so as to accommodate the sum output and the carry output respectively into the latch 263 and the latch 264.

(5) Step 4

The mantissa adder 269 adds the value retained in the latch 266 and output by the selector 268 and the output of the shifter 271 retained in the latch 273. The shifter 271 outputs, without shifting, 54 bits of the addition result, as is, in the mantissa adder 269 so as to be accommodated in the latch 273. The product generating adder 265 adds the sum output of the multiplying unit 262 retained in the latch 263 and the latch 264, and the carry output so as to accommodate the addition result. The value accommodated in the latch 266 is a second intermediate partial product. At the same time, the multiplicand upper, lower selecting circuit 260 reads and outputs the upper 27 bits of the multiplicand register mantissa portion 251$f$, and the multiplier upper, lower selecting circuit 261 reads and outputs the upper 27 bits-of the multiplier register mantissa portion 252$f$. The multiplying unit 262 executes the multiplication in accordance with the inputs from the multiplicand upper, lower selecting circuit 260 and the multiplier upper, lower selecting circuit 261 so as to accommodate the sum output and the carry output respectively in the latch 263 and the latch 264.

(6) Step 5

The mantissa adder 269 adds the value retained in the latch 266 and output by the selector 268 and the output of the shifter 271 retained in the latch 273. The shifter 271 shifts by 26 bits in the least significant bit direction the data of 55 bits, which consists of 54 bits of the addition result in the mantissa adder 269 and 1 bit being added onto the most significant bit side, where the logical OR of the overflow from the product generating adder 265 at the step 4 and the overflow from the mantissa adder 269 at the step 5 is taken in the "OR" gate 270, so as to accommodate the result into the latch 273. The product generating adder 265 adds the sum output and carry output of the multiplying unit 262 retained in the latch 263 and the latch 264 so as to accommodate the addition result. The value accommodated in the latch 266 is the most significant partial product.

(7) Step 6

The mantissa adder 269 adds the value retained in the latch 266 and output by the selector 268 and the output of the shift 271 retained in the latch 273. When the logical OR of the overflow from the product generating adder 265 at the step 5 and the overflow from the mantissa adder 269 at the step 6 being taken at the logical OR gate 270 are 1, namely, the product of the mantissa portion is 2 or more, the shifter 271 shifts the output from the mantissa adder 269 (at this time, 1 is buried in the most significant bit) by 1 bit in the least significant bit direction so as to accommodate the result in the latch 273. The exponent adder 254 adds the value of the latch 257 and the constant 1 output by the normalized correction value generating circuit 259 so as to be accommodated again into the latch 257. When the value with the logical OR being taken in the logical OR gate 270 is 0, namely, the product of the mantissa portion is 1 or more and less than 2, the output from the mantissa adder 269 is accommodated as is into the latch 273 without shifting since normalization is not necessary. The exponent adder 254 outputs the value of the latch 257 as is by operation of the selector 255 and the selector 256 so as to be accommodated again into the latch 257. The sticky bit generating circuit 272 takes the logical OR of 52 bits with the shift overflow from the least significant bit of 26 bits in the shifter 271 at the step 3 and the shift overflow from the least significant bit of 26 bits in the shifter 271 at the step 5 being combined in it. The sticky bit output is 1 if a bit having a value 1 exists in the 52 bits, and the sticky bit output is 0 if all 52 bits are 0.

(8) Step 7

The round addition value generating circuit 267 determines whether round addition is necessary in accordance with the rounding mode, the value of the least significant bit which is the round bit of the value retained in the latch 273, the sign of the product output by the sign generating circuit 253 (necessary when the round mode is a round toward plus mode and a round toward minus mode) and the value of the sticky bit output by the sticky bit generating circuit 272. The round addition value E shown in FIG. 26 is output when the round addition is necessary, and 0 is output when the round addition is not necessary. By operation of the selector 268, the mantissa 269 adds the round addition value output by the round addition value generating circuit 267 and the value retained by the latch 273. At this time, when overflow is caused in the mantissa adder 269, namely, the mantissa is 2 or more by the rounding up, the shifter 271 shifts by 1 bit in the least significant bit direction the output from the mantissa adder 269 again for normalization (at this time, 1 is buried at the most significant bit). By operation of the selector 255 and the selector 256, the exponent adder 254 adds the value of the latch 257 and the constant 1 output by the normalized correction-value generating circuit 259. When overflow is not caused in the mantissa adder 269, name)y, the mantissa is 1 or more and less than 2, the shifter 1 outputs the value, as is, output from the mantissa adder 269 without shifting, since it is not necessary to effect the normalization. By operation of the selector 255 and the selector 256, the exponent adder 254 also outputs the value, as is, of the latch 257. In any case, the output of the exponent adder 254 is accommodated into the product register exponent portion 274$e$, and the 53 bits, the output of the shifter 271 except for th least significant bit, are accommodated in the product register mantissa portion 274$f$ so as to complete the processing.

Also, in the conventional floating point data division apparatus, the value of the exponent portion of the divisor is first subtracted from the value of the exponent portion of the dividend so as to obtain the exponent portion of a quotient. As the subtraction values are the difference between the biased exponents, the bias is offset. Therefore, the bias value is added to the subtraction value so as to generate the exponent portion of the quotient correctly biased.

However, in the conventional floating point data addition and subtraction apparatus, the position of the least significant bit (L) for adding the round addition value is fixed for the first time after normalization shift by the barrel shifter 157, and not fixed with respect to the input and output in the adder 154, thus normally resulting in the processing flow of addition or subtraction, normalization, and rounding. Therefore, the addition and subtraction of two mantissas and the addition of the round addition value are required to be respectively effected independently. At least four processing steps in number including the alignment are required as shown in FIG. 8 ($a$). Also, as the addition or subtraction of the former are effected by the adder 154, and the addition of the latter is effected by the adder 160, two adders are required which presents a problem With respect to increasing the amount of necessary hardware.

In the conventional floating point data multiplication apparatus, the addition of the sum and the carry from the multiplying unit 262, the addition for accumulating the partial products, and the addition of the round addition values are respectively effected independently, and four processing steps are required in the case of the single precision multiplication, and seven processing steps are required in the case of the double precision multiplication. Also, the addition of one former is effected with the product generating adder 265, and the addition of the latter two are effected by the mantissa adder 269, thus requiring two adders, which is a problem in that an increased amount of hardware is needed.

Also, in the conventional floating point data division apparatus, the subtraction value for simply subtracting the exponent portion of the dividend and the exponent portion of the divisor is offset in bias, and a later step for correcting the bias becomes necessary, which presents a problem in that the hardware is required for effecting the bias correction.

SUMMARY OF THE INVENTION

Accordingly, an essential object of the present invention is to provide a method and an apparatus for the addition and subtraction of floating point data which is capable of effecting the mantissa addition and subtraction and the round addition value addition simultaneously within the same adder, and which requires a fewer number of the processing steps to obtain the mantissa portion of the sum or difference in the floating point data rounded with the specified round mode and round precision, and which requires less hardware that the conventional apparatus for the addition and subtraction of floating point data.

In accomplishing these and other objects, according to one preferred embodiment of the present invention, a floating point data addition and subtraction method includes effecting simultaneously the addition of the first and second mantissas aligned to the same exponent, and the addition of the addition result and the round addition value which is determined in accordance with the round precision, the round mode and the computation result sign, when the operation is the real mantissa addition which is an addition of two floating point data of the same sign or the subtraction of two floating point data of different signs and effecting simultaneously the subtraction of the first and second mantissas aligned to the same exponent, and the addition of the subtraction result and the round addition value uniformly fixed in accordance with the round precision, the round mode, and the computing result sign, when the operation is the real mantissa subtraction which is a subtraction of two floating point data of the same sign or an addition of two floating point data different signs. The computation result is shifted by one bit to be normalized when the computation result is denormalized number. The method further includes inspecting, from the normalized computing result, a plurality of bits including the least significant bit to be determined according to the type of the operation, i.e. the real mantissa addition or real mantissa subtraction, and the round precision. Judgments are made as to judge whether the above described normalized computing result down to the above described least significant bit, determined according to the round precision, conforms with respect to the real mantissa addition or real mantissa subtraction of the first mantissa and the second mantissa rounded to the given precision, whether the carry into the upper bit position from the inspected bits so conform, and only the inspected bits do not conform, whether the carry into the upper bit position from the inspected bits also do not conform. Based on the judgment results, either the processing is completed, or one portion or all portions of the inspected bits of the above described normalized computation result are corrected to complete the processing, or the above described round addition value is added again with respect to the above described normalized computing result to complete the processing.

According to another aspect of the floating point data addition and subtraction method of the invention, when the difference between the exponents of the two floating point data is 0 or 1 and when the real mantissa subtraction is carried out, either shifting is effected to effect normalization with respect to the computing result when the computing result is a denormalized number, or addition of the round addition value, determined uniformly by the round precision and the round mode, is effected when the computing result is a normalized number, so as to complete the processing.

A floating point data addition and subtraction apparatus of another embodiment of the invention includes a round addition value generating means for generating the round addition value determined uniformly according to the type of operation, i.e. either the real mantissa addition, the round precision, the round mode, and the sign of the computing result, and a mantissa addition and subtraction executing means for simultaneously effecting addition of the first and second mantissas aligned to the same exponent and addition of the addition result and the round addition value generated by the round addition value generating means generates when real mantissa addition is carried out, and for simultaneously effecting subtraction of the first and second mantissas aligned to the same exponent and the addition of the subtraction result and the round addition value generated by the round addition value generating means generates when real mantissa subtraction is carried out. The apparatus further includes a normalization means for shifting the computation result to effect normalizing when the computation result is a denormalized number, and a computation result inspecting means for inspecting a plurality of bits including the least significant bit, fixed according to the round precision, from among the bits of the output of the normalization means so as to judge whether the output of the normalization means down to the above described least significant bit conforms with respect to the real mantissa addition or the real mantissa subtraction of the first mantissa and the second mantissa rounded to the given precision, whether the carry into the upper bit portion from the inspected bits conform and the inspected bits only do not conform, and whether the carry into the upper bit portion from the inspected bits also do not conform. The apparatus further includes a round correcting means for correcting one portion or all portions of the bits inspected by the computing result inspecting means with respect to the output of the normalization means.

The floating point data addition and subtraction apparatus of another embodiment of the invention is provided with a mantissa subtraction executing means for effecting subtraction of the first and second mantissas aligned to the same exponent to obtain a computation result, a normalization means for shifting the computation result to effect normalization when the computation result is a denormalized number, a round addition means for adding the round addition value determined uniformly according to the round precision and the round mode to the computation result when the computation result is a normalized number.

Another important object of the present invention is to provide a method and an apparatus for multiplying floating point data which do not require the steps of correcting the bias of the exponent portion, and which is capable of effecting simultaneously within the same adder an addition operation of the round addition values in the mantissa portion or an addition operation for accumulating the partial products, and addition operation of the sum and the carry from the multiplying units, and as a result, which requires fewer processing steps to obtain a product rounded to a specified round precision, and which requires less hardware than the conventional floating point data multiplying apparatus.

In accomplishing the above described object, a method of multiplying floating point data according to an embodiment of the invention is adapted to effect an operation of obtaining a a value which is larger by 1 than a value with an exponent portion of the multiplicand of the floating point format having the biased exponent portion and the exponent portion of the multiplier of the same floating point format being added, and inverting the most significant bit of the above described computation result after the above described computation.

A method of multiplying floating point data according to another embodiment of the invention includes obtaining the product, divided between the sum and the carry, by multiplying the respective mantissa portions of the multiplicand and the multiplier of the floating point data and adding the above described sum, the above described carry, and a round addition value which is determined uniformly according to the round precision, the round mode, the multiplicand sign and the multiplier sign. The method further includes shifting the computation result by 1 bit when the computation result is a denormalized number to normalize the computation result, and inspecting a plurality of bits including the least significant bit, which are determined by the round precision, from among the bits of the normalized computation result to judge whether the normalized computation result down to the above described least significant bit fixed by the round precision conforms with respect to the product of the mantissa of the multiplicand and the mantissa of the multiplier rounded to the given precision, whether the carry into the upper bit portion from the inspected bits conforms and the inspected bits only do not conform, and whether the carry into the upper bit portion from the inspected bits and the bits of the upper bit portion from the inspected bits also do not conform. In accordance with the judgment result, the processing is completed, or one portion or all portions of the inspected bits with respect to the normalized computation result is corrected to complete the processing, or the round addition value is added again with respect to the normalized computation results to complete the processing.

A floating point data multiplying apparatus of another embodiment of the invention includes an exponent adding means for obtaining a value where 1 is added to the sum of the exponent portions of the multiplicand and the multiplier of the floating point data having a biased exponent portion, and a most significant bit correcting means for inverting the most significant bit of the output of the exponent adding means.

A floating point data multiplying apparatus of another embodiment of the invention includes a mantissa multiplying means wherein the bit width of two inputs are together equal to the length of the mantissa portion of the multiplicand and the multiplier of the floating point data, or are longer than the length of the mantissa portion, so as to output the sum and the carry having a bit width which is at least that of the input with respect to the input, and a round adding value generating means for generating the round addition value fixed uniformly according to the round precision, the round mode, and the signs of the two floating point data. The apparatus further includes a mantissa adding means for simultaneously effecting the addition of three elements, namely, the sum output of the above described mantissa multiplying means, the carry output and the round addition value from the round addition value generating means, and a normalization means for shifting the computation result to normalize it when the computation result is a denormalized number. The apparatus further includes a computation result inspecting means for inspecting a plurality of bits including the least significant bit, which are determined by the round precision, from among the bits of the output of the normalization means so as to judge whether the output of the normalization means down to the above described least significant bit determined by the round precision conforms with respect to the product of the mantissa of the multiplicand and the mantissa of the multiplier rounded to the given precision, whether the carry into the upper bit portion from the inspected bits conforms and the inspected bits only do not conform, and whether the carry into the upper bit portion from the inspected bits and the bits of the upper bit portion from the inspected bits do not conform, and a round correcting means for correcting one portion or all the portions of the bits the computation result inspected by the inspecting means with respect to the normalization means.

A floating point data multiplying apparatus of another embodiment of the invention includes a multiplicand retaining means for retaining the mantissa portion of the multiplicand of the floating point data, a multiplier retaining means for retaining the mantissa portion of the multiplier of the floating point data, and a mantissa multiplying means for outputting the sum and the carry having a bit width which is at least that of the input with respect to the input with, at least, one input bit width of two inputs being shorter than the length of the mantissa of the above described multiplicand and the above described multiplier. The apparatus further includes a partial multiplicand selecting means for dividing the most significant bit of the mantissa portion of the multiplicand through the least significant bit retained in the multiplicand retaining means into the plurality of partial mantissa portions of the bit width of the multiplicand input of the mantissa multiplying means when the bit width of the multiplicand input of the mantissa multiplying means is shorter than the length of the mantissa portion of the multiplicand so as to select and output one for each of the processing steps rom among the, and a partial multiplier selecting means for dividing the most significant bit of the mantissa portion of the multiplier retained in the multiplier retaining means through the least significant bit into the plurality of partial mantissa portions of the bit width of the multiplier input of the mantissa multiplying means when the bit width of the multiplier input of the mantissa multiplying means is shorter than the length of the mantissa portion of the multiplier so as to select and output one for each of the processing steps from among them. The apparatus further includes an addition value generating means for generating a round addition value determined uniformly according to the round precision, the round mode and the signs of the two floating point data, and a mantissa adding means for effecting simultaneously the addition of the sum output of the mantissa multiplying means and the carry output and the round addition value at the first step of the processing so as to generate the first partial product, and the addition of the sum output of the mantissa multiplying means and the carry output and the generated partial product, shifted at the step just before the step at its subsequent step, so as to generate a new partial product. The apparatus further includes a shift means for shifting the computation result in the least significant bit direction by the number of the bits to be determine din the position of the partial mantissa portion of the multiplier and the multiplicand multiplied in the mantissa multiplying means, the partial product to be obtained from the mantissa adding means at the first or intermediate step of the processing, to normalizing it when the computation result obtained from the mantissa adding means is a denormalized number at the last step, and a partial product retaining means for retaining, as the input in the mantissa adding means of the next step, the output of the shift means at the first or intermediate step of the processing. the apparatus further includes a computation result inspecting means for inspecting the bits of the shift overflow in the shift means in the first or intermediate step of the processing and a plurality of bits including the least significant bit determined by the round precision from among the bits the output of the shift means in the final step of the processing so as to judge whether the output of the shift means in the final step of the processing down to the least significant bit determined by the round precision conforms with respect to the product of the mantissa of the multiplicand and the mantissa of the multiplier rounded into the given precision, whether the carry into the upper bit portion from the inspected bits conforms and the inspected bits only do not conform, and whether the carry into the upper bit portion from the inspected bits and the bits of the upper bit portion from the inspected bits do not conform, and a round correcting means for correcting one portion or all the portions of the bits inspected by the computation result inspecting means with respect to the output of the shift means.

A further object of the present invention is to provide a method and an apparatus for dividing the floating point data which does not require the steps of correcting the bias of the exponent portion, and which requires less hardware than the conventional floating point data dividing apparatus.

In accomplishing these and other objects, according to another preferred embodiment of the present invention, a method of dividing the floating point data includes obtaining a value which is smaller by 1 than the subtracted value of the exponent portion of the divisor of the floating point data with the biased exponent from the exponent portion of the dividend of the floating point data and inverting the most significant bit of the computation results.

A floating point data division apparatus of another embodiment includes an exponent subtracting means for obtaining a value which is smaller by 1 than a value where the exponent portion of the divisor of the floating point data having a biased exponent is subtracted from the exponent portion of the dividend of the floating point data, and a most significant bit correcting means for inverting the most significant bit of the output of the exponent subtraction means.

BRIEF DESCRIPTION OF THE DRAWINGS

These and other objects and features of the present invention will become apparent from the following description taken in conjunction with the preferred embodiments thereof with reference to the accompanying drawings, in which;

FIGS. 3(a)-(d) are control relation charts of a round correction repeating control circuit 109 in the rounding to the nearest even mode of the apparatus in the first and second embodiments of the present invention;

FIGS. 4(a)-(d), FIGS. 5(a)-(d) and FIG. 6(a)-(d) are control relation charts of the round correction repeating control circuit 109 in the directed rounding toward plus mode or the directed rounding toward minus mode of the apparatus in the first and second embodiments of the present invention;

FIGS. 7(a)-(d) are control relation charts of the carry control apparatus 115 of the apparatus in the second embodiment of the present invention;

FIGS. 9(a)-(b) are input, output relation charts of the round value generating circuit 106 of the apparatus in the first embodiment of the present invention;

FIG. 10 is a sign and operation relation chart of operation of the adder and the method of deciding the sign of the computing result of the apparatus in the first and second embodiments of the present invention;

FIG. 11 is a chart illustrating the existence and absence of the round addition of the conventional floating point data apparatus and the apparatus in the first and second embodiment of the present invention;

FIGS. 12(a)-(f) are principle charts of the carry generation at the time of round addition upon the rounding to nearest even mode, the positive directed rounding toward plus mode and directed rounding toward minus mode of the apparatus in the first and second embodiments of the present invention;

FIGS. 17(a)-(b) aré control relation charts of the mantissa correction control circuit 224 in the third embodiment;

DETAILED DESCRIPTION OF THE INVENTION

Figure 1:
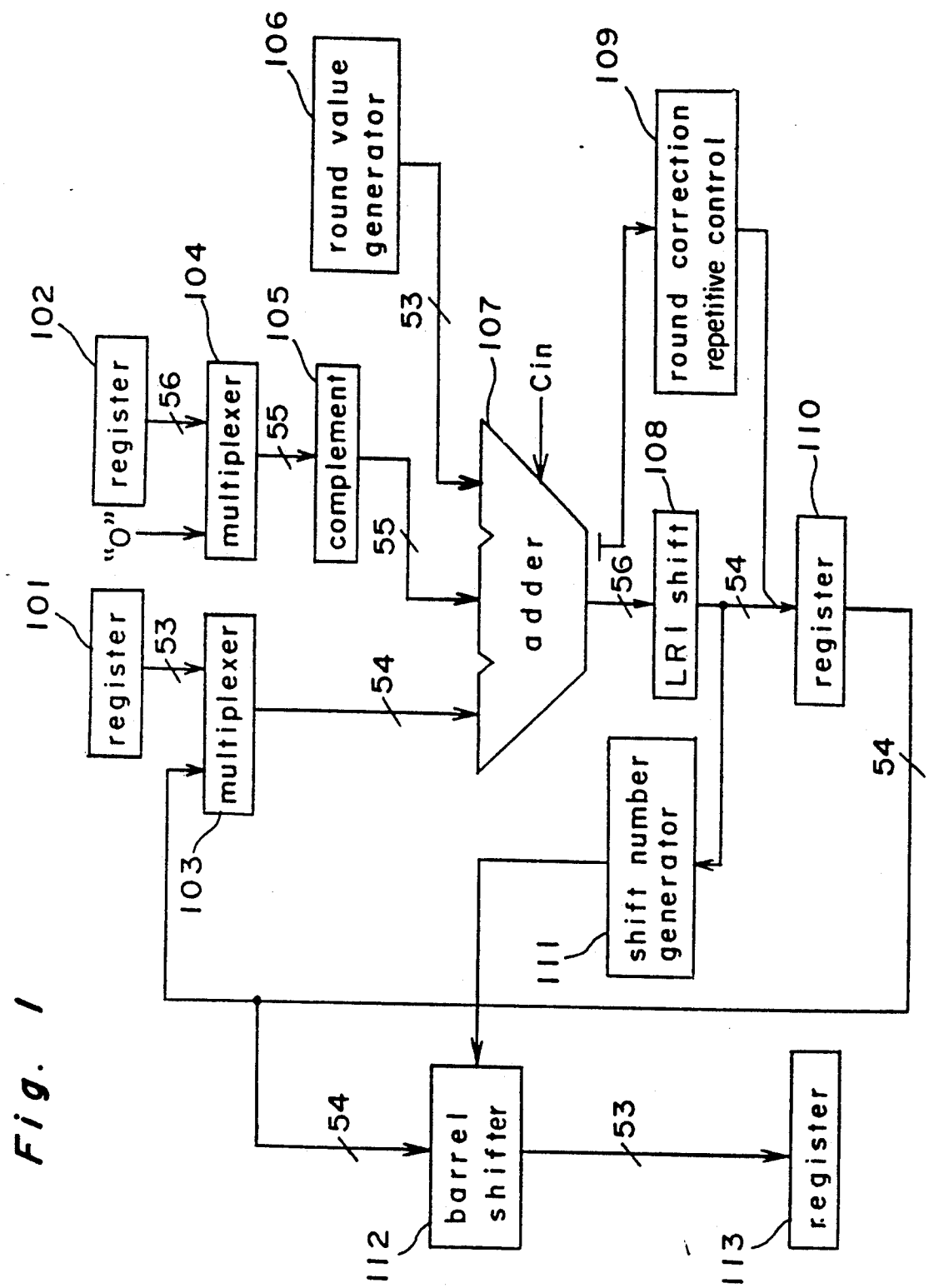
FIG. 1 is a block diagram of a floating point data addition and subtraction apparatus in a first embodiment of the present invention.

Before the description of the present invention proceeds, it is to be noted that like parts are designated by like reference numerals throughout the accompanying drawings.

FIG. 1 shows a block diagram of the floating point data addition and subtraction apparatus in a first embodiment of the present invention. In FIG. 1, reference numeral 101 denotes a register for accommodating a first mantissa of one of two floating point data having first exponent which is not smaller than a second exponent of the other of the two floating point data, reference numeral 102 denotes a register for accommodating a second mantissa of the other of the two floating point data which is aligned to the first exponent, and reference numeral 103 denotes a multiplexor for selecting a register 110 (to be described later) when the round correction repeating control circuit 10 (to be described later) has commanded the insertion of a new processing step, and for otherwise selecting the register 101 during normal computing. Reference numeral 104 denotes a multiplexor for selecting the constant 0 when the round correction repeating control circuit 109 (to be described later) has commanded the insertion of the new processing step, and for otherwise selecting the register 102 during normal computing. Reference numeral 105 denotes a complimenter for taking the 1's complement of the output of the multiplexor 104 upon a subtracting operation. Reference numeral 106 denotes a round value generating circuit for determining round addition position in accordance with the exponent difference of the two floating point data, the type of the arithmetic operation and the round mode so as to generate data in which the round addition bit is "1" and the other bits are "0". Reference numeral 107 denotes an adder which is adapted to simultaneously execute the temporary round and arithmetic operations by adding the output of the multiplexor 103, the output of the complimenter 105 and the output of the round value generating circuit 106, with the carry input (Cin) being "0" during the addition operation and being "1" during the subtraction operation. Reference numeral 108 is a LR1 shifter which shifts by 1 bit the output of the adder 107 in the least significant bit direction (hereinafter referred to as "rightward") when the bit having the weight of $2^1$ in the output of the adder 107 in the most significant bit direction (hereinafter referred to as "leftward") when the bit having the weight of $2^1$ and the bit having the weight of $2^0$ are both "0" and which otherwise outputs the output of the adder 107 as is. Reference numeral 109 is a round correction repeating control circuit which judges whether or not the rounding effected by the adder 107 is correct and which instructs the accommodation of the corrected value in the register 110 (to be described later) and the completion of the processing, when the correct round result may be obtained only by the correction of the least significant bit or the least significant bit and one upper bit, and instructs the insertion of the processing step when the readdition of the round value is required to be effected so as to obtain the correct round results, Reference numeral 110 is a register for accommodating the output of the LR1 shifter 108. Reference numeral 111 is a shift number generating circuit for generating a bit shift number for normalizing the value retained in the register 110. Reference numeral 112 is a barrel shifter which is adapted to effect a bit shifting operation in accordance with the bit shift number generated by the shift number generating circuit 111 for normalizing the output of the register 110. Reference numeral 113 is a register for accommodating the output of the barrel shifter 112.

FIGS. 3(a)-(d) are control relation charts of the round correction repetitive control circuit 109 shown in FIG. 1 when the rounding mode is the rounding to the nearest even mode.

When the addition of two floating point data of the same sign or the subtraction of two floating point data of different signs (hereinafter referred to as mantissa addition) are effected, and the rounding precision is the single precision, the bit correction of the output of the adder 107 and readdition of the round addition value are determined from the bits having the weights of $2^1$, $2^{-22}$, $2^{-23}$, $2^{-24}$ in the output of the adder 107 and the sticky bit S which is the logical OR of the bit having the weight of $2^{-25}$, or lower, as shown in FIG. 3(a). When the mantissa addition is carried out and the rounding precision is the double precision, the bit correction of the output of the adder 107 and the readdition of the round addition value are determined from bits having the weight of $2^1$, $2^{-51}$, $2^{-52}$, $2^{-53}$ of the output of the adder 107 and the sticky bit S which is logical OR of the bits, having the weight of $2^{-54}$, or lower, as shown in FIG. 3(b). When the subtraction of two floating point data of the same sign or the addition of two floating point data of different signs (hereinafter referred to as mantissa subtraction) are carried out, and the rounding precision is the single precision, the bit correction of the output of the adder 107 and the readdition of the round addition value are determined from bits having the weights of $2^0$, $2^{-23}$, $2^{-24}$, $2^{-25}$ in the output of the adder 107, and the sticky bit S which is the logical OR of the bit having the weight of $2^{-26}$, or lower, as shown in FIG. 3(c). When the mantissa subtraction is executed, and the round precision is the double precision, the bit correction of the output of the adder 107 and the readdition of the round addition value are determined from bits having the weights of $2^0$, $2^{-52}$, $2^{-53}$, $2^{-54}$ in the output of the adder 107 and the sticky bit S which is the logical OR of the bit having the weight of $2^{-55}$, or lower, as shown in FIG. 3(d).

FIGS. 4(a)-(d) are control relation charts of the round correction repetition control circuit 109 showing in FIG. 1 when the rounding mode is the directed rounding toward plus mode, with the sign of the computation result being positive.

When the mantissa addition is executed, with the round precision being the single precision, the bit correction of the output of the adder 107 and the readdition of the round addition value are determined from the bits having the weights of $2^1$, $2^{-22}$, $2^{-23}$, $2^{-24}$ in output of the adder 107 and the sticky bit S which is the logical OR of the bit having the weight $2^{-25}$, or lower, as showing in FIG. 4(a). When the mantissa addition is carried out and the rounding precision is the double precision, the bit correction of the output of the adder 107 and the readdition of the round addition value are determined from bits having the weights of $2^1$, $2^{-51}$, $2^{-52}$, $2^{-53}$ in the output of the adder 107 and the sticky bit S which is the logical OR of the bit having the weight of $2^{-54}$, or lower, as shown in FIG. 4(b). When the mantissa subtraction is executed, and the rounding precision is the single precision, the bit correction of the output of the adder 107 and the readdition of the round addition value are determined from bits having the weights of $2^0$, $2^{-23}$, $2^{-24}$, $2^{-25}$ in the output of the adder 107, and the sticky bit S which is the logical OR of the bit having the weight of $2^{-26}$, or lower, as shown in FIG. 4(c). When the mantissa subtraction is executed, and the rounding precision is the double precision, the bit correction of the output of the adder 107 and the readdition of the round value are determined from bits having the weights of $2^0$, $2^{-52}$, $2^{-53}$, $2^{-54}$ in the output of the adder 107 and the sticky bit S which is the logical OR of the bit having the weight of $2^{-55}$, or lower, as shown in FIG. 4(d).

FIGS. 9(a) and (b) are input, output relation charts of the round value generating circuit 106 shown in FIG. 1. The round addition value is determined in accordance with the rounding mode, the sign of the computation result, the type of the arithmetic operation, and whether or not the step is round readdition. The round value generating circuit 106 generates the round addition value, in which the round addition bit has a value "1" and the remaining bits have a value "0", in accordance with FIG. 9(a) when the rounding precision is the single precision, and in accordance with FIG. 9(b) when the rounding precision is the double precision.

The operating principle of the floating point data addition and subtraction apparatus of the present embodiment constructed as hereinabove will be described. A case where the rounding precision is the single precision is shown by way of example, while the double precision operation is based on the same principles.

Assume that the mantissa portions of the augend (or minuend) and the addend (or subtrahend) are f1, f2 and the exponent portions of the augend (or minuend) and the addend (or subtrahend) are e1, e2 (wherein $e1 \leq e2$), and the mantissa portion A of the sum upon mantissa addition is expressed by $$A = f1 + 2^{-(e1-e2)} f2$$

When the value range of the normalized mantissa portions f1, f2 are $$2^0 \leq f1 \leq 2^1 - 2^{-23} \quad 2^0 \leq f2 \leq 2^1 - 2^{-23}$$

then the value range of A is $$2^0 \leq A \leq 2^1 - 2^{-23} + 2^1 - 2^{-23} = 2^2 - 2^{-22}$$

$$2^0 \leq A \leq 2^1 + 2^0 + 2^{-1} + \ldots + 2^{-22}$$

$$1.0_{(2)} < a < 11.1111\ldots11_{(2)}$$

The shift number necessary for normalization after the mantissa addition becomes 1 bit rightward at the maximum. Incidently, the subscript (2) indicates that the value is shown as a binary digit expression.

Also, the mantissa portion A denoting the difference upon mantissa subtraction is shown by $$A = f1 - 2^{-(e1-e2)} f2$$

Referring to the value of $e1 - e2$:

(1) when $e1 - e2 = 0$ $$0 \leq A \leq 2^1 - 2^{-23} = 2^0 + 2^{-1} + \ldots + 2^{-22} + 2^{-23}$$

$$0 \leq A \leq 1.1111\ldots11_{(2)}$$

and the shift number necessary for the normalization after the mantissa subtraction becomes 0 bits at the minimum and 23 bits leftward at the maximum;

(2) when $e1 - e2 = 1$ $$2^0 - 2^{-1} \times (2^1 - 2^{-23}) \leq A \leq 2^1 - 2^{-23} - 2^{-1} \times 2^0$$

$$0.000\ldots001_{(2)} \leq A \leq 1.01111\ldots111_{(2)}$$

and the shift number necessary for normalization after the mantissa subtraction becomes 0 bits at the minimum and 24 bits leftward at maximum;

(3) when $e1 - e2 = 2$ $$2^0 - 2^{-2} \times (2^1 - 2^{-23}) \leq A \leq 2^1 - 2^{-2} \times 2^0$$

$$0.100\ldots001_{(2)} \leq A \leq 1.10111\ldots111_{(2)}$$

and the shift number necessary for normalization after the mantissa subtraction becomes 1 bit leftward at maximum;

(4) when $e1 - e2 = 3$ $$2^0 - 2^{-3} \times (2^1 - 2^{-23}) \leq A \leq 2^1 - 2^{-23} - 2^{-3} \times 2^0$$

$$0.11\ldots001_{(2)} \leq A \leq 1.11011\ldots111_{(2)}$$

The shift number necessary for normalization after the mantissa subtraction becomes 1 bit leftward at the maximum.

Likewise, when $e1 - e2 \geq 4$, the shift number necessary for normalization after the mantissa subtraction becomes 1 bit leftward at the maximum. Thus, when $e1 - e2 \geq 2$, the shift number necessary for normalization after the mantissa subtraction becomes 1 bit leftward at the maximum.

As described above, at the time of mantissa addition or at the time of mantissa subtraction the shift of 2 bits or more after the mantissa computation is not necessary, except when the exponent difference is 0 or 1 and mantissa subtraction is executed. Upon mantissa addition, the result in the bit having the weight of $2^{-22}$ or the bit having the weight of $2^{-23}$ before normalization becomes the least significant bit (L). Upon mantissa subtraction, the result in the bit having the weight of $2^{-23}$ or the bit having the weight of $2^{-24}$ becomes the least significant bit (L). Accordingly, simultaneously with the addition or subtraction computation, at the time of the mantissa addition or at the time of the mantissa subtraction (except for where the exponent difference is 0 or 1), the rounding is effected at the positions of these bits, and thereafter a 1 bit normalized shift operation need only be effected rightward or leftward.

Figure 13A:
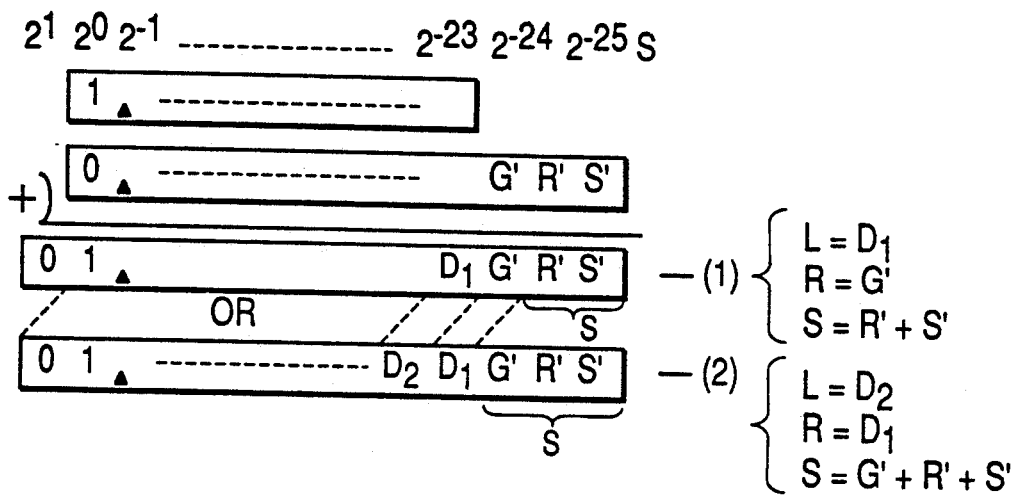
FIGS. 13(a)-(b) are views of the addition and subtraction operations carried out in the apparatus in the first and second embodiments of the present invention.
Figure 13B:
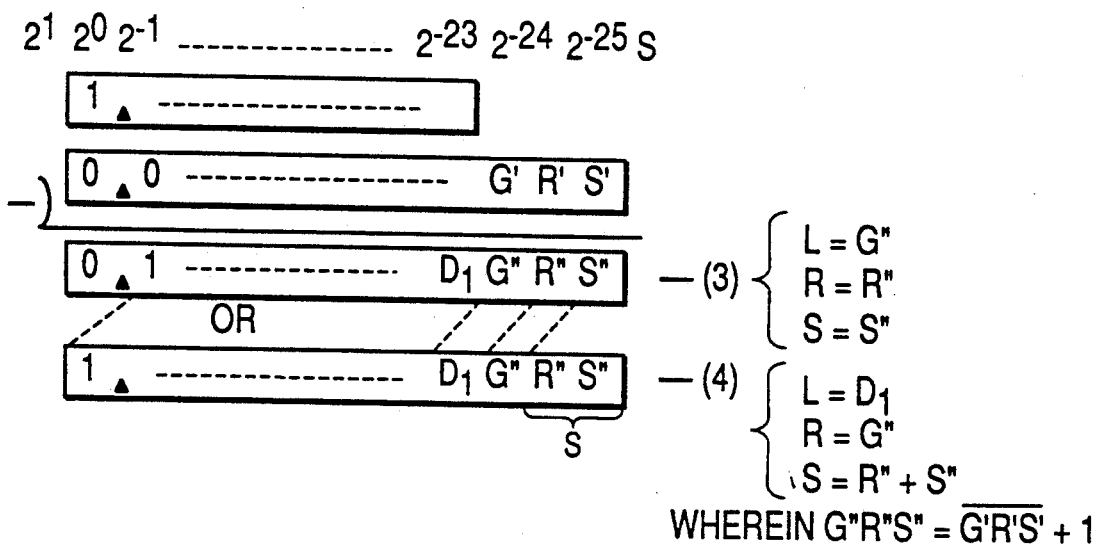

Only at the time of the mantissa subtraction when the exponent difference is 0 or 1, is the shift of 2 or more bits necessary after the computation. When the exponent difference is 0, the alignment shift operation is not effected before the computation, so that an effective value is not provided which is lower than the least significant bit and the rounding is not necessary. When the exponent difference is 1, the alignment shift number before the computation is 1 bit, so that the effective value is provided only 1 bit lower (round bit R) than the least significant bit. If the 1 bit having the weight $2^0$ is 0, the round bit is moved into the least significant bit or higher by the normalization shift, so that the rounding is not necessary after the normalization. Therefore, when the exponent difference is 0 or 1 upon the mantissa subtraction, the shift for normalization or rounding need only be effected at most after the computation. The position of the least significant bit (L) upon mantissa addition is shown in FIG. 13(a), and the position of the least significant bit (L) upon mantissa subtraction, except for when the exponent difference is 0 or 1, is showing in FIG. 13(b).

A principle for realizing the rounding to nearest even mode is shown hereinafter. In order to effect rounding to the nearest even value, whether addition to the least significant bit is necessary is determined by whether the bit to be added, namely, the bit (round bit R) smaller by 1 than the least significant bit (L), is 1 or 0. When the round bit is 0, the data before being rounded and the data after being rounded are the same. When the round bit is 1, 1 is to be added to the least significant bit. The round addition is automatically realized by the addition of 1 to the round bit, because the carry from the round bit works as the value added to the least significant bit. Since the bits which are smaller than the round bit are not judged in this method, the rounding operation may be effected to the larger value according to the rounding addition even when the round bit is 1 and the bits smaller than it are 0, namely when the value is a tie value. However, the ANSI/IEEE Standard for Binary Floating-Point Arithmetic P754 stipulates that a tie value is to be rounded to the even number. As shown in the column RN of FIG. 11, even if the round bit is 1 when the sticky bit showing the portion smaller than the round bit is 0, which is a tie value, the value is rounded so that least significant bit may be normally an even number. More concretely, when the least significant bit is 1, the rounding addition is effected. When the least significant bit is 0, the round addition is not effected.

Here, the carry propagation to the least significant bit when the rounding addition has been effected to the round bit is noteworthy. When the round bit is 1, the round bit becomes 0 as a result of the rounding addition and the carry generated by the rounding addition is added to the least significant bit. When the least significant bit is 1, the carry is propagated to the upper bit as shown in FIG. 12(a). When the least significant bit is 0, the carry is not propagated, thus resulting in the least significant bit being 1 as showing in FIG. 12(b). When the round bit and the sticky bit are both 0 after the addition has been effected unconditionally upon the round bit, the tie value which is 1 in the round bit and 0 in the sticky bit may be exactly rounded to the even number by the correction of the least significant bit to 0. Namely, if the position of the round bit is determined before the operation, the rounding and the computation may be executed at the same time.

1 is temporarily added to the bit having the weight $2^{-34}$ at the time of mantissa addition and 1 is temporarily added to the bit having the weight of $2^{-25}$ at the time of mantissa subtraction (except when the exponent difference is 0 or 1) and the operation is effected. Thereafter, the real round bit is determined by the bits having the weight of $2^1$ and $2^0$ in the operation result so as to realize the rounding by the correction of the round results temporarily effected. In accordance with the bits having the weights of $2^{-22}$, $2^{=23}$, $2^{-24}$ of the result temporarily round added, and 1 bit which is the logical OR of bits smaller than them at the time of mantissa addition, or the bits having the weights of $2^{-22}$, $2^{-23}$, $2^{-24}$ of the result temporarily round added, and 1 bit which is the logical OR of bits smaller than them at the time of mantissa subtraction, the following are judged:

(a) the case where the correct result is obtained;
(b) the correction of the bit having the weight of $2^{-22}$ or $2^{-23}$;
(c) the case where the correct result is not obtained only in the correction of the bit having the weight of $2^{-22}$ or $2^{-23}$. In the case (b), the bit is corrected. In the case of (c), the same rounding is added again, and the correct computing result is obtained.

The operation of the floating point data addition and subtraction apparatus in the present embodiment will be described hereinafter. The description is divided in the sequence of the rounding to nearest even mode, the directed rounding toward plus mode and the directed rounding toward minus mode, the directed rounding toward zero mode. Further, the round precision is divided in the single precision and the double precision in each of the modes.

1. Rounding to the Nearest Even Mode 1-1 When the augend (or minuend) and the addend (or subtrahend) are the single precision format, and the sum (or the difference) is rounded into single precision:

(1) Pre-Processing Start

In accordance with the exponents and the signs of two floating point data and whether an addition or subtraction operation has been instructed, the operation type, i.e. mantissa addition or mantissa subtraction, and the sign of the computation result are determined as shown in the sign and operation relation chart of FIG. 10. The mantissa of one of the augend (or minuend) and the addend (or subtrahend) having a first exponent which is not smaller than a second exponent of the other is accommodated in the register 101. The mantissa of the other of the augend (or minuend) and the addend (or subtrahend) is aligned to the first exponent and is accommodated in the register 102. The bits which are split at the alignment are accommodated in the register 102 together as the round bit (R) having the weight of $2^{-24}$ at a bit which is lower by 1 bit than the least significant bit (L) and the sticky bit (S) which is the logical OR of the bits having the weight of $2^{-25}$ or lower.

(2) Step 1

* Mantissa addition

The output of the register 101 is selected by the multiplexor 103, and the output of the register 102 is selected by the multiplexor 104. In the round value generating circuit 106, data is generated in which the bit having the weight of $2^{-24}$ is 1 and the remaining bits are 0. The complementer 105 outputs the multiplexor 104 output as it is, and the adder 107 executes (register 1)+(register 2)+(round addition value) with Cin being made 0. When the bit having the weight of $2^1$ in the output of the adder 107 is 1, the LR1 shifter 108 effects a 1 bit shift to the right. Responsive to the round correction repetitive control circuit 109, according to the bits having the weight of $2^{-25}$ in the output of the adder 107 and the S bit, the output of the LR1 shifter 108 is accommodated in the register 110 with the bit having the weight of the $2^{-23}$ inverted when the correction signal shown in FIG. 3(a) is 01, and without correction when the correction signal is 00. When the rerounding signal of the round correction repetitive control circuit 109 is 1, the insertion of a new step for executing the readdition of the round value is instructed. On the other hand, when the rerounding signal is 0, this step completes the computing operation with the rounding operation being effected in accordance with the round precision.

* Mantissa subtraction (except when the exponent 0 or 1)

The output of the register 101 is selected by the multiplexor 103, and the output of the register 102 is selected by the multiplexor 104. In the round value generating circuit 106, data is generated in which the bit having the weight of $2^{-25}$ is 1 and the remaining bits are 0. The complementer 105 inverts the output of the multiplexor 104, and the adder 107 executes (register 1)−(register 2)+(round addition value) with Cin being made 1. When the bit having the weight of 2 in the output of the adder 107 is 0, the LR1 shifter 108 effects a 1 bit shift to the left. 1 bit (S) which is the logical OR of bits having the weight of $2^{-26}$ in the output of the adder 107, or lower, is generated. Responsive to the round correction repetitive control circuit 109, according to the bits having the weights of the $2^0$, $2^{-23}$, $2^{-24}$, $2^{-25}$ in the output of the adder 107 and the S bit, the output of the LR1 shifter 108 is accommodated in the register 110 with the bit having the weight of the $2^{-23}$ being inverted when the correction signal shown in FIG. 3(c) is 01, and without correction when the correction signal is 00. When the correction signal is 00, the output of the LR1 shifter 108 is accommodated as is into the register 110. When the rerounding signal of the round correction repetitive control circuit 109 is 1, the insertion of a new step for executing the readdition of the round value is instructed. On the other hand, when the rerounding signal is 0, this step completed the computing operation with the rounding operation being effected in accordance with the round precision.

*Mantissa subtraction when the exponent different is 0 to 1

The output of the register 101 is selected by the multiplexor 103, and the output of the register 102 is selected by the multiplexor 104. In the round value generating circuit 106, data having all 0 bits are generated. The complementer 105 inverts the output of the multiplexor 104, and the adder 107 executes (register 1)−(register 2) with Cin being made 1. When the bit having the weight of 2 in the output of the adder 107 is 0, the LR1 shifter 108 effects a 1 bit shift to the left. The round correction competitive control circuit 109 instructs the insertion of the step for rounding when the three bits having the weights of the $2^0$, $2^{-23}$, $2^{-24}$ in the output of the adder 107 are 1, respectively. The shift number generating circuit 111 generates the shift number necessary for normalizing the output of the LR1 shifter 108. The insertion of the step for normalization is instructed when the shift number is not 0. When there is no insertion of the step for rounding and no insertion of the step for normalization, respectively, the computation is completed.

(3) Insertion Step (carried out only when the insertion of a step has been instructed)

*Mantissa addition

The output of the register 110 is selected by the multiplexor 103, the constant 0 is selected by the multiplexor 104. The adder 107 adds the output of the multiplexor 103, the output of the complementer 105 (which is the output of the multiplexor 104 as is), and the output generated by the round value generating circuit 106 in the step 1 which is data in which the bit having the weight $2^{-24}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value as is is accommodated in the register 110 to complete the processing.

*Mantissa substraction (except for when the exponent difference is 0 or 1

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output of the round value generating circuit 106 of the step 1 which is data in which the bit having the weight of $2^{-25}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction when the exponent difference is 0 or 1

When the insertion of the step for normalization has been instructed by the shift number generating circuit 111, the barrel shifter 112 shifts the output of the register 110 to the left by the bit shift number generated by the shift number generating circuit 111. The bit shifted result being accommodated in the register 113 to complete the processing.

When the insertion of the step for rounding has been instructed by the round correction repetitive control circuit 109, the output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output of the round value generating circuit 106 which is data in which the bit having the weight of $2^{-23}$ is 1 and the remaining bits are 0. When the bit having the weight of $2^1$ in the output of the adder 107 is 1, the LR1 shifter 108 effects a 1 bit shift to the right When the bit having the weight of $2^1$ is 0, the value is accommodated as is in the register 110 to complete the processing.

1-2 When the augend (or minuend) and the addend (or subtrahend) are the double precision format, and the sum (or the difference) is rounded into double precision:

(1) Pre-Processing Start

In accordance with the exponents and signs of the two floating point data and whether addition or subtraction is to be carried out, the type of the operation, i.e. mantissa addition or the mantissa subtraction, and the sign of the computation result are determined as shown in the sign and operation relation chart of FIG. 10. The mantissa from the one of the augend (or minuend) and the addend (or subtrahend) which does not have a smaller exponent than the other is accommodated in the register 101. The mantissa of the other of the augend (or minuend) and the addend (or subtrahend) is aligned to the exponent which is not smaller and is accommodated in the register 102. The bits which are split at the alignment are accommodated in the register 102 together with the round bit (R) having the weight of the $2^{-53}$ at a bit which is lower by 1 bit than the least significant bit (L) and the sticky bit (S) which is the logical OR of the bits having the weight of $2^{-54}$ or lower.

(2) Step 1

*Mantissa addition

The output of the register 101 is selected by the multiplexor 103, and the output of the register 102 is selected by the multiplexor 104. In the round value generating circuit 106, data is generated in which the bit having the weight of $2^{-53}$ is 1 and the remaining bits are 0. The complementer 105 outputs the multiplexor 104 output as is, and the adder 107 executes (register 1)+(register 2)+(round addition value) with Cin being made 0. When the bit having the weight of $2^1$ in the output of the adder 107 is 1, the LR1 shifter 108 effects a 1 bit shift to the right. 1 bit (S) which is the logical OR of bits having the weight of $2^{-54}$ in the output of the adder 107 is generated. Responsive to the round correction repetitive control circuit 109, in accordance with the bits having the weights of $2^1$, $2^{-51}$, $2^{-52}$, $2^{-53}$ in the output of the adder 107 and the S bit, the output of the LR1 shifter 108 is accommodated in the register 100 with the bit having the weight of the $2^{-52}$ inverted when the correction signal shown in FIG. 3(b) is 01 and without correction when the correction signal is 00. When the rerounding signal of the round correction repetitive control circuit 109 is 1, the insertion of the new step for executing the readdition of the round value is instructed. On the other hand, when the rerounding signal is 0, this step completes the computing operation with the rounding operation being effected in accordance with the round precision.

*Mantissa subtraction (except for when the exponent difference is 0 or 1

The output of the register 101 is selected by the multiplexor 103, and the output of the register 102 is selected by the multiplexor 104. In the round value generating circuit 106, data is generated in which the bit having the weight of $2^{-54}$ is 1 and the remaining bits are 0. The complimenter 105 inverts the output of the multiplexor 104. The adder 107 executes (register 1)−(register 2)+(round addition value) with Cin being made 1. When the bit having the weight of $2^0$ in the output of the adder 107 is 0, the LR1 shifter 108 effects a 1 bit shift to the left. 1 bit (S) which is the logical OR of bits having the weight of $2^{-55}$ in the output of the adder 107, or lower, is generated. Responsive to the round correction repetitive control circuit 109, in accordance with the bits having the Weights of $2^0$, $2^{-52}$, $2^{-53}$, $2^{-54}$ in the outputs of the adder 107 and the S bit, the output of the LR1 shifter 108 is accommodated in the register 110 with the bit having the weight of the $2^{-52}$ inverted when the correction signal shown is 00. When the rerounding signal of the round correction repetitive control circuit 109 is 1 the insertion of the new step for executing the readdition of the round value is instructed. On the other hand, when the rerounding signal is 0, this step completes the computing operation with the rounding operation being effected in accordance with the round precision.

*Mantissa subtraction when the exponent difference is 0 or 1

The output of the register 101 is selected by the multiplexor 103, and the output of the register 102 is selected by the multiplexor 104. In the round value generating circuit 106, data in which all bits are 0 are generated. The complimenter 105 inverts the output of the multiplexor 104. The adder 107 executes (register 1)−(register 2) with Cin being made 1. When the bit having the weight of $2^0$ in the output of the adder 107 is 0, the LR1 shifter 108 effects a 1 bit shift to the left. In the round correction competitive control circuit 109, the insertion of the step for the rounding is instructed when the three bits having the weights of the $2^0$, $2^{-52}$, $2^{-53}$ in the output of the adder 107 are 1, respectively. In the shift number generating circuit 111, the shift number necessary for normalizing the output of the LR1 shifter 108 is generated. The insertion of the step for normalization is instructed when the shift number is not 0. When there is no insertion of the step for rounding and no insertion of the step for normalization, the computation is completed by this step.

(3) Insertion Step (carried out only when insertion of a step has been instructed)

*Mantissa addition

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 in the step 1 which is data in which the bit having the weight of $2^{-53}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction (except for when the exponent difference is 0 or 1

The output of the register 110 is selected by the multiplexor 103, and the constant 0 is selected by the multiplexor 104. The adder 107 adds output of the multiplexor 103, the output of the complementer 105 (which is the output of the multiplexor 104 as is), the output generated by the round value generating circuit 106 in the step 1 which is data in which the bit having the weight of $2^{-54}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction when the exponent difference is 0 or 1

When the insertion of the step for normalization has been instructed by the shift number generating circuit 111, the barrel shifter 112 shifts the output of the register 110 to the left by the bit shift number generated by the shift number generating circuit 111. The bit shifted result is accommodated in the register 113 to complete the processing.

When the insertion of the step for rounding has been instructed by the round correction repetitive control circuit 109, the output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 which is data in which the bit having the weight of $2^{-52}$ is 1 and the remaining bits are 0. When the bit having the weight of $2^1$ in the output of the adder 107 is 1, the LR1 shifter 108 effects a 1 bit shift to the right. When the bit having the weight of $2^{-1}$ is 0, the value is accommodated as is in the register 110 to complete the processing.

2. Directed Rounding Toward Plus Mode And Directed Rounding Toward Minus Mode 2-1 When the augend (or minuend) and the added (or subtrahend) are the single precision format, and the sum (or the difference) is rounded into single precision:

(1) Pre-Processing Start

In accordance with the exponents and the signs of two floating point data and whether addition or subtraction is to be carried out, the type of the operation, i.e. mantissa addition or the mantissa subtraction, and the signs of the computation result are determined as shown in the sign and operation relation chart of FIG. 10. When the sign of the computation result is negative in the directed rounding toward plus mode or the sign of the computation result is positive in the directed rounding toward minus mode, the operation is effected in accordance with the operation of the directed round toward zero mode to be described later. When the sign of the computation result is positive in the directed round toward plus mode and when the sign of the computation result is negative in the directed rounding toward minus mode, the operation is effected as follows. The mantissa of one of the augend (or minuend) and the addend (or subtrahend) having a first exponent which is not smaller than a second exponent of the other is accommodated in the register 101. The mantissa of the other of the augend (or minuend) and the addend (or subtrahend) is aligned to the first exponent and is accommodated in the register 102. The bits which are split at the alignment are accommodated in the register 102 together as the round bit (R) having the weight of $2^{-24}$ at a bit which is lower by 1 bit than the least significant bit (L) and the sticky bit (S) which is the logical OR of the bits having the weight of $2^{-25}$ or lower.

(2) Step 1

*Mantissa addition

The output of the register 101 is selected by the multiplexor 103, and the output of the register 102 is selected by the multiplexor 104. In the round value generating circuit 106, data is generated in which the bit having the weight of $2^{-24}$ is 1 and the remaining bits are 0. The complementer 105 outputs the multiplexor 104 output as is, and the adder 107 executes (register 1)+(register 2)+(round addition value) with Cin being made 0. When the bit having the weight of $2^1$ in the output of the adder 107 is 1, the LR1 shifter 108 effects a 1 bit shift to the right. 1 bit (S) which is the logical OR of bits having the weight of $2^{-25}$ in the output of the adder 107, or lower, is generated. Responsive to the correction repetitive control circuit 109, in accordance with the bits having the weights of the $2^1$, $2^{-22}$, $2^{-23}$, $2^{-24}$ in he output of the adder 107 and the S bit, the output of the LR1 shifter 108 is accommodated in the register 110 with the bit having the weight of the $2^{-23}$ being inverted when the correction signal shown in FIG. 4(a) is 01, with the bits having the weight $2^{-22}$, $2^{-23}$ in the output of the LR1 shifter 108 being inverted when correction signal is 10, and without correction when the correction signal is 00. When the rerounding signal of the round correction repetitive control circuit 109 is 1, the insertion of the new step for executing the readdition of the round value is instructed. On the other hand, when the rerounding signal is 0, this step completes the computing operation with the rounding operation being effected in accordance with the round precision.

*Mantissa subtraction (except for when the exponent difference is 0 or 1

The output of the register 101 is selected by the multiplexor 103, and the output of the register 102 is selected by the multiplexor 104. In the round value generating circuit 106, data is generated in which the bit having the weight of $2^{-25}$ is 1 and the remaining bits are 0. The complementer 105 inverts the output of the multiplexor 104. The adder 107 executes (register 1)−(register 2)+(round addition value) with Cin being made 1. When the bit having the weight of $2^0$ in the output of the adder 107 is 0, the LR1 shifter 108 effects a 1 bit shift of the left. 1 bit (S) which is the logical OR of bits having the weight of $2^{-26}$ in the output of the adder 107, or lower, is generated. Responsive to the round correction repetitive control circuit 109, in accordance with the bits having the weights of $2^0$, $2^{-23}$, $2^{-24}$, $2^{-25}$ in the output of the adder 107 and the S bit, the output of the LR1 shifter 108 is accommodated in the register 110 with the bit having the weight of the $2^{-23}$ being inverted when the correction signal shown in FIG. 4(c) is 01, with the bits having the weights of $2^{-22}$ and $2^{-23}$ in the output of the LR1 shifter 108 being inverted when the correction signal is 10, and without correction when the correction signal is 00. When the rerounding signal of the round correction repetitive control circuit 109 is 1, the insertion of the new step for executing the readdition of the round value is instructed. On the other hand, when the rebound signal is 0, this step completed the computer operation with the rounding operation being effected in accordance with the round precision.

*Mantissa subtraction when the exponent difference is 0 or 1

The output of the register 101 is selected by the multiplexor 103, and the output of the register 102 is selected by the multiplexor 104. In the round value generating circuit 106, data in which all bits are 0 is generated. The complementer 105 inverts the output of the multiplexor 104. The adder 107 executes (register 1)−(register 2) with Cin being made 1. When the bit having the weight of $2^0$ in the output of the adder 107 is 0, the LR1 shifter 108 effects a 1 bit shift to the left. In the round correction competitive control circuit 109, the insertion of the step for rounding is instructed when the two bits having the weights of the $2^0$, $2^{-24}$ in the adder 107 are 1, respectively. The shift number generating circuit 111 generates the shift number necessary for normalizing the output of the LR1′ shifter 108. The insertion of the step for normalization is instructed when the shift number is not 0. When there is no insertion of the step for rounding and no insertion of the step for normalization, the computation is completed by this step.

(3) Insertion Step (carried out only when the insertion of a step has been instructed):

*Mantissa addition

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 in step 1 which is data in which the bit having the weight of $2^{-24}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction (except for when the exponent difference is 0 or 1

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 in step 1 which is data in which the bit having the weight of $2^{-25}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction when the exponent different is 0 or 1

When the insertion of the step for normalization has been instructed by the shift number generating circuit 111, the barrel shifter 112 shift the output of the register 110, to the left by the bit shift number generated by the shift number generating circuit 111. The bit shifted result is accommodated in the register 113 to complete the processing.

When the insertion of the step for rounding has been instructed by the round correction repetitive control circuit 109, the output of the register 110 is selected by the multiplexor 103, and the constant 0 is selected by the multiplexor 104. The adder adds the output of the multiplexor 103, the output of the complementer 105 (which is the output of the multiplexor 104 as is), and the output generated by the round value generating circuit 106 which is data in which the bit having the weight of $2^{-23}$ is 1 and the remaining bits are 0. When the bit having the weight of $2^1$ in the output of the adder 107 is 1 the LR1 shifter 108 effects a 1 bit shift to the right. When the bit having the weight of $2^1$ is 0, the value is accommodated as is in the register 110 to complete the processing.

2-2 When the augend (or minuend) and th addend (or subtrahend) are the double precision format, and the sum (or the difference) is rounded into double precision:

(1) Pre-Processing Start

In accordance with the exponents and the signs of two floating point data and whether addition or subtraction is to be carried out, the type of the operation, i.e. mantissa addition or the mantissa subtraction, and the sign of the computation result are determined as shown in the sign and operation relation chart of FIG. 10. When the sign of the computation result is negative in the directed rounding toward plus mode, or when the sign of the computation result is positive in the directed rounding toward minus mode, the operation is effected in accordance with the operation of the directed rounding toward zero mode to be described later. When the sign of the computation result is positive in the directed rounding toward plus mode and when the sign of the computation results is negative in the directed rounding toward minus mode, the operation is effected as follows. The mantissa of one of the augend (or minuend) and the addend (or subtrahend) having a first exponent which is not smaller than a second exponent of the other is accommodated in the register 101. The mantissa of the other of the augend (or minuend) and the addend (or subtrahend) is aligned to the first exponent and is accommodated in the register 102. The bits which are split at the alignment are accommodated in the register 102 together as the round bit (R) having the weight of $2^{-53}$ at a bit which is lower by 1 bit than the least significant bit (L) and the sticky bit (S) which is the logical OR of the bits having the weight of $2^{-54}$ or lower.

(2) Step 1

*Mantissa addition

The output of the register 101 is selected by the multiplexor 103, and the output of the register 102 is selected by the multiplexor 104. In the round value generating circuit 106, data is generated in which the bit having the weight of $2^{-53}$ is 1 and the remaining bits are 0. The complementer 105 outputs the multiplexor 104 output as is, and the adder 107 executes (register 1)+(register 2)+(round addition value), with Cin being made 0. When the bit having the weight of $2^1$ in the output of the adder 107 is 1, the LR1 shifter 108 effects a 1 bit shift to the right. 1 bit (S) which is the logical OR of bits having the weight of $2^{-54}$ in the output of the adder 107, or lower, is generated. Responsive to the round correction repetitive control circuit 109, in accordance with the bits having the weights of $2^1$, $2^{-51}$, $2^{-52}$, $2^{-53}$ in the output of the adder 107 and the S bit, the output of the LR1 shifter 108 is accommodated in the register 110 with the bit having the weight of the $2^{-52}$ being inverted when the correction signal shown in FIG. 4 (b) is 01, with the bits having the weight $2^{-51}$, $2^{-52}$ in the output of the LR1 shifter 108 being inverted when correction signal is 01, and without correction when the correction signal is 00. When the rerounding signal of the round correction repetitive control circuit 109 is 1, the insertion of the new step for executing the readdition of the round value is instructed. On the other hand, when the rerounded signal is 0, this step completes the computing operation with the rounding operation being effected in accordance with the round precision.

*Mantissa subtraction (except for when the exponent difference is 0 or 1

The output of the register 101 is selected by the multiplexor 103, and the output of the register 102 is selected by the multiplexor 104. The round value generating circuit 106 generates data in which the bit having the weight of $2^{-54}$ is 1 and the remaining bits are 0. The complementer 105 inverts the output of the multiplexor 104 and the adder 107 executes (register 1)−(register 2)+(round addition value), with Cin being made 1. When the bit having the weight of $2^0$ in the output of the adder 107 is 0, the LR1 shifter 108 effects a 1 bit shift to the left. 1 bit (S) which is the logical OR of bits having the weight of $2^{-55}$ in the output of the adder 107, or lower, is generated. Responsive to the round correction repetitive control circuit 109, in accordance with the bits having the weights of $2^0$, $2^{-52}$, $2^{-53}$, $2^{-54}$ in the output of the adder 107 and the S bit, the output of the LR1 shifter 108 is accommodated in the register 110 with the bit having the weight of $2^{-52}$ being inverted when the correction signal shown in FIG. 4 (d) is 01, with the bits having the weights of $2^{-51}$ and $2^{-52}$ in the output of the LR1 shifter 108 being inverted when the correction signal is 01, and without correction when the correction signal is 00. When the rerounding signal of the round correction repetitive control circuit 109 is 1, the insertion of the new step for executing the readdition of the round value is instructed. On the other hand, when the reround signal is 0, this step completed the computing operation with the rounding operation being effected in accordance with the round precision.

*Mantissa subtraction when the exponent difference is 0 or 1

The output of the register 101 is selected by the multiplexor 103, and the output of the register 102 is selected by the multiplexor 104. The round value generating circuit 106 generates data in which all the bits are 0. The complementer 105 inverts the output of the multiplexor 104, and the adder 107 executes (register 1)−(register 2), with Cin being made 1. When the bit having the weight of $2^0$ in the output of the adder 107 is 0, the LR1 shifter 108 effects a 1 bit shift to the left. In the round correction competitive control circuit 109, the insertion of the step for the rounding is instructed when the two bits having the weights of $2^0$, $2^{-53}$ in the output of the adder 107 are 1, respectively. The shift number generating circuit generates the shift number necessary for normalizing the output of the LR1 shifter 108. The insertion of the step for normalization is instructed when the shift number is not 0. When there is no insertion of the step for rounding and no insertion of the step for normalization, the computation is completed by this step.

(3) Insertion Step (carried out only when insertion of a step has been instructed)

*Mantissa addition

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 in step 1 which is data in which the bit having the weight of $2^{-53}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction (except for when the exponent difference is 0 or 1

The output of the register 110 is selected by the multiplexor 103, and the constant 0 is selected by the multiplexor 104. The adder 107 adds the output of the multiplexor 103, the output of the complementer 105 (which is the output of the multiplexor 104 as is), the output generated by the round value generating circuit 106 in step 1 which is data in which the bit having the weight of $2^{-54}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

*Mantissa subtraction when the exponent difference is 0 or 1

When the insertion of the step for normalization has been instructed by the shift number generating circuit 111, the barrel shifter 112 shifts the output of the register 110, to left by the bit shift number generated by the shift number generating circuit 111. The bit shifted result is accommodated in the register 113 to complete the processing.

When the insertion of the step for rounding has been instructed by the round correction repetitive control circuit 109, the output of the register 110 is selected by the multiplexor 103, and the constant 0 is selected by the multiplexor 104. The adder 107 adds the output of the multiplexor 103, the output of the complementer 105 (which is the output of the multiplexor 104 as is), and the output generated by the round value generating circuit 106 which is data in which the bit having the weight of $2^{-52}$ is 1 and the remaining bits are 0. When the bit having the weight of $2^1$ in the output of the adder 107 is 1, the LR1 shifter 108 effects a 1 bit shift to the right. When the bit having the weight of $2^1$ is 0, the value is accommodated as is in the register 110 to complete the processing.

3. Zero Direction Round Mode

{The following processing is common when the augend (or minuend) and the addend (or subtrahend) are the single precision format, and the sum (or difference) is rounded into single precision, and when the augend (or minuend) ad the addend (or subtrahend) are the double precision format, and the sum (or difference) is rounded into double precision.}

(1) Pre-Processing Start

In accordance with the exponents and the signs of two floated point data and whether addition or subtraction is to be carried out, the type of the operation, i.e. mantissa addition or mantissa subtraction, and the sign of the computation result are determined as shown in the sign and operation relation chart of FIG. 10. The mantissa of the one of the augend (or minuend) and the addend (or subtrahend) which does not have a smaller exponent than the other is accommodated in the register 101. The mantissa of the other of the augend (or minuend) and the addend (or subtrahend) is aligned to the exponent which is not smaller and is accommodated in the register 102.

(2) Step 1

*Mantissa addition

The output of the register 101 is selected by the multiplexor 103, and the output of the register 102 is selected by the multiplexor 104. The round value generating circuit 106 generates data in which all the bits are 0. The complementer 105 generates the output of multiplexor 104 as is, and the adder 107 executes (register 1)+(register 2), with Cin being made 0. When the bit having the weight of $2^1$ in the output of the adder 107 is 1, the LR1 shifter 108 effects a 1 bit shift to the right to complete the computing operation

*Mantissa subtraction time (except when the exponent difference is 0 or 1)

The output of the register 101 is selected by the multiplexor 103, and the output of the register 102 is selected by the multiplexor 104. The round value generating circuit 106 generates data in which all bits are 0. The complementer 105 inverts the output of the multiplexor 104, and the adder 107 executes (register 1)−(register 2), with Cin being made 1. When the bit having the weight of $2^0$ in the output of the adder 107 is 0, the LR1 shifter 108 effects a 1 bit shifter to the left to complete the computing operation.

*Mantissa substraction when the exponent difference is 0 or 1

The output of the register 101 is selected by the multiplexor 103, and the output of the register 102 is selected by the multiplexor 104. The round value generating circuit 106 generates data in which all bits are 0. The complementer 105 inverts the output of the multiplexor 104, and the adder 107 executes (register 1)−(register 2), with Cin being made 1. When the bit having the weight of $2^0$ in the output of the adder 107 is 0, the LR1 shifter 108 effects a 1 bit shift to the left. The shift number generating circuit 111 generates the shift number necessary for normalizing the output of the LR1 shifter 108. The insertion of the step for normalization is instructed when the shift number is not 0. When there is no insertion of the step for normalization, the computation is completed by this step.

(3) Insertion Step (carried out only when insertion of a step has been instructed)

*Mantissa substraction time when the exponent difference is 0 or 1

The barrel shifter 112 shifts the output of the register 110 to the left by the bit shift number generated by the shift number generating circuit 111. The bit shifted result is accommodated in the register 113 to complete the processing.

According to the present embodiment, at the time of mantissa addition or at the time of mantissa substraction (except for when the exponent difference is 0 or 1), the sum of the mantissas of the two floating point data mantissas and the round addition value or the sum of a difference between the mantissas of the two floating point data and the round addition value are effected at the same time by the adder 107. The processing may be completed in most cases by normalizing the result using the LR1 shifter 108. Even when the correction of the output of the LR1 shifter 108 in response to an instruction of the round correction competitive control circuit 109 is necessary, the completing operation may be effected without an increase in the processing step number. The completing operation may be effected by insertion, of one processing step, only when the addition of the round addition value by the adder 1078 is required again. The probability that the insertion of the 1 step will be necessary is extremely small, and more particularly, is 2/32 for the rounding to nearest even mode, 3/32 for the directed rounding toward plus mode or the directed rounding toward minus mode, and 0/32 for the directed rounding toward zero mode (when the bit pattern of the mantissa is assumed to be uniformly distributed). As the result, in most cases 30/32 for the rounding to nearest even mode, 29/32 for the directed rounding toward plus mode or the directed rounding toward minus mode, and 32/32 for the directed rounding toward zero mode), the processing step number necessary for the addition or substraction becomes as small as 2.

Figure 8B:
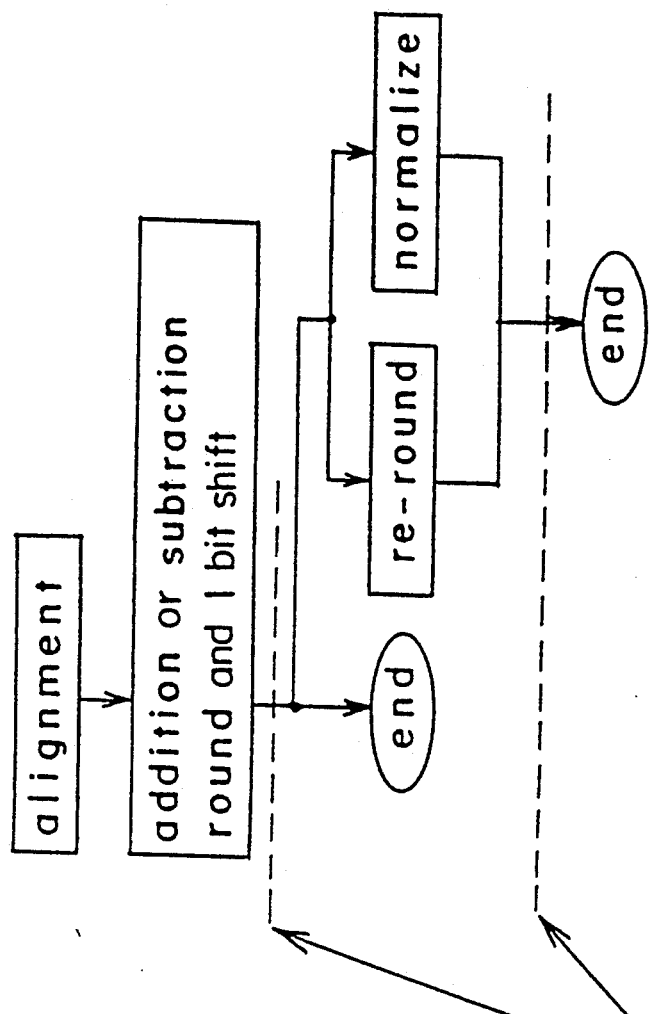
FIGS. 8(a)-(b) are processing flow charts of the conventional floating point data addition and subtraction apparatus and the floating point data addition and subtraction apparatus in the first an second embodiments of the present invention, respectively.
Figure 8A:
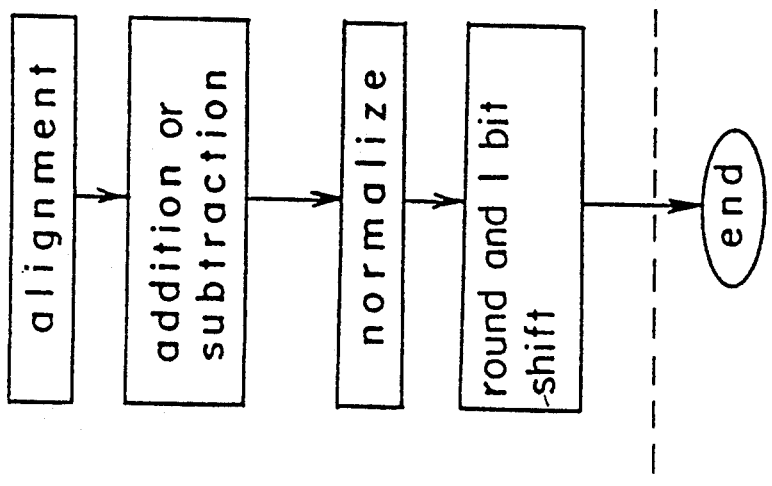

Even at the time of mantissa substraction when the exponent difference is 0 or 1, the adder 107 simultaneously effects subtraction of the mantissas of two floating point data and the addition of the round addition values, and the result is normalized by the LR1 shifter 108. The processing may be completed in most cases, only when the shift of 2 bits or more for normalization by the barrel shifter 112 or the processing can be completed by the insertion of 1 step, the addition of the round addition value is necessary by the adder 107, the number of the processing steps necessary in most of the cases becomes as small as 2. The processing flow is shown in FIG. 8(b). In either case, since the addition and substraction of the mantissas and the addition of the round addition value are simultaneously executed by the single adder 107, the hardware necessary to effect the computation is less than that of the conventional apparatus.

In the present embodiment, at the directed rounding toward plus mode or at the directed rounding toward minus mode, in accordance with the respective cases of mantissa addition with single precision rounding, mantissa substraction in which the exponent difference is 0 or 1 with single precision rounding, mantissa addition with double precision rounding, and mantissa substraction when the exponent difference is 0 or 1 with double precision rounding, the round value generating circuit 106 generates in which the bits having the weights of $2^{-24}, 2^{-25}, 2^{-53}, 2^{-54}$ are 1 and the remaining bits are 0, the output of the LR1 shifter 108 is accommodated in the register 110 with the bits having the weights of $2^{-23}, 2^{-23}, 2^{-52}, 2^{-52}$ being inverted when the correcting signal is 01, and with the bits having the weights of $2^{-22}$ and $2^{-}, 2^{-22}$ and $2^{-52}, 2^{-51}$ and $2^{-52}, 2^{-51}$ and $2^{-52}$ being inverted when the correction signal is 10 in accordance with the control relation charts of the FIGS. 4 (a), (b), (c) and (d) and responsive to the round correction repetitive control circuit 109, and the insertion of the new step for again adding the round addition value generated by the round value generating circuit 106 is instructed. It is noted, however, that when the rerounding signal of the round correction repetitive control circuit 109 is 1, the round value generating circuit 106 can generate the bits having the weights of $2^{-23}, 2^{-24}, 2^{-52}, 2^{-53}$ are 1 and the remaining bits are 0, the output of the LR1 shifter 108 is accommodated in the register 110 with the bits having the weight of $2^{-23}, 2^{-23}, 2^{-52}, 2^{-52}$ being inverted when the correction signal is 01, and with the bits having the weights of $2^{-22}$ and $2^{-23}, 2^{-22},$ and $2^{-23}, 2^{-51}$ and $2^{-52}, 2^{-51}$ and $2^{-52}$ being inverted when the correction signal is 10 in accordance with the control relation charts of FIGS. 5(a), (c), (b) and (d) responsive to the round correction repetitive control circuit 109, the insertion of the new step for adding again the round addition value generated by the round value generating circuit 106 can be instructed and when the reround signal of the round correction repetitive control circuit 109 is 1 and the correction signal is 00, and the insertion of the new step for subtracting from the value for retaining in the register 110 the round addition value generated by the round value generating circuit 106 can be instructed when the reround signal is 1 and the correction signal is 11. In this manner, the probability that the insertion of one step will be necessary is reduced to as low as 2/32, thus improving the computing speed.

In the present embodiment, at the directed rounding toward plus mode or at the directed rounding toward minus mode, in accordance with the respective cases of mantissa addition with single precision rounding, mantissa substraction when the exponent difference is 0 or 1 with single precision rounding, mantissa addition with double precision rounding, and mantissa substraction when the exponent difference is 0 or 1 with double precision rounding, the round value generating circuit 106 generates data in which the bits having the weights of $2^{-34}, 2^{-25}, 2^{-53}, 2^{-54}$ are 1 and the remaining bits are 0, the round correction repetitive control circuit 109 instructs the insertion of the step for correction of the bits or readdition of the round addition value in accordance with the correcting signal and the reround signal shown in the control relation charts of the FIGS. 4(a), (c), (b) and (d). It is noted, however, that the round value generating circuit 106 can generate data for the respective cases in which the bits having the weight of $2^{-24}$ and lower, $2^{-25}$ and lower, $2^{-53}$ and lower, and $2^{-54}$ and lower are 1 and the remaining bits are 0. The round correction repetitive control circuit 109 can instruct the insertion of the step for correction of the bits or readdition of the round addition value in accordance with the correction signal and reround signal shown in the control relation charts of the FIGS. 6(a), (c), (b) and (d). In this manner, the probability that the insertion of one step will be necessary is as low as 2/32, thus improving the computing speed. In the directed rounding toward plus mode or in the directed rounding toward minus mode, it is notable that the addition of 1 into the least significant bit (L) for rounding becomes necessary when the round bit (R) or the sticky bit (S) is 1. By using the carry generated by the addition of the data with the round bit and all its lower bits being made 1 in bit position, the round addition into the least significant bit may be effected. A case where the round addition is not caused with the round bit and the sticky bit both being zero is shown in FIG. 12(c). A case where the addition of 1 for rounding is caused except for the above is shown in FIGS. 12(d), (e) and (f).

In the present embodiment, both the precision of the format and the round precision of the augend (or minuend) and the addend (or subtrahend) are provided by way of single precision or double precision. Even in a case where the precision of the format and the round precision of the augend (or minuend) and the addend (or subtrahend) are different, the round addition value to be generated by the round value generating circuit 106 is data in which the round bit corresponding to the round precision is 1, and the input bit number of the adder 107 is set to the maximum bit number data handling setting so that rounding corresponding to the round precision may be realized without dependency upon the precision of the format of the augend (or minuend) and the addend (or subtrahend).

Although the present embodiment, in accordance with the respective cases of mantissa addition with the single precision rounding, mantissa subtraction when the exponent difference is 0 or 1 with single precision rounding, mantissa addition with double precision rounding, and mantissa subtraction when the exponent difference is 0 or 1 with double precision rounding, the round correction repetitive control circuit 109 inspects for the respective cases the bits having the weights of $2^1$, $2^{-22}$, $2^{-23}$, $2^{-24}$, the bits having the weights of $2^0$, $2^{-23}$, $2^{-24}$, $2^{-25}$, the bits having the weights of $2^1$, $2^{-51}$, $2^{-52}$, $2^{-53}$, and the bits having the weights of $2^0$, $2^{-52}$, $2^{-53}$, $2^{-54}$ in the output of the adder 107 and S bit so as to instruct the correction of the bits for the respective cases having the weights of $2^{-22}$ and $2^{-23}$, $2^{-22}$ and $2^{-23}$, $2^{-51}$ and $2^{-52}$, $2^{-51}$, $2^{-52}$, and the inspected bit and the corrected bit can be increased in the most significant bit direction. The probability that the insertion of one step will be necessary is halved for each 1 bit addition of the inspected bit and the corrected bit, thus improving the computing speed.

Figure 2:
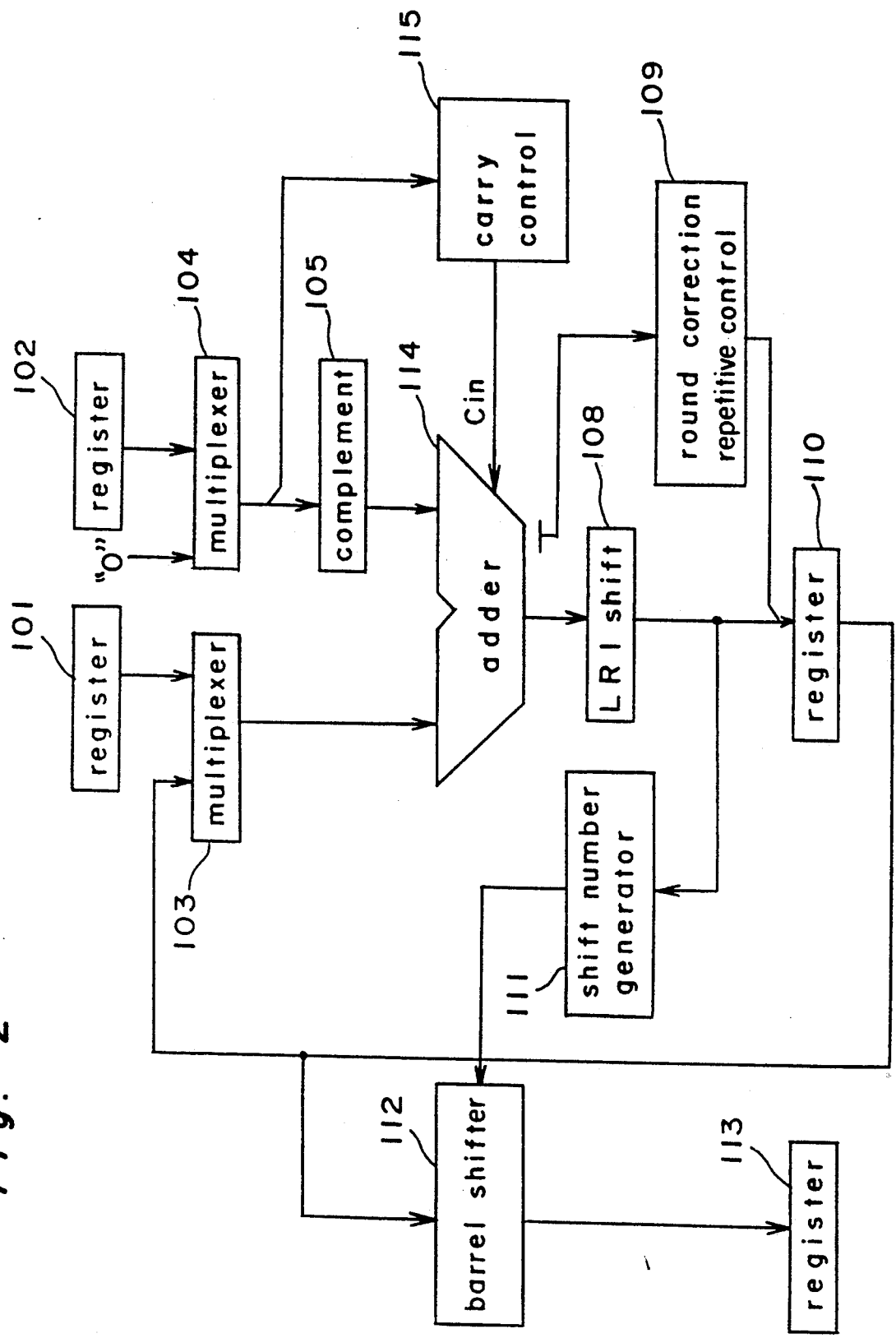
FIG. 2 is a block diagram of a floating point data addition and subtraction apparatus in a second embodiment of the present invention.

FIG. 2 shows a block diagram of the floating point data addition and subtraction apparatus in the second embodiment. It is to be noted that like parts in FIG. 2 are designated by like reference numerals in FIG. 1.

In FIG. 2, reference numeral 114 is a two input adder with the bit having the weight of $2^{-24}$ with the single precision as a carry input (Cin), and the bit having the weight of $2^{-53}$ with the double precision as a carry input (Cin), reference numeral 115 is a carry control apparatus for designing the carry input (Cin) of the adder 114.

FIGS. 7(a)-(d) are control relation charts of the carry control apparatus 115, where the adder 114 carry input (Cin) is as shown in FIG. 7(a) when mantissa addition is executed and the round precision is the single precision, as in FIG. 7(b) when mantissa addition is executed and the round precision is the double precision, as in FIG. 7(c) when mantissa subtraction is executed and the round precision is the single precision, and as in FIG. 2(d) when mantissa subtraction is executed and the round precision is the double precision.

The operation of the floating point data addition and subtraction apparatus in the second embodiment will be described hereinafter. In contrast to the first embodiment of FIG. 1 in which addition or subtraction of the mantissas of the two floating point data and addition of the round addition value generated by the round value generating circuit 106 is effected by the three input adder 107, the present embodiment is adapted to operate the carry input (Cin) of the two input adder 114 according to the carry control apparatus 115 to effect the addition or subtraction of the mantissas and the addition of the round addition values. Only the addition or subtraction of the mantissas and the addition of the round addition value will be described hereinafter, with the other operations being the same as in the first embodiment.

*Mantissa addition

At the rounding to nearest even mode, or when the sign of the computing result is positive in the directed rounding toward minus mode, or when the sign of the computation result is negative in the directed rounding toward minus mode, the carry input (Cin) is made irrelevant, into 1, to the input data as shown in the columns of RN,RP(+),RM(−) of FIGS. 7(a) and (b) so that $2^{-24}$, $2^{-53}$ are added as addition values in accordance with the round precision being the single precision or the double precision.

When the sign of the computation result is negative in the directed rounding toward plus mode, or when the sign of the computation result is positive in the directed rounding toward minus mode, or at the directed rounding toward zero mode, the round addition values are not required to be added. Thus, the carry input (Cin) is made to be irrelevant, into 0, to the input data as shown in the columns of RP(−),RM(+), RZ of FIGS. 7(a) and (b).

*Mantissa subtraction (except for when the exponent difference is 0 or 1)

At the rounding to nearest even mode, or when the sign of the computation result is positive in the directed rounding toward plus mode, or when the sign of the computation result is negative in the directed rounding toward minus mode, $2^{-25}$, $2^{-54}$ are required to be added as the round addition values in accordance with the round precision being the single precision or the double precision, and 1 for the 2's complement is required to be added to the position of the sticky bit (S). To realize these additions, when at least one of the $2^{-25}$ bit of the data (aligned and complemented by 1) to be added and the sticky bit (S) is 1, or when at least one of the $2^{-54}$ bit and the sticky bit (S) is 1, the carry input (Cin) into $2^{-24}$, $2^{-53}$ is made 1. When both the $2^{-25}$ bit of the data to be added and the sticky bit (S) are 0, or when both the $2^{-54}$ bit and the sticky bit (S) are 0, or when both the $2^{-54}$ bit and the sticky bit (S) are 0, the carry input (Cin) into $2^{-54}$, $2^{-53}$ is made 0. Accordingly, the generated carry input (Cin) depends upon the input data as shown in the columns of RN, RP(+),RM(−) of FIGS. 7(c) and (d).

When the sign of the computation result is negative in the directed rounding toward plus mode, or when the signs of the computation result is positive in the directed rounding toward minus mode or at the directed rounding toward zero mode, in accordance with the round precision being the single precision or the double precision, for 2's complement 1 is required to be added to the position of the sticky bit (S). So as to realize this addition, when at least one of the $2^{-25}$ bit of the data (aligned and complemented by 1) to be added and the sticky bit (S) is 1, or when at least one of the $2^{-54}$ bit and the sticky bit (S) is 0, the carry input (Cin) into $w^{-24}$, $2^{-53}$ is made 0. When both the $2^{-25}$ bit of the data to be added and the sticky bit (S) are 1, or when both the $2^{-54}$ bit and the sticky bit(S) are 1, the carry input (Cin) into $2^{-24}$, $2^{-53}$ is made 1 for realization thereof. Accordingly, the generated carry input (Cin) depends upon the input data as shown in the columns of RP(−),RM(+),RZ of FIGS. 7(c) and (d).

*Mantissa subtraction when the exponent difference is 0 or 1

The rounding is not executed simultaneously with the subtraction of the mantissas. However, in accordance with the single precision or the double precision in the round precision, for 2's complement 1 is required to be added to the position of the sticky bit (S). To realize this addition, when at least one of the $2^{-25}$ bit of the data (aligned and complemented by 1) to be added and the sticky bit (S) is 0, or when at least one of the $2^{-54}$ bit and the sticky bit (S) is 0, the carry input pin (Cin) into $2^{-24}$, $2^{-53}$ is made 0. When both the $2^{-54}$ bit and the data to be added and the sticky bit (S) are 1, or when both the $2^{-54}$ bit and the sticky bit (S) are 1, the carry input (Cin) into $2^{-24}$, $2^{-53}$ is made 1. Accordingly, the generated carry input (Cin) depends upon the input data as shown in the columns of RP(−),RM(+), RZ of FIGS. 7(c) and (d).

In either above described case, the rounding to be effected with the step being inserted may be realized with the carry input (Cin) being 1 so as to effect the addition with $2^{-24}$, $2^{-53}$ as the round addition values in accordance with single precision or double precision in the round precision.

Also in the present embodiment, at the time of mantissa addition or at the time of mantissa subtraction time (except for when the exponent difference is 0 or 1), the sum of the two, the 11 bit exponent portion 201e and a 53 bit mantissa portion 201f. Reference numeral 202 denotes a multiplier register for retaining the multiplier, consisting of a 1 bit sign portion 202s, an 11 bit exponent portion 202e and a 53 bit mantissa portion 202f. The most significant bit of the multiplicand register mantissa portion 202f are each a so-called "hidden bit" having the weight of $2^0$ when it is 1 at the normalized number, with the multiplicand register 201 and the multiplier register 202 both being in conformity with the double precision formal except for this bit. Reference numeral 203 denotes a sign generating circuit for reading the signs of the multiplicand and the multiplier from the multiplicand register sign portion 201s and the multi-plier register sign portion 202s so as to generate the sign of the product. Reference numeral 204 denotes an 11 bit exponent adder for reading the exponents of the multiplicand and the multiplier from the multiplicand register exponent portion 201e and the multiplier register exponent portion 202e so as to compute the exponent of the product, by effecting addition of the A input, the B input and the carry input of the 1 bit Cin. Reference numeral 205 and reference numeral 206 respectively denote 11 bit selectors for selecting the two inputs to be applied to the exponent adder 204. Reference numeral 207 is the most significant bit correcting circuit of inverting the most significant bit of the output floating point data mantissas and the round addition value, or the sum of the difference between the mantissas of the floating point data and the round addition value, are effected at the same time by the adder 114. As a result, in most cases 30/32 for the rounding to nearest even mode, 29/32 for the directed rounding toward plus mode or the directed rounding toward minus mode, and 32/32 for the directed rounding toward zero mode), the processing step number necessary for the addition or subtraction computation becomes as small as 2. Even at the time of mantissa subtraction when the exponent difference is 0 or 1, the subtraction of the mantissas of the two floating point data and the addition of the round addition value are effected at the same time by the adder 114, so that the number of the processing steps necessary in most cases becomes as small as 2. In either case, since the addition or subtraction of the mantissas and the addition of the round addition values are executed by the single adder 114, the hardware necessary to carry out the computation is less than that of the conventional apparatus. Also, the adder 114, which is composed of two inputs, results in less hardware than in the first embodiment.

Figure 14:
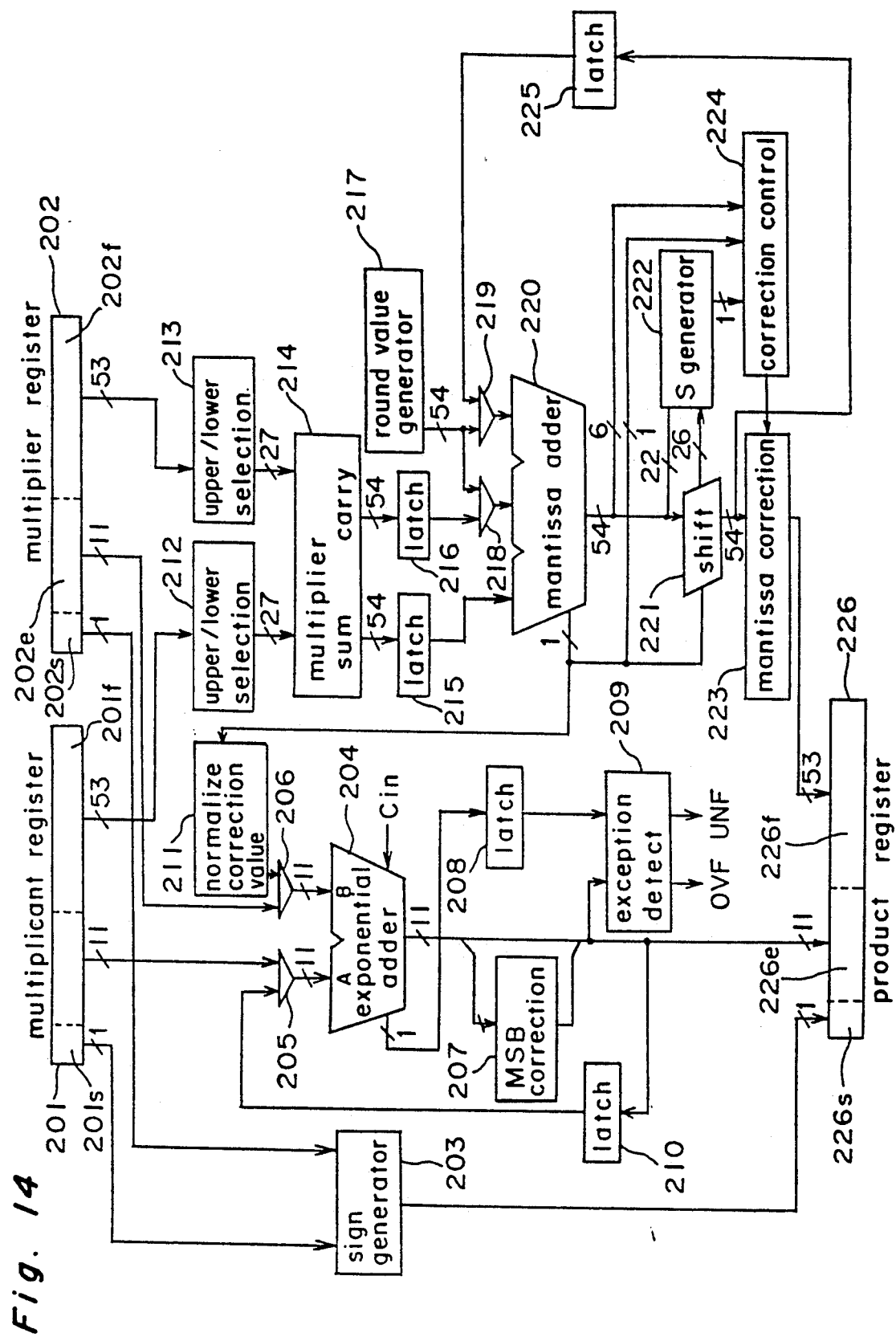
FIG. 14 is a block diagram of a floating point data multiplying apparatus in a third embodiment of the present invention.

FIG. 14 shows a block diagram of a floating point data multiplying apparatus in the third embodiment of the present invention.

In FIG. 14, reference numeral 201 denotes a multiplicand register for retaining the multiplicand, consisting of a 1 bit sign portion 201s bit, an 11 bit exponent portion 201e and a 53 bit mantissa portion 201f. Reference numeral 202 denotes a multiplier register for retaining the multiplier consisting of a 1 bit sign portion 202s, an 11 bit exponent portion 202e and a 53 bit mantissa portion 202f. The most significant bit of the multiplicand register mantissa portion 201f and the multiplier register mantissa portion 202f is a so-called "hidden bit" having a weight of $2^0$ which is 1 at a normalized number, the multiplicand register 201 and the multiplier register 202 being both in conformity with the double precision format except for this bit. Reference numeral 203 denotes a sign generating circuit for reading the signs of the multiplicand and the multiplier from the multiplicand register sign portion 201s and the multiplier register sign portion 202s so as to generate the sign of the product. Reference numeral 204 denotes an exponent adder of 11 bits for reading the exponents of the multiplicand and the multiplier form the multiplicand register exponent portion 201e and the multiplier register exponent portion 202e so as to compute the exponent of the product, by effecting the addition of the A input, the B input and the carry input of 1 bit Cin. Reference numeral 205 and reference numeral 206 respectively denote selectors of 11 bits for selecting the two inputs A and B of the exponent adder 204. Reference numeral 207 denotes a most significant bit correcting circuit of inverting the most significant bit of the output of the exponent adder 204. Reference numeral 208 is a one bit latch for retaining the overflow from the most significant bit upon addition in the exponent adder 204. Reference numeral 209 is an exception detecting circuit for detecting the overflow and the underflow of the product with respect to the computation precision detected from the output of the exponent adder 204 and the value of the latch 208. Reference numeral 210 denotes an 11 bit latch for retaining the output of the exponent adder 204 in which the most significant bit is inverted by the most significant bit correcting circuit 207 so as to be input into the exponent adder 204 again through the selector 205. Reference numeral 211 denotes a normalized correction value generating circuit for generating a constant for increasing the exponent by 1 through normalization of a 1 bit shift of the mantissa of the product. Reference numeral 212 denotes a multiplicand upper, lower selecting circuit for reading the multiplicand register mantissa portion 201$f$ so as to select and output the upper 27 bits or the lower 27 bits (the most significant bit at this time is assumed to be 0). Reference numeral 213 denotes a multiplier upper and lower selecting circuit for reading the multiplier register mantissa portion 202$f$ so as to select and output the upper 27 bits or the lower 27 bits (the most significant bit at this time is 0). Reference numeral 214 is a multiplying unit for multiplying the 27 bits output of the multiplicand upper, lower selecting circuit 212 by the 27 bits output of the multiplier upper, lower selecting circuit 213 so as to respectively output a sum and a carry of 54 bits. Reference numerals 215, 216 respectively denote 54 bits latch circuits for retaining the sum output and the carry output of the multiplying unit 214. Reference numeral 217 is a round addition value generating circuit for generating a constant when addition is effected so as to round the mantissa of the product in single precision or double precision. Reference numeral 218 is a 54 bits selector for selecting the value of the latch 216 and the output of the round addition value generating circuit 217. Reference numeral 219 is a 54 bits selector for selecting the output of the round addition value generating circuit 217 and the value to be retained in the latch 225 to be described later. Reference numeral 220 is a 54 bits mantissa adder for adding the value retained at the latch 215, the output of the selector 218, and the output of the selector 219. Reference numeral 221 is a 54 bits shifter for shifting by 0 bit or 1 bit or 26 bits the output of the mantissa adder 220 in the least significant bit direction. Reference numeral 222 is a sticky bit generating circuit for inputting 22 bits which are the 26th bit through 47th bit from the most significant bit of the output of the mantissa adder 220 and the shift overflow from the least significant bit of 26 bits in the shifter 221 so as to generate the sticky bit in accordance with whether the round precision is the single precision or the double precision. Reference numeral 223 is a mantissa correcting circuit for inverting and outputting, if necessary, the 24th bit from the most significant bit of the output of the shifter 221 when the round precision is the single precision, and the 53rd bit when the round precision is the double precision. Reference numeral 224 is a mantissa correction control circuit which receives 6 bits, i.e. the 23rd bit through the 25th bit from the most significant bit and the 3rd bit through the least significant bit, in the output of the mantissa adder 220, a 1 bit over flow from the most significant bit upon addition in the mantissa adder 220, and the 1 bit sticky bit output by the sticky bit generating circuit 222 so as to control the bit inversion effected by the mantissa correction circuit 223 and the addition of the round addition values in the mantissa adder 220 in accordance with whether the round precision is the single precision or the double precision. Reference numeral 225 is a 54 bits latch for retaining the output of the shifter 221. Reference numeral 226 is a product register for retaining the product, consisting of a 1 bit sign portion 226$s$, an 11 bit exponent portion 226$e$ and a 53 bit mantissa portion 226$f$. The most significant bit of the product register mantissa portion 226, a so-called "hidden bit" having the weight of $2^0$, is 1 at the time of the normalized number, and the product register 226 except for this bit is in conformity with the double precision format.

Figure 15:
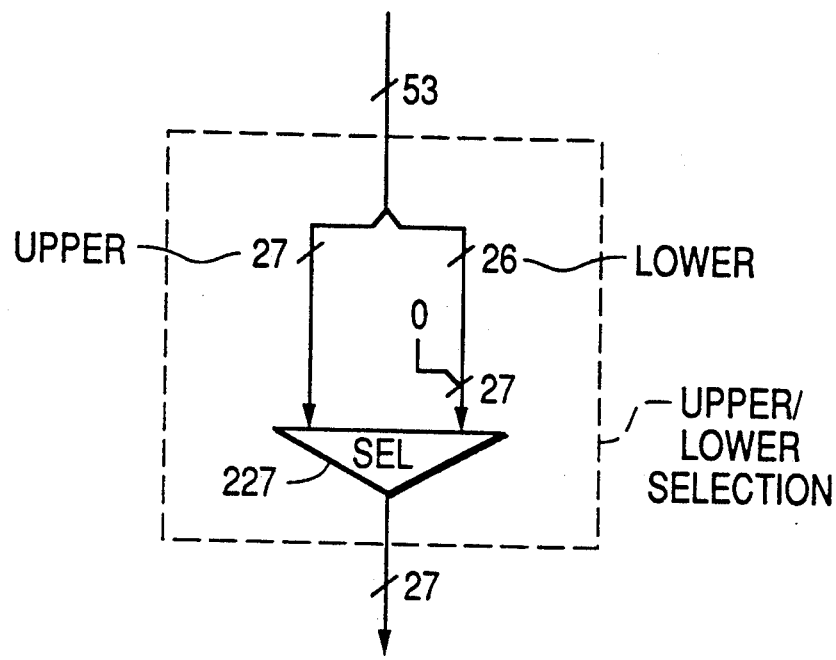
FIG. 15 is an inner block diagram of the multiplicand upper, lower selecting circuit 212 and the multiplier upper, lower selecting circuit 213 in the third embodiment.

FIG. 15 is an inner block diagram of the multiplicand upper, lower selecting circuit 212 and the multiplier upper, lower selecting circuit 213 shown in FIG. 14. Reference numeral 227 is a selector for selecting the upper 27 bits or the 27 bits with 0 being expanded at the most significant bit to the lower 26 bits of the input of 53 bits.

Figure 16:
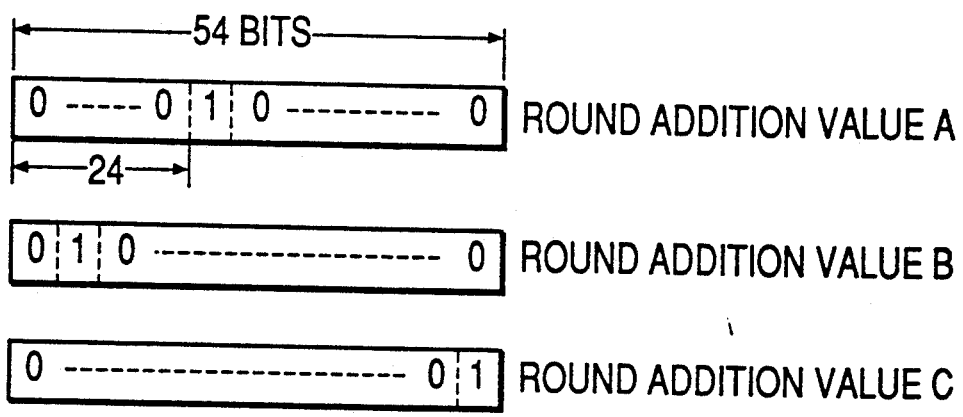
FIG. 16 is a view illustrating the operation of the round addition value generating circuit 217 in the third embodiment.

FIG. 16 is a chart illustrating the constants generated by the round addition value generating circuit 217 shown in FIG. 14, i.e. a round addition value A in which only the 25th bit from the most significant bit is 1 and the remaining bits are 0, a round addition value B in which only the 2nd bit from the most significant bit is 1 and the remaining bits are 0, a round addition value C in which only the least significant bit is 1 and the remaining bits are 0.

FIGS. 17($a$)-($b$) are control relation charts of the mantissa correction control circuit 224 shown in FIG. 14. When the round precision is the single precision, as shown in FIG. 17($a$), the requirement of the bit inversion of the mantissa and the requirement of the readdition of the round addition value are determined from the 23rd bit through the 25th bit ($Z_{22}$, $Z_{23}$, $Z_{24}$) from the most significant bit in the output of the mantissa adder 220, the sticky bit (S) output by the sticky bit generating circuit 222 and the overflow (Cout) in the mantissa adder 220. Also, when the round precision is the double precision, as shown in FIG. 17($b$), the requirement of the bit inversion of the mantissa and the requirement of the readdition of the round addition value are determined from the 3rd bit through the least significant bit ($Z_{51}$, $Z_{52}$, $Z_{53}$) from the least significant bit in the output of the mantissa adder 220, the sticky bit (S) output by the sticky bit generating circuit 222 and the overflow (Cout) in the mantissa adder 220.

The operation of the floating point data multiplying apparatus in the present embodiment will be described hereinafter. Here, the round mode is the rounding to nearest even mode.

Figure 18:
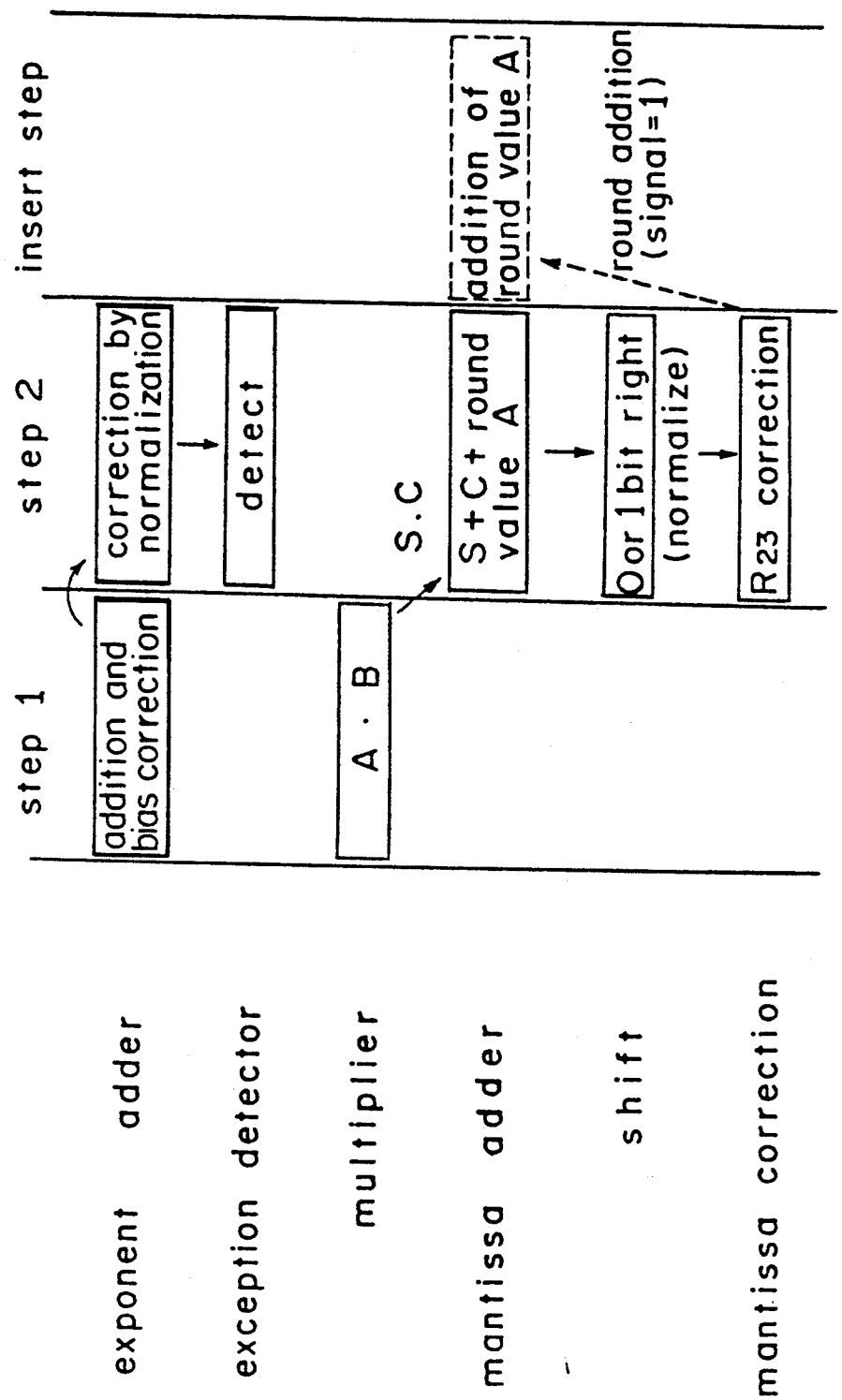
FIG. 18 is an operation flow chart of the single precision multiplication in the third embodiment.
Figure 19A:
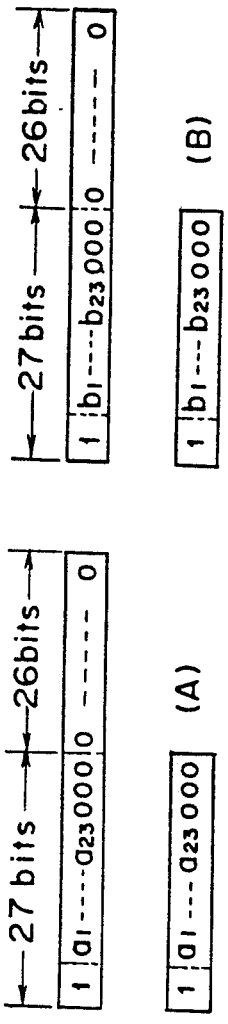
FIGS. 19(a)-(b) are views illustrating the addition and shift at the time of single precision multiplication in the third embodiment.
Figure 19B:
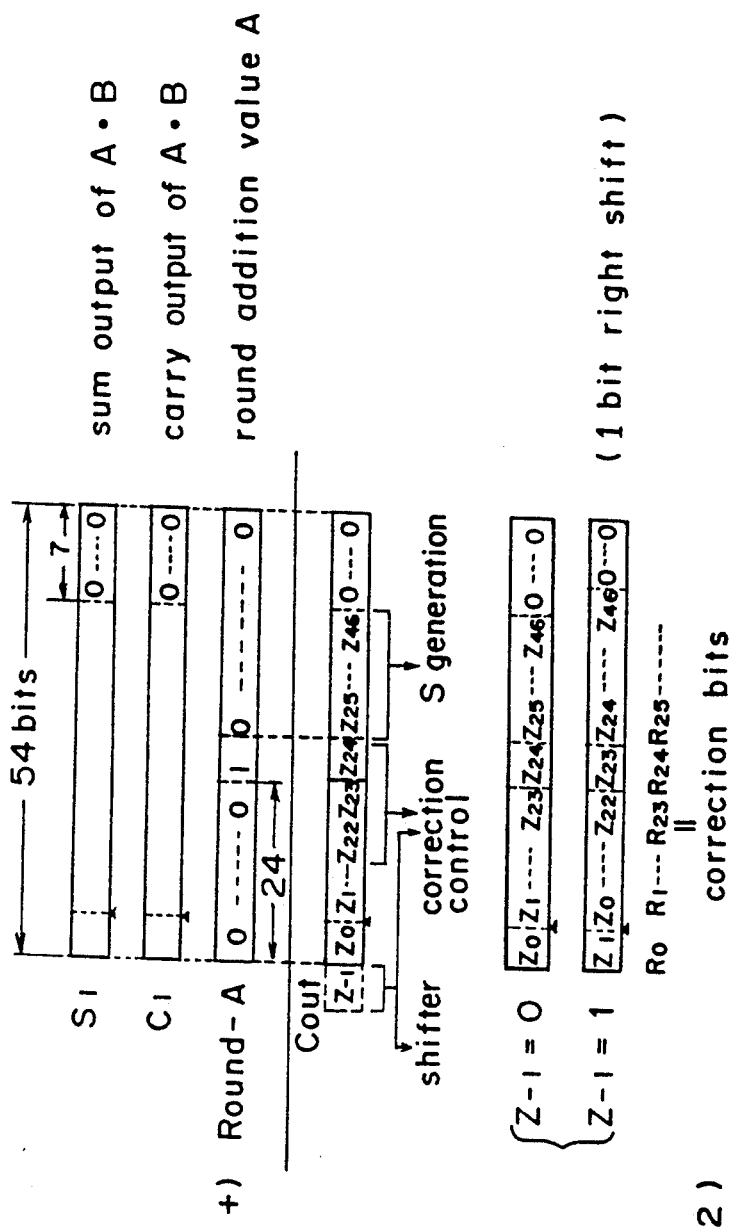

A case where the multiplicand and the multiplier are the single precision format, and the product is rounded into the single precision, will be described with reference to an operation flow chart of the single precision multiplication shown in FIG. 18 and the embodiment diagram of the addition and shift in the single precision multiplication shown in FIGS. 19($a$)-($b$). FIG. 18 shows operations for each of the processing steps of the exponent adder 204, the exception detecting circuit 209, the multiplying unit 214, the mantissa adder 220, the shifter 221, and the mantissa correction circuit 223. FIGS. 19($a$)-($b$) show the detailed operation in the mantissa adder 220 and the shifter 221.

(1) Pre-Processing Start Step

The single precision multiplicand and the multiplier are expanded into the double precision and are respectively accommodated in the multiplicand register 201 and the multiplier register 202. At this time, the multiplicand register exponent portion 201e and the multiplier register exponent portion 202e are both converted into the biased expression of the above precision (real exponent value = value of exponent portion $-1023^{(10)}$), with 0 being filled in the lower 29 bits of the multiplicand register mantissa portion 201f and the multiplier register mantissa portion 202f.

(2) Step 1

The exponent of the multiplicand retained in the multiplicand register exponent portion 201e is input selector 205 into the A input of the exponent adder 204, and the exponent of the multiplier retained in the multiplier register exponent portion 202e is input by the selector 206 into the B input of the exponent adder 204 so as to effect the addition operation in the exponent adder 204 with the carry input Cin being provided as 1. The most significant bit of the addition result is inverted by the most significant bit correcting circuit 207. The addition result, with the most significant bit being inverted, is accommodated in the latch 210. The fact that the value to be retained in the latch 210 is the exponent of the product correctly biased can be proved as follows.

(Proof Start)

In ANSI/IEEE Standard for Binary Floating-Point Arithmetic P754, the bias value of the double precision is assumed as follows ($-X$ is the inversion of X.).

$$bias = 011\ 1111\ 1111_{(2)}$$

It may be transformed $$\begin{aligned} em &= (e1 - bias) + (e2 - bias) + bias \\ &= e1 + e2 - bias \\ &= e1 + e2 + \overline{bias} + 1 \\ &= (e1 + e2 + 1) + \overline{bias} \\ &= (e1 + e2 + 1) + 100\ 0000\ 0000_{(2)} \end{aligned}$$

wherein e1: biased exponent portion of the multiplicand (11 bits)

e2: biased exponent portion of multiplier (11 bits)

em: biased exponent portion of product (11 bits)

The addition of 1 of the third term can be realized with the carry input Cin being made 1. The addition of 100 0000 0000$_{(2)}$ of the fourth term can be realized by the inversion of the most significant bit.

(Proof end)

The latch 208 retains the overflow in the exponent adder 204 at this time. The multiplicand upper, lower selecting circuit 212 reads and outputs the upper 27 bits of the multiplicand register mantissa portion 201f (the value A shown in FIG. 19(a), in which all the effective bits of the mantissa portion of the multiplicand being included and the lower 3 bits are 0). The multiplier upper, lower selecting circuit 213 reads and outputs the upper 27 bits of the multiplier register mantissa portion 202f (the value B shown in FIG. 19(a), in which all the effective bits of the mantissa portion of the multiplier being included and the lower 3 bits are 0). The multiplying unit 214 executes the multiplication in accordance with the inputs from the multiplicand upper, lower selecting circuit 212 and the multiplier upper, lower selecting circuit 213 so as to respectively accommodate the sum output and the carry output in the latch 215 and the latch 216. At the same time, in the sign generating circuit 203, the signs of the multiplicand and the multiplier are read from the multiplicand register sign portion 201s and the multiplier register sign portion 202s so as to take the exclusive OR of both and generate the sign of the product to be accommodated in the product register sign portion 226s.

(3) Step 2

The mantissa adder 220 adds the sum output (lower 7 bits are 0) of the multiplying unit 214 retained in the latch 215, the carry output (lower 7 bits are 0) of the multiplying unit 214 retained in the latch 216 by the selector 218, and the round addition value A generated by the round addition value generating circuit 217 and output by the selector 219. In accordance with the presence or absence of the unit overflow ($Z_{-1}$) from the mantissa adder 220 at this time, one of the following is executed.

*When overflow exists from the mantissa adder 220, namely, when the product of the mantissa portion is 2 or more The shifter 221 shifts by 1 bit (at this time, 1 is filled in the most significant bit) in the least significant bit direction the output from the mantissa adder 220 for normalization. The exponent adder 204 adds the value of the latch 210 selected by the selector 205, and the constant 1 output by the normalized correction value generating circuit 211 and selected by the selector 206 so as to accommodate the result into the product register exponent portion 226e.

*When the overflow from the mantissa adder 220 does not exist, namely, when the product of the mantissa portion is 1 or more and less than 2

The shifter 221 outputs as is (without shifting) the output from the mantissa adder 220 since normalization is not necessary. The exponent adder 204 outputs the value of latch 210 as is to be accommodated into the product register exponent portion 226e.

The value of the latch 208 is not allowed to change. The exception detecting circuit 209 detects in accordance with the following logic the overflow (OVF) and the underflow (UNF) of the product at the single precision based on the output (which is assumed to be E) of the exponent adder 204.

if $E \geq 128_{(10)}$ then $OVF = 1$ else $OVF = 0$ if $e \leq 996_{(10)}$ then $UNF = 1$ else $UNF = 0$ The sticky bit generating circuit 222 takes the logical OR of the bits from the 26th bit through the 47th bit ($Z_{25}, \ldots, Z_{46}$) from the significant bit in the output of the mantissa adder 220. The sticky bit output (S) is 1 if a bit having a value 1 exists in the 22 bits, and the sticky bit output (S) is 0 if the 22 bits are all 0. The mantissa correction control circuit controls the mantissa correcting circuit 223 in accordance with the 23rd bit through the 25th bit ($Z_{22}, Z_{23}, Z_{24}$) from the most significant bit in the output of the mantissa adder 220, the sticky bit (S) output by the sticky bit generating circuit 222 and the overflow bit (Cout = $Z_{-1}$) from the mantissa adder 220. The mantissa correcting circuit 223 inverts the 24th bit ($R_{23}$) from the most significant in the output of the shifter 221 if the column of the correction signal of FIG. 17(a) is 1. If the column is 0, the circuit 223 outputs the shifter 221 output as is. At the same time, if the column of the round adding signal of FIG. 17(a) is 0, the output is accommodated in the product register mantissa portion 226f, with the lower 29 bits of the 53 bit output of the mantissa correcting circuit 223 except for the most significant bit being masked in 0, so as to complete the processing. If the column of the round addition signal is 1, the output of the mantissa correction circuit 223 is accommodated in the latch 225, and thereafter, the following insertion step is executed.

(3) Insertion Step (carried out only when the column of the round addition signal is 1)

The mantissa adder 220 adds the round addition value A generated by the round addition value generating circuit 217 and output by the selector 218 and the value retained the latch 225 and output by the selector 219. At this time, overflow from the mantissa adder 220 is not caused. The shifter 221 outputs the output of the mantissa adder 220 a is (without being shifted), and the mantissa correction circuit 223 also outputs the output of shifter 221 as is (without being bit inverted). Thereafter, the output is accommodated in the product register mantissa portion 226f, with the lower 29 bits of the 53 bit output of the mantissa correcting circuit 223 except for the most significant bit being masked in 0 so as to complete the processing.

Figure 20:
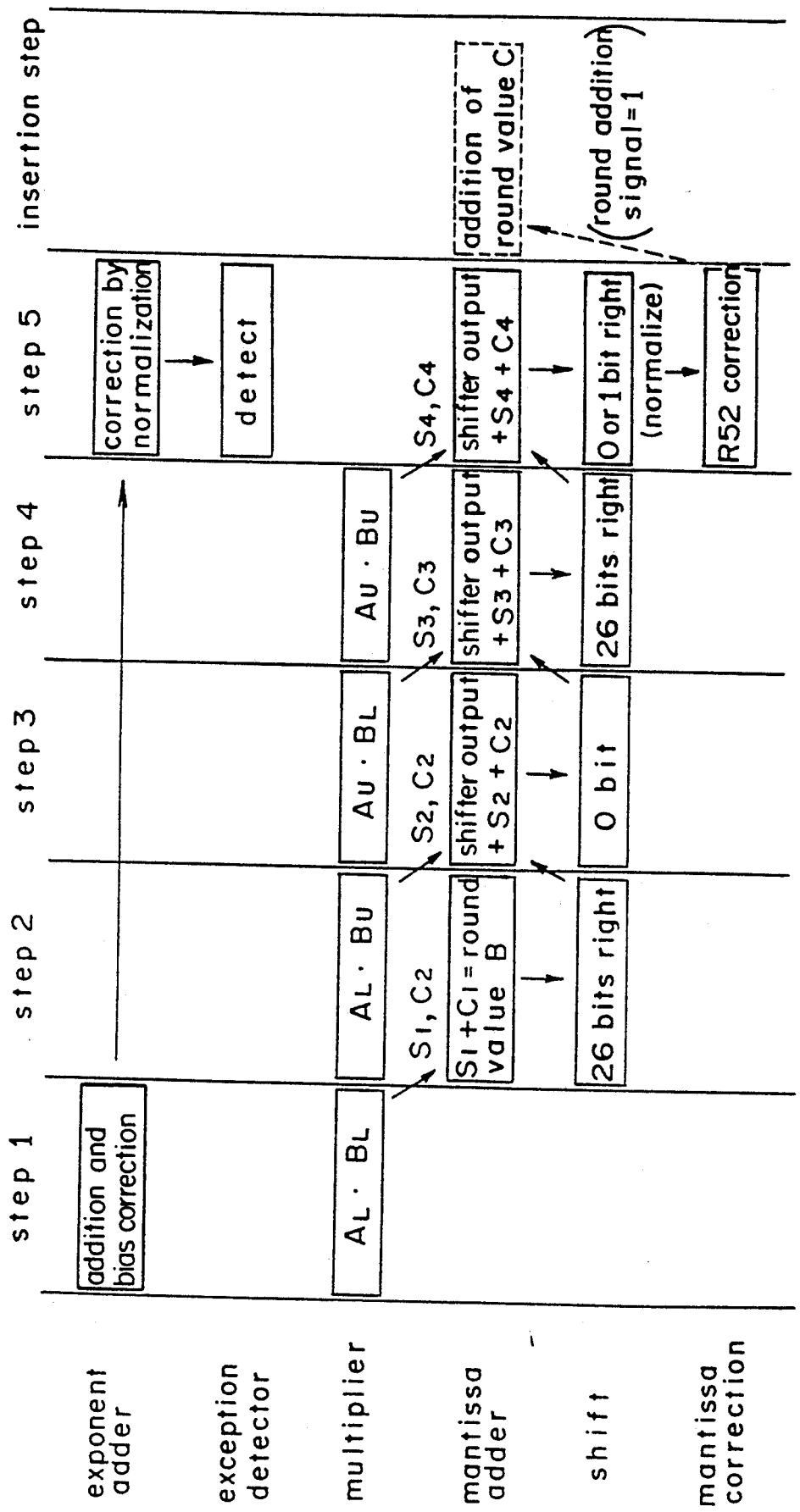
FIG. 20 is an operation flow chart of the double precision multiplication in the third embodiment.
Figure 21A:
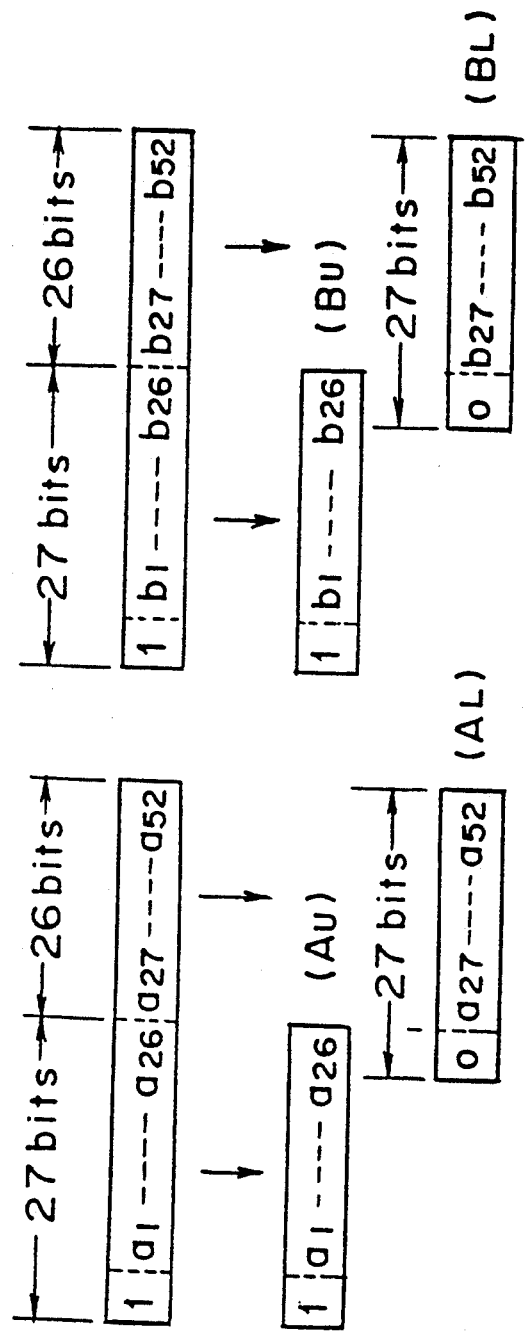
FIGS. 21(a)-(b) are views illustrating the addition and the shift at the time of double precision multiplication in the third embodiment.
Figure 21B:
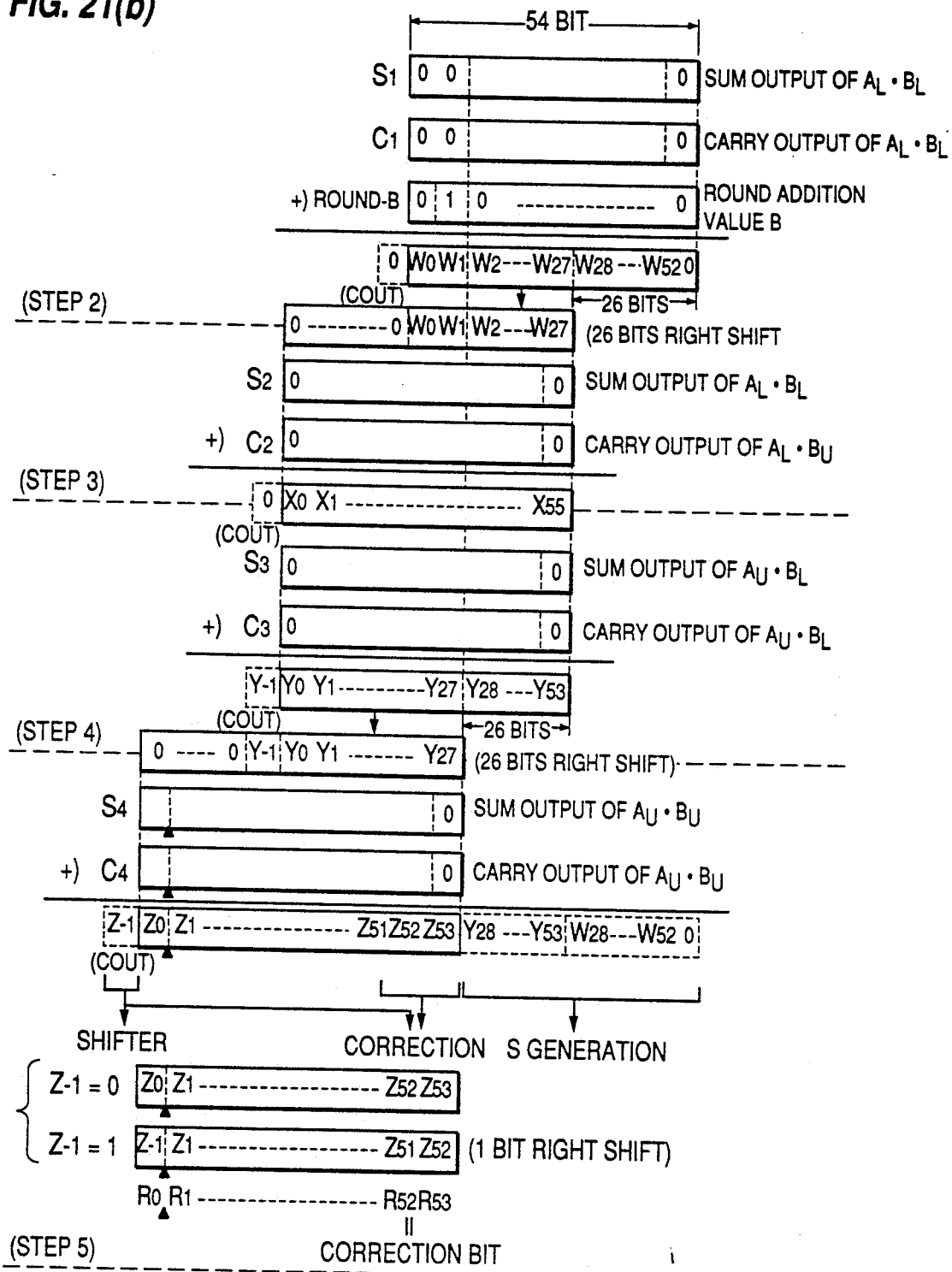

A case where the multiplicand and the multiplier are the double precision format, and the product is rounded into the double precision, will now be described with reference to an operation flow chart of the double precision multiplication shown in FIG. 20 and the diagram of the addition and shift in the double precision multiplication shown in FIGS. 21(a)-(b). FIG. 20 shows operations for each of the processing steps of the exponent adder 204, the exception detecting circuit 209, the multiplying unit 214, the mantissa adder 220, the shifter 221, and the mantissa correction circuit 223. FIGS. 21(a)-(b) show the detailed operation in the mantissa adder 220 and the shifter 221.

(1) Pre-Processing Start Step

The multiplicand and the multiplier, at the double precision, are respectively accommodated in the multiplicand register 201 and the multiplier register 202. At this time, the multiplicand register exponent portion 201e and the multiplier register exponent portion 202e are both converted into the biased expression (real exponent value = value of exponent portion $-1023_{(10)}$) of the double precision.

(2) Step 1

The exponent of the multiplicand retained in the multiplicand register exponent portion 201e is selected by the selector 20 and input into the A input of the exponent adder 204, and the exponent of the multiplier retained in the multiplier register exponent 2023 is selected by the selector 206 and input into the B input of the exponent adder 204. Addition in the exponent adder 204 is effected with the carry input Cin being provided as 1. The most significant bit of the addition result is inverted by the most significant bit correcting circuit 207. The addition result with the most significant bit being inverted is accommodated in the latch 210. (The fact that the value to be retained in the latch 210 is the exponent of the product correctly biased is proved in the previous description of the single precision multiplication.) The latch 208 retains the overflow in the exponent adder 204 at this time. The multiplicand upper, lower selecting circuit 212 reads and outputs the lower 27 bit of the multiplicand register mantissa portion 201f (the value AL shown in FIG. 21(a), the most significant bit being 0). The multiplier upper, lower selecting circuit 213 reads and outputs the lower 27 bits of the multiplier register mantissa portion 202f (the value BL shown in FIG. 21(a), the most significant bit being 0). The multiplying unit 214 executes the multiplication in accordance with the inputs from the multiplicand upper, lower selecting circuit 212 and the multiplier upper, lower selecting circuit 213 to respectively accommodate the sum output and the carry output in the latch 215 and the latch 216. At the same time, the sign generating circuit 203 reads the signs of the multiplicand and the multiplier from the multiplicand register sign portion 201s and the multiplier register sign portion 202s so as to take the exclusive OR of both and generate the sign of the product to be accommodated in the product register sign portion 226s.

(3) Step 2

The mantissa add ⓡr 220 adds the sum output (the upper 2 bits and the least significant bit are 0) of the multiplying unit 214 retained in the latch 215, the carry output (the upper 2 bits and the least significant bit are 0) of the multiplying unit 214 retained in the latch 216 and output by the selector 218, and the round addition value B generated by the round addition value generating circuit 217 and output by the selector 219. Overflow from the mantissa adder 220 at this time is not caused. The shifter 221 shifts the output of the mantissa adder 220 ($W_0, \ldots, W_{52}, 0$) by 26 bits in the least significant bit direction (at this time 0 is filled in the upper) so that the result ($0, \ldots, 0, W_0, \ldots, W_{27}$) is accommodated in the latch 225. The value accommodated in the latch 225 is the least significant partial product. At the same time, the multiplicand upper, lower selecting circuit 212 reads and outputs the lower 27 bits of the multiplicand register mantissa portion 201f (the value AL shown in FIG. 21(a), the most significant bit is 0), and the multiplier upper, lower selecting circuit 213 reads and outputs the upper 27 bits of the multiplier register mantissa portion 202f (the value BU shown in FIG. 21(a)). The multiplying unit 214 executes the multiplication in accordance with the inputs from the multiplicand upper, lower selecting circuit 212 and the multiplier upper, lower selecting circuit 213 so as to respectively accommodate the sum output and the carry output in the latch 215 and the latch 216.

(4) Step 3

The mantissa adder 220 adds the sum output (the most significant bit and the least significant bit are 0) of the multiplying unit 214 retained in the latch 215, the carry output (the most significant bit and the least significant bit are 0) of the multiplying unit 214 retained in the latch 216 and output by the selector 218, and the output of the shifter 221 (upper 26 bits are 0) retained at the latch 225 and output by the selector 219. Overflow from the mantissa adder 220 is not caused at this time. The shifter 221 outputs the output of the mantissa adder 220 ($X_0, \ldots, X_{53}$), as is without shifting to be accommodated in the latch 225. The value accommodated in the latch 225 is accumulated as far as the first intermediate partial product. At the same time, the multiplicand upper, lower selecting circuit 212 reads and outputs the upper 27 bits of the multiplicand register mantissa portion 201f (the value AU shown in FIG. 21(a)), and the multiplier upper, lower selecting circuit 213 reads and outputs the lower 27 bits of the multiplier register mantissa portion 202f (the value BL shown in FIG. 21(a), the most significant bit is 0). The multiplying unit 214 executes the multiplication in accordance with the inputs from the multiplicand upper lower selecting circuit 212 and the multiplier upper, lower selecting circuit 213 so as to respectively accommodate the sum output and the carry output in the latch 215 and the latch 216.

(5) Step 4

The mantissa adder 220 adds the sum output (the most significant bit and the least significant bit are 0) of the multiplying unit 214 retained in the latch 215, the carry output (the most significant bit and the least significant bit are 0) of the multiplying unit 214 retained in the latch 216 and output by the selector 218, and the output of the shifter 221 retained at the latch 225 and output by the selector 219. The shifter 221 shifts the 55 bits data of $(Y_{-1}, Y_0, \ldots, Y_{53})$, which include the 54 bit output $(Y_0, \ldots, Y_{53})$, and the 1 bit overflow $(Y_{-1})$ from the mantissa adder 220, by 26 bits in the least significant bit direction (at this time, 0 is placed in the upper bit portion), and the result $(0, \ldots, 0, Y_{-1}, Y_0, \ldots, Y_{27})$ is accommodated in the latch 225. The value accommodated in the latch 225 is accumulated so far as the second intermediate partial product. At the same time, the multiplicand upper, lower selecting circuit 212 reads and outputs the upper 27 bits of the multiplicand register mantissa portion 201$f$ (the value AU shown in FIG. 21($a$)), and the multiplier upper, lower selecting circuit 213 reads and outputs the upper 27 bits of the multiplier register mantissa portion 202$f$ (the value BU shown in FIG. 21($a$)). The multiplying unit 214 executes the multiplication in accordance with the inputs from the multiplicand upper, lower selecting circuit 212 and the multiplier upper, lower selecting circuit 213 so as to respectively accommodate the sum output and the carry output in the latch 215 and the latch 216.

(6) Step 5

The mantissa adder 220 adds the sum output (the least significant bit is 0) of the multiplying unit 214 retained in the latch 215, the carry output (the least significant bit is 0) of the multiplying unit 214 retained in the latch 216 by the selector 218, and the output of the shifter 221 (the upper 25 bits are 0) retained at the latch 225 and output by the selector 219. According to the presence or absence of overflow $(Z_{-1})$ from the mantissa adder 220 at this time, one of the following is executed.

* When overflow exists from the mantissa adder 220, namely, when of the mantissa portion is 2 or more The shifter 221 shifts by 1 bit (at this time, 1 is filled in the most significant bit), in the least significant bit direction, the output from the mantissa adder 220 for normalization. The exponent adder 204 adds the value of the latch 210 output by the selector 205, and the constant 1 generated the normalized correction value generating circuit 211 and output the selector 206 so as to accommodate the result into the produce register exponent portion 226$e$.

* When overflow form the mantissa adder 220 does not exit. namely, when the produce of the mantissa portion is 1 or more and less than 2

The shifter 221 outputs as is (without shifting) the output from the mantissa adder 220 since normalization is not necessary. The exponent adder 204 outputs the value of latch 210 as is so as to be accommodated into the product register exponent portion 226$e$.

The value of the latch 208 is not allowed to change. The exception detecting circuit 209 detects in accordance with the following logic formula the overflow (OVF) and the underflow (UNF) of the product at the double precision based on the output (which is assumed to be $E_0, \ldots, E_{10}$) of the exponent adder 204 and the value of the latch 8 (which is assumed to be Ce):

$$OVF = Ce.E_0 + E_0.E_1 \ldots E_{10}$$

$$UNF = Ce.E_0 + {}^-(E_0 + E_1 + \ldots + E_{10})$$

wherein $^-X$ shows the inversion of X.

The sticky bit generating circuit 222 takes the logical OR of the 52 bits made up of 26 bits of the shift overflow $(W_{28}, \ldots, W_{52}, 0)$ from the least significant bit in the shifter 221 at the step 2 and the 26 bits of the shift overflow $(Y_{28}, \ldots, Y_{53})$ from the least significant bit in the shifter 221 at the step 4. The sticky bit output (S) is 1 if a bit having a value of 1 exists in the 52 bits, and the sticky bit output (S) is 0 if all 52 bits are 0. The mantissa correction control circuit 224 controls the mantissa correcting circuit 223 in accordance with the 3rd bit through the least significant bit $(Z_{51}, Z_{52}, Z_{53})$ from the least significant bit of the output of the mantissa adder 220, the sticky bit (S) output by the sticky bit generating circuit 222 and the overflow (Cout=$Z_{-1}$) in the mantissa adder 220. The mantissa correcting circuit 223 inverts the 2nd bit ($R_{52}$) from the least significant of the output of the shifter 221 if the column of the correction signal of FIG. 17($b$) is 1. If the column is 0, the circuit 223 outputs the shifter 221 output as is (without being inverted). At the same time, if the column of the round adding signal of FIG. 17($b$) is 0, 53 bits of the output of the mantissa correcting circuit 223 except for the least significant bit are accommodated in the product register mantissa portion 226$f$ so as to complete the processing. If the column of the round addition signal is 1, the output of the mantissa correction circuit 223 is accommodated in the latch 225, and thereafter, the following insertion step is executed.

(6) Insertion Step (carried out only when the column of the round addition signal is 1)

The mantissa adder 220 adds the round addition value C generated by the round addition value generating circuit 217 and output by the selector 218 and the value retained the latch 225 and output by the selector 219. At this time, overflow from the mantissa adder 220 is not caused. The shifter 221 outputs the output of the mantissa adder 220 as is (without being shifted), and the mantissa correction circuit 223 also outputs the output of shifter 22 as is (without being bit inverted). Thereafter, the 53 bits of the output of the mantissa correcting circuit 223 except for the least significant bit are accommodated in the product register mantissa portion 226$f$ so as to complete the processing.

According to the present embodiment as described hereinabove, the subtraction of the bias value is realized by the addition, with the carry input Cin being made 1, in the exponent adder 204 being made 1, and the inversion of the most significant bit by the most significant bit correcting circuit 7, and the biased exponent portion of the product of the floating point format applied as in the multiplicand and the multiplier may be obtained with the single processing step, so that a step of correcting the bias of the exponent portion is not required. Also, the most significant bit correcting circuit 207 may be realized briefly by the exclusive OR gate of 1 bit, and other special hardwares for bias correction are not required, thus reducing the hardware.

According to the present embodiment, in the mantissa portion, the addition of the round addition values or the addition for accumulating the partial products and the addition of the sum output and the carry output from the multiplying unit 214 are effected at the same time by the mantissa adder 220. After the normalization of the result by the shifter 221, the processing may be completed in most cases. Even when the correction in the mantissa correcting circuit 223 is necessary, the processing may be completed without an increase in the processing step number. Only when the addition of the round addition values by the mantissa adder 220 is again made necessary, the processing may be completed by the insertion of 1 step. The probability that the insertion of the 1 step will be necessary is as small as 2/32 (when it is assumed that the bit pattern of the mantissa is evenly distributed). As the result, in most cases (30/32), the processing step number necessary in the single precision multiplication becomes as small as 2, the processing step number necessary in the double precision multiplication becomes as small as 5. Since the addition of the sum and the carry, the addition of the round addition value or the addition for accumulating the partial products are effected by the single mantissa adder 220, the necessary hardwares are less than that of the conventional apparatus for multiplying floating point data.

Although the present embodiment provides the example for realizing the rounding to nearest even mode, other modes such as the directed rounding toward plus mode, the directed rounding toward minus mode and the directed rounding toward zero mode may also easily be coped with by a change in the control of the round addition value generating circuit 217 and the mantissa correction control circuit 224. The rounding operation of these modes is similar to that of the first embodiment, and the inversion of the bit of the mantissa computation result and the control of the insertion of the processing step are effected in accordance with the control relation charts of FIG. 4, FIG. 5 and FIG. 6.

In the present embodiment, although a case where the multiplicand and the multiplier both are the single precision format and the product is rounded to single precision, and a case where the multiplicand and the multiplier both are the double precision format and the product is rounded to double precision have been described, a product rounded into a given precision may be obtained by corresponding generation logic of the sticky bit in the sticky bit generating circuit 222 into all the effective bits lower than the round bit in any combination of the precision of multiplicand and multiplier or any round precision of the product.

In the present embodiment, in accordance with the single precision or the double precision, the mantissa correction control circuit 224 inspects the 23rd bit through the 25th bit from the most significant bit in the output of the mantissa adder 220 or the 3rd bit through the least significant bit from the least significant bit and the 1 bit overflow from the most significant bit at the time of addition in the mantissa adder 220 and the 1 bit sticky bit output by the sticky bit generating circuit 222, and the mantissa correction circuit 223 inverts the 24th bit or the 53rd bit from the most significant bit in the output of the shifter 221. However, the inspected bit and the inverted bit may be increased in the most significant bit direction. The probability that the insertion of 1 step will be necessary is halved for each one bit increase of the inspected bit and the inverted bit, thus improving the computation speed.

Figure 22:
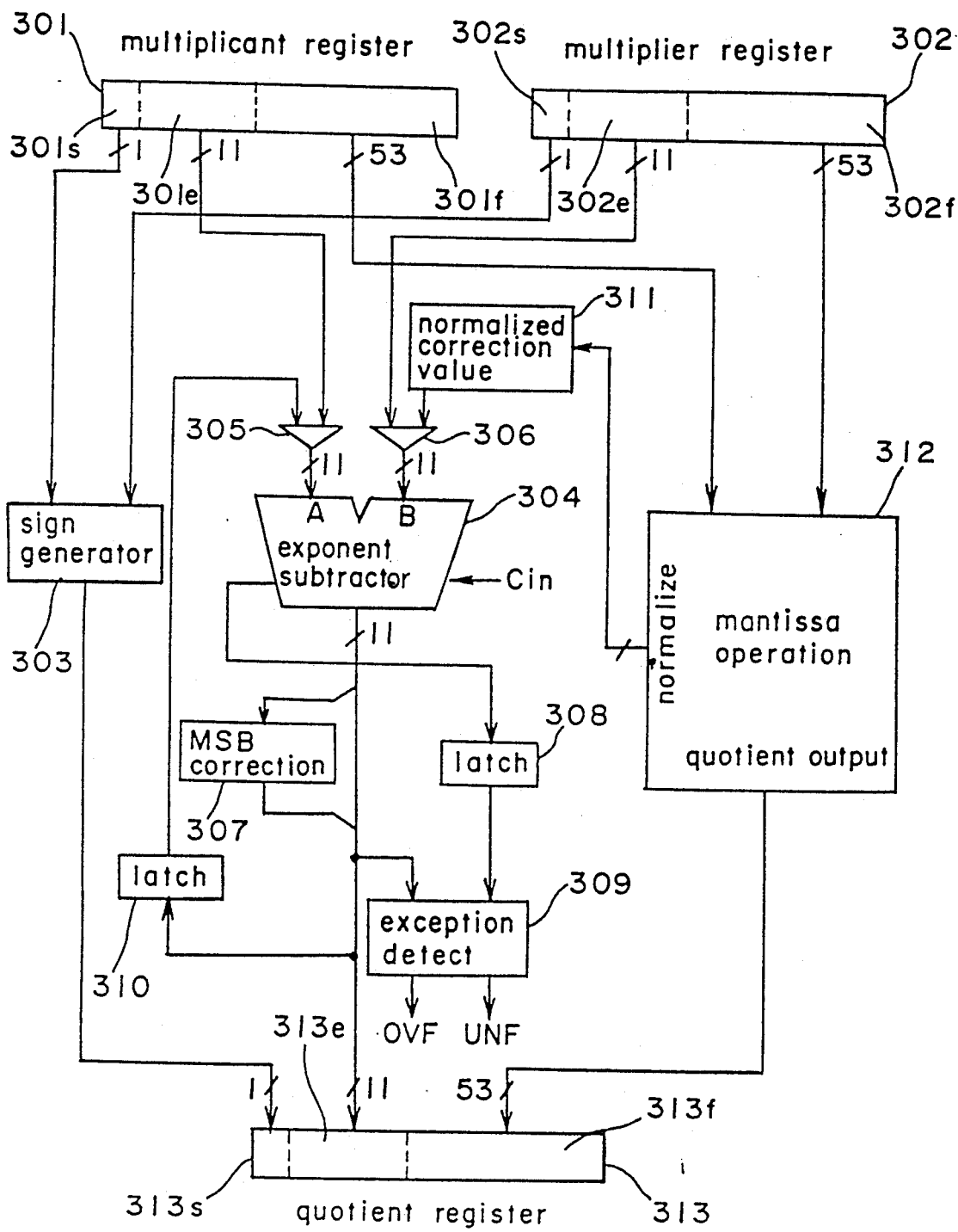
FIG. 22 is a block diagram of the floating point data division apparatus in a fourth embodiment of the present invention.

FIG. 22 shows a block diagram of a floating point data division apparatus in a fourth embodiment of the present invention.

In FIG. 22, reference numeral 301 denotes a dividend register for retaining the dividend which consists of a 1 bit sign portion 301s, an 11 bit exponent portion 301e, and a 53 bit mantissa portion 301f. Reference numeral 302 denotes a divisor register for retaining the divisor which consists of a 1 bit sign portion 302s, an 11 bit exponent portion 302e and a 53 bit mantissa portion 302. The most significant bit of the dividend register mantissa portion 301f and the divisor mantissa portion 302f is a so-called "hidden bit" having the weight of $2^0$ and being 1 at the time of a normalized number, and the dividend register 301 and the divisor register 302 are both in conformity with the double precision format except for this bit. Reference numeral 303 denotes a sign generating circuit for reading the signs of the dividend and the divisor from the dividend register sign portion 301s and the divisor register sign portion 302s so as to generate the sign of the quotient. Reference numeral 304 denotes an exponent subtractor of 11 bits for reading the exponents of the dividend and the divisor from the dividend register exponent portion 301e and the divisor register exponent portion 302e so as to compute the exponent of the quotient by effecting addition of the A input the 1's complement of the B input, with Cin being the carry input of 1 bit. Reference numeral 305 and reference numeral 306 respectively denote selectors of 11 bits for selecting the two inputs A and B of the exponent subtractor 304. Reference numeral 307 denotes a most significant bit correcting circuit for inverting the most significant bit of the output of the exponent subtractor 304. Reference numeral 308 denotes a latch of 1 bit for retaining the overflow from the most significant bit at the time of addition in the subtractor adder 304. Reference numeral 309 denotes an exception detecting circuit for detecting the overflow and the underflow of the quotient with respect to the computation precision detected from the value of the output of the exponent subtractor 304 and the value of the latch 308. Reference numeral 310 denotes a latch of 11 bits for retaining the output of the exponent subtractor 304 inverted in the most significant bit by the most significant bit correcting circuit 307 so as to input the retained bits into the exponent subtractor 304 again via the selector 305. Reference numeral 311 denotes a normalized correction value generating circuit for generating a constant for reducing the exponent by 1 through a normalization of the 1 bit shift of the mantissa of the quotient. Reference numeral 312 is a well known mantissa computing unit for reading the dividend register mantissa portion 301f and the divisor register mantissa portion 302f so as to obtain the mantissa of the quotient and so as to generate a signal denoting whether or not normalization is required. Reference numeral 313 denotes a quotient register for retaining the quotient which consists of a 1 bit sign portion 313s, an 11 bit exponent portion 313e and a 53 bit mantissa portion 313f. The most significant bit of the quotient register mantissa portion 313f is a so-called "hidden bit" having the weight of $2^0$ and is 1 at the time of a normalized number, and the quotient register 313 except for this bit is in conformity with the double precision format.

Figure 23:
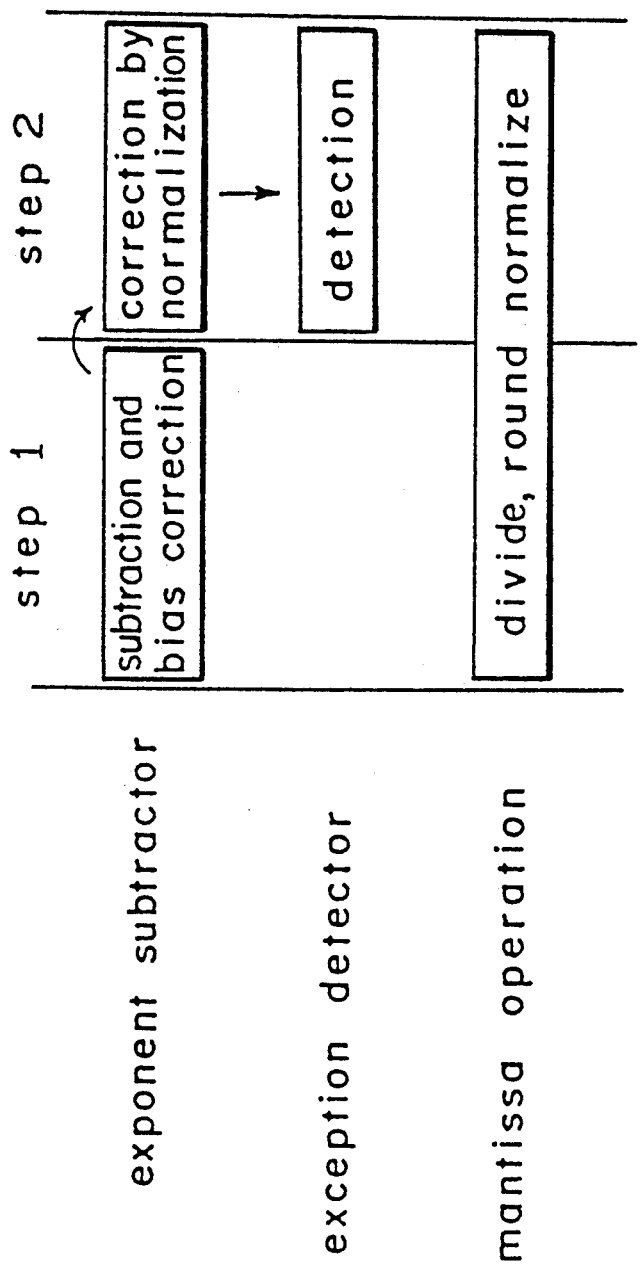
FIG. 23 is an operation flow chart of the division operation in the third embodiment.
Figure 24:
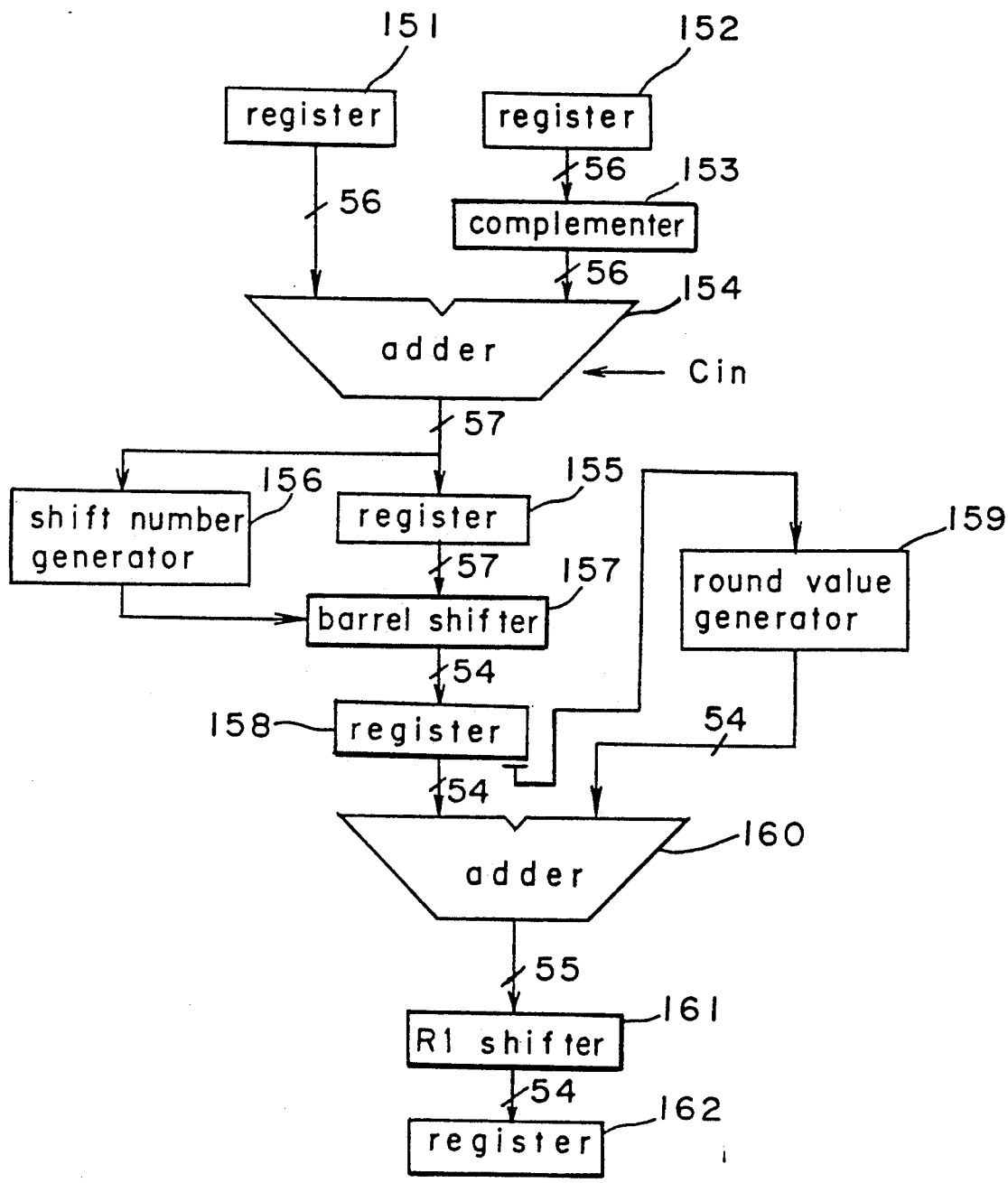
FIG. 24 is a block diagram of the conventional floating point data addition, subtraction apparatus.
Figure 25:
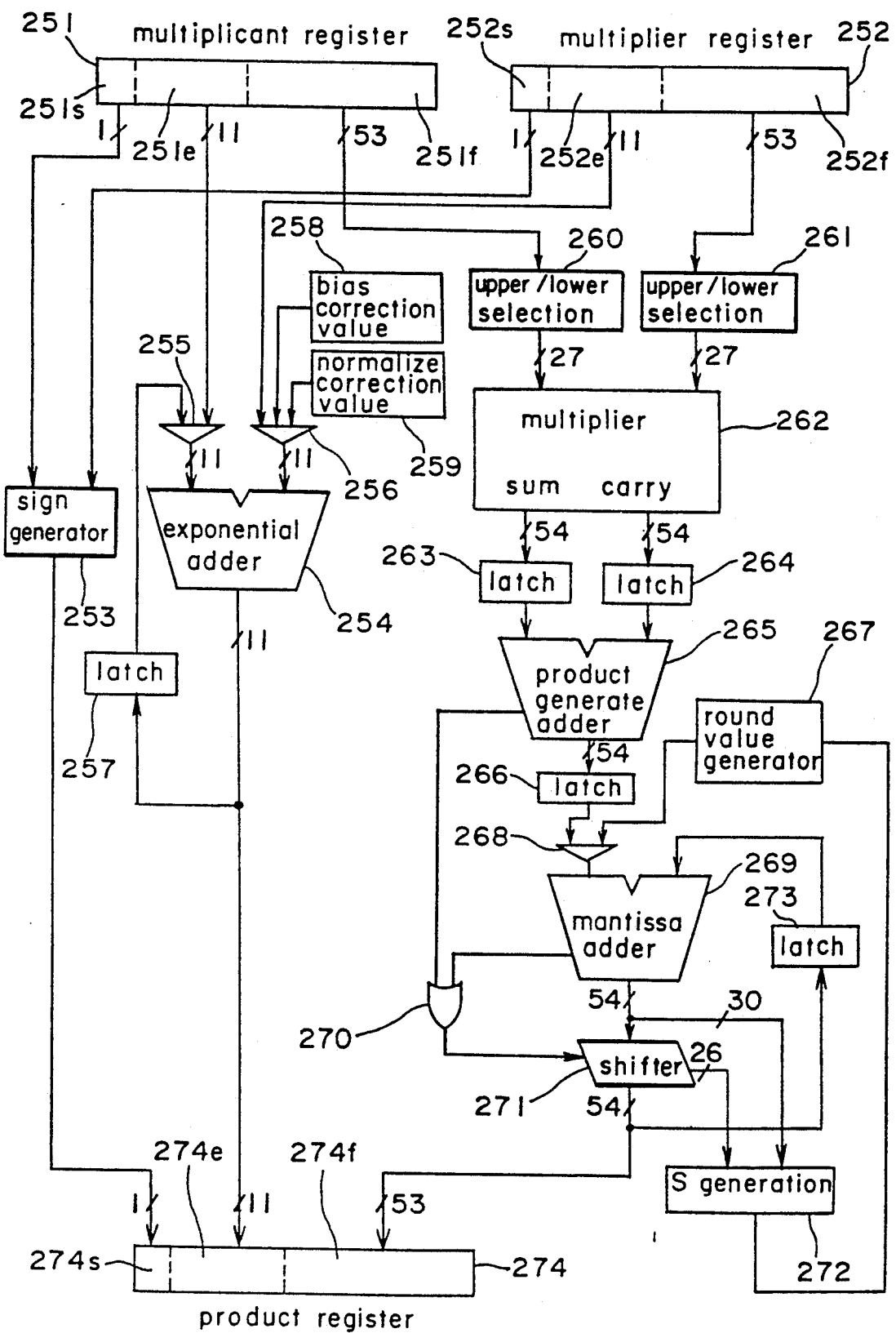
FIG. 25 is a block diagram of the conventional floating point data multiplying apparatus.
Figure 26:
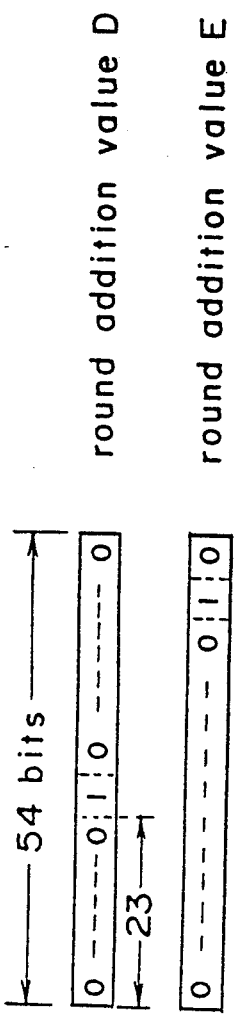
FIG. 26 is a view illustrating the operation of round addition value generating circuit 267 in the conventional multiplying apparatus.
Figure 27:
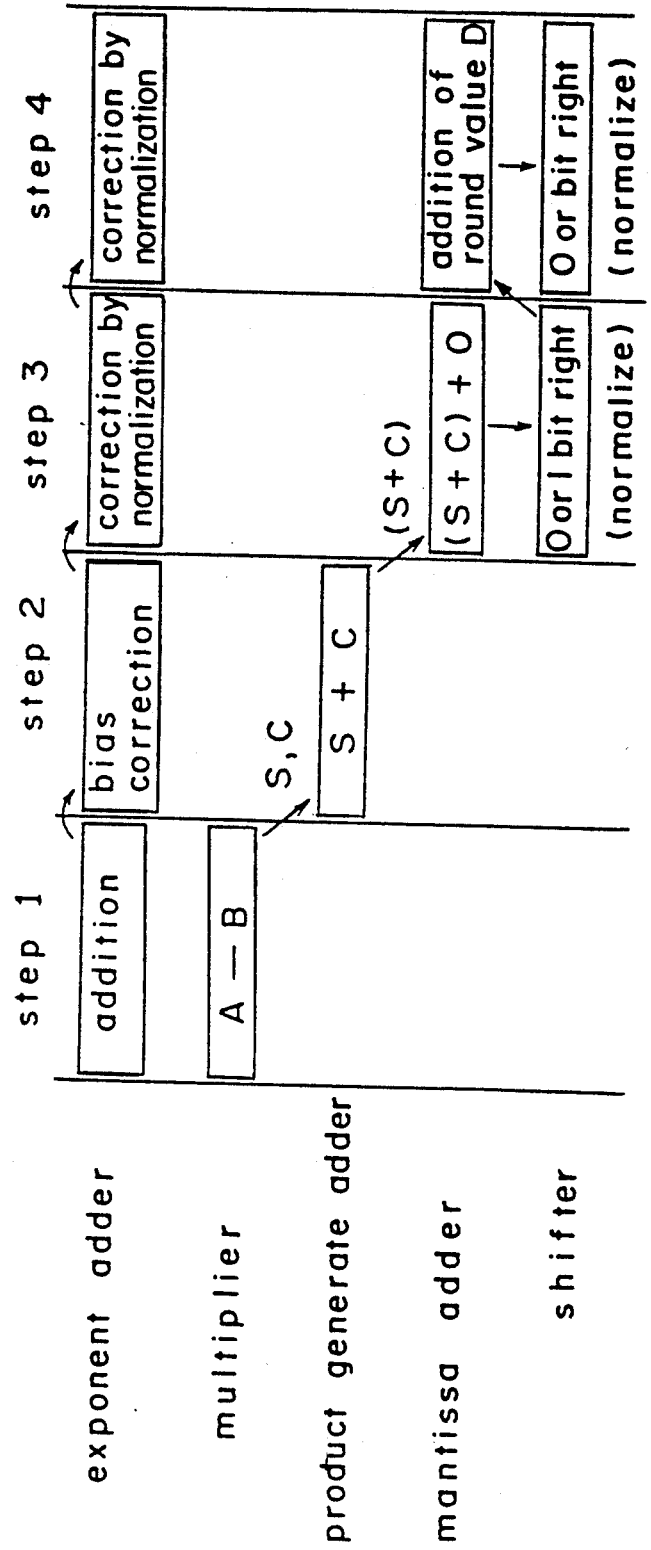
FIG. 27 is an operation flow chart of the single precision multiplication in the conventional multiplying apparatus.
Figure 28:
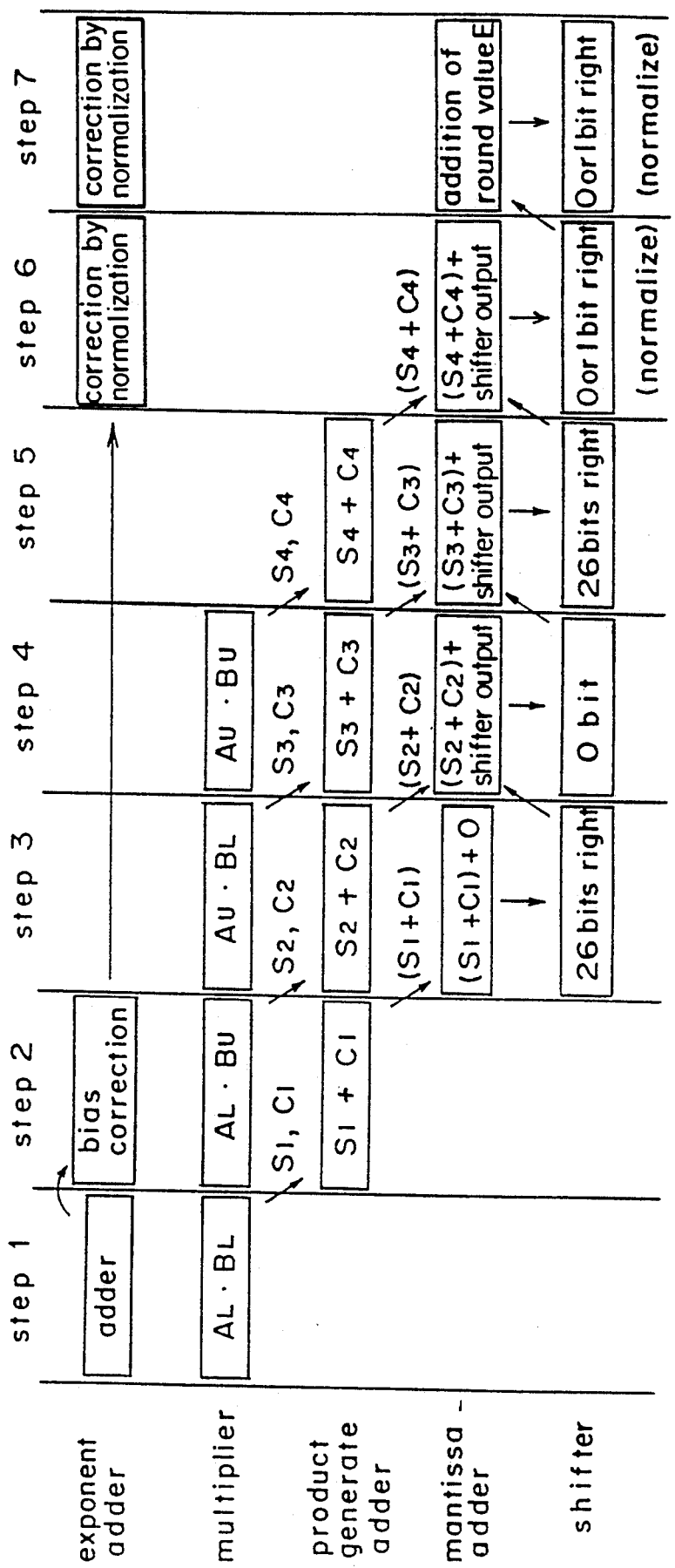
FIG. 28 is an operation flow chart of the double precision multiplication in the conventional multiplying apparatus.

The operation of the floating point data division apparatus in the present embodiment will be described hereinafter with reference to the operation flow chart shown in FIG. 23. FIG. 23 shows the operations for each of the processing steps of the exponent subtractor 304, the exception detecting circuit 309, and the mantissa computing unit 312.

(1) Before processing Step Start

When the dividend and the divisor are the single precision format, they are expanded at the double precision format and are respectively accommodated in the dividend register 301 and the divisor register 302. When the dividend and the divisor are the double precision format, they are accommodated as is into the dividend register 301 and the divisor register 302. In any case, the dividend register exponent portion 301e and the divisor register exponent portion 302e are both converted into the biased expression of the double precision (real exponent value = value of exponent portion $- 1023_{(10)}$).

(2) Step 1

The exponent of the dividend retained in the dividend register exponent portion 301e is input into the A input of the exponent subtractor 304 by the selector 305, and the exponent of the divisor retained in the divisor register exponent 302e is input into the B input of the exponent subtractor 304 by the selector 306. The addition of A+B+Cin is effected in the exponent subtractor 304 with the carry input Cin being 0 ($-$B is 1's complement of B). At Cin=0, this addition is equivalent to A$-$B$-$1). The most significant bit of the addition result is inverted by the most significant bit correcting circuit 307. The addition result with the most significant bit being inverted is accommodated in the latch 310. The fact that the value to be retained in the latch 310 is the exponent of the quotient correctly biased can be proved as follows.

(Proof start)

In ANSI/IEEE Standard for Binary Floating-Point Arithmetic P754, the bias value of the double precision is assumed as follows ($-$X is the inversion of X):

$$bias = 011\ 1111\ 1111_{(2)}$$

It may be transformed $$\begin{aligned} ed &= (e1 - bias) - (e2 - bias) + bias \\ &= e1 - e2 + bias \\ &= e1 + \overline{e2} + 1 + bias \\ &= (e1 + \overline{e2}) + (bias + 1) \\ &= (e1 + \overline{e2}) + 100\ 0000\ 0000_{(2)} \end{aligned}$$

wherein
 e1: biased exponent portion of the dividend (11 bits)
 e2: biased exponent portion of divisor (11 bits)
 em: biased exponent portion of quotient (11 bits)
The addition of $100\ 000\ 0000_{(2)}$ of the third term can be realized with the inversion of the most significant bit.

(Proof end)

The latch 308 retains the overflow in the exponent subtractor 304 at this time. The mantissa computing unit 312 reads the mantissas of the dividend and the divisor from the dividend register mantissa portion 301f and the divisor register mantissa portion 302f so as to start the division computation. At the same time, in the sign generating circuit 203, the signs of the dividend and the divisor are read from the divided register sign portion 301s and the divisor register sign portion 302s so as to take the exclusive OR of both and generate the sign of the quotient to be accommodated in the quotient register sign portion 313s.

(3) Step 2

The mantissa computing unit 312 generates the mantissa portion of the quotient and effects the rounding. When the mantissa portion of the generated quotient is a denormalized number, namely, the value is 0.5 or more and less than 1, the mantissa computing unit 312 shifts the mantissa portion of the quotient generated by 1 bit in the most significant bit direction so as to normalize it, and the exponent subtractor 304 subtracts the constant 1 output by the normalized correction value generating circuit 311 from the value of the latch 310 by the selector 305 and the selector 306. When the mantissa portion of the quotient generated is a normalized number, namely, when the value is 1 or more and less than 2, the mantissa computing unit 312 outputs the mantissa portion of the quotient generated as is, and also, the exponent subtractor 304 outputs the value of the latch 310 as is by via selector 305. In any case, the mantissa computing unit 312 accommodates the result with the lower 29 bits of the 53 bits of the result (except for the least significant bit) being masked in 0 when the round precision is the single precision, and the result of the 53 bits (except for the least significant bit) when the round precision is the double precision, in the quotient register mantissa portion 313f. The exponent subtractor 304 accommodates the result to the quotient exponent portion 313e. The value of the latch 308 is not allowed to change. The exception detecting circuit 309 detects in accordance with the following logic the overflow (OVF) and the underflow (UNF) of the quotient based on the output (which is assumed to be E) of the exponent adder 304 when the round precision is the single precision.

if E $\geq 128_{(10)}$ then OVF=1 else OVF=0 if E $\leq 996_{(10)}$ then UNF=1 else UNF=0

When the round precision is the double precision, in accordance with the following logic formula, the overflow (OVF) and the underflow (UNF) of the quotient are detected based on the output (which is assumed to be $E_0, \ldots, E_{10}$) of the exponent subtractor 304 and the value of the latch 308 (which is assumed to be Ce).

$$OVF = Ce \cdot {}^-D_0 + E_0 \cdot E_1 \cdot \ldots \cdot E_{10}$$

$$UNF = Ce \cdot E_0 + {}^-(E_0 + E_1 + \ldots + E_{10})$$

wherein $-$X shows the inversion of X.

According to the present embodiment as described hereinabove, the addition of the bias value is realized with the subtraction operation of (exponent of dividend) $-$ (exponent of divisor) $-$ 1 using the exponent subtractor 304 with the carry input Cin being made 0, and the inversion of the most significant bit using the most significant bit correcting circuit 307, and the biased exponent portion of the quotient of the floating point format applied as in the dividend and the divisor may be obtained with the single processing step, so that a step of correcting the bias of the exponent portion is not required. Also, the most significant bit correcting circuit 307 may be realized briefly by the exclusive OR gate of 1 bit, and other special hardwares for bias correction are not required, thus reducing the hardwares.

As described hereinabove, in accordance with the present invention, the processing step number necessary to obtain the mantissa portion of the sum, difference or product of the floating point data rounded with the specified round mode and round precision may be reduced. Also, as compared with the conventional floating point data computing apparatus, less hardware is required, thus increasing practical usage.

According to the present invention, the processing step number necessary to obtain the exponent portion of the product and quotient of the bias corrected floating point data may be reduced. Also, as compared with the conventional computing apparatus of the floating point data, less hardware is required, thus increasing practical usage.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

We claim:

1. A data processing apparatus for subjecting two floating point data to an arithmetic computation according to a predetermined rounding precision and a predetermined rounding mode, the two floating point data respectively including first and second mantissas and first and second exponents, the arithmetic computation including either real mantissa addition in which the addition of the two floating point data of the same sign or the subtraction of the two floating point data of different signs is effected or real mantissa subtraction in which the subtraction of the two floating data of the same sign or the addition of the two floating data of different signs is effected, said apparatus comprising:

a round addition value generating means for generating a round addition value determined uniformly according to whether real mantissa addition or real mantissa subtraction is to be carried out and according the rounding precision, the rounding mode and a sign of a computation result;

a mantissa processing means for (a) simultaneously effecting first and second addition operations to obtain a computation result when the arithmetic computation includes the real mantissa addition, the first addition operation for obtaining a mantissa sum of the first and second mantissas aligned to a same one of the first and second exponents, the second addition operation for summing the mantissa sum obtained in the first addition operation and the round addition value generated by said round addition value generating means, and (b) simultaneously effecting a first subtraction operation and a third addition operation when the arithmetic computation includes the real mantissa subtraction, the first subtraction operation for obtaining a mantissa difference between the first and second mantissas aligned to the same one of the first and second exponents, the third addition operation for summing the mantissa difference obtained the first subtraction operation and the round addition value generated by said round addition value generating means, wherein the computation result obtained by said mantissa processing means is an already normalized computation result or a denormalized number;

a normalizing means for bit shifting the computation result obtained by said mantissa processing means by 1 bit to obtain a normalized computation result when the computation result obtained in said mantissa processing means is a denormalized number;

a computation result inspecting means for inspecting a plurality of bits including the least significant bit, determined according to whether the arithmetic computation includes the real mantissa addition or the real mantissa subtraction and according to the rounding precision, from among the bits of the normalized computation result obtained by said mantissa processing means and said normalizing means so as to judge whether the normalized computation result down to the least significant bit conforms with respect to the real mantissa addition or the real mantissa subtraction rounded according to the rounding precision, and whether a carry into the upper bit position from the inspected bits conforms and only the inspected bits do not conform, and whether the carry into the upper bit position from the inspected bits and the bits in the upper bit position from the inspected bits also do not conform; and, a correction/readdition means for effecting, based on a judgment carried out in said inspecting means that a nonconformity exit, a correction of at least one portion of the inspected bits of the normalized computation result to complete the data processing, or a readdition of the round addition value with the normalized computation result to complete data processing.

2. A data processing apparatus as recited in claim 1, wherein processing said mantissa processing means and said normalizing means and said inspecting means re effected in a single processing cycle of the data processing apparatus, and wherein the correction of said correction readdition means is effected in the single processing cycle when the carry into the upper bit portion conforms and only the inspected bits do not conform, and wherein the readdition of said correction/readdition means is effected through insertion of a new processing cycle of the data processing apparatus when the carry into the upper bit portion does not conform.

3. A data processing apparatus as recited in claim 1, wherein, for the real mantissa addition, the round addition value is data in which a bit having a weight of $2^{-24}$ has a value 1 and the remaining bits have a value 0 when the rounding mode is a rounding to nearest even mode and the rounding precision is single precision which has a fraction of up to twenty-three binary digits, when the sign of the computation result is positive in a directed rounding toward plus mode in the single precision or when the sign of the computation result is negative in the directed rounding toward minus mode in the single precision, and is data in which the bit having a weight of $2^{-53}$ has a value 1 and the remaining bits have a value 0 when the round mode is a rounding to nearest even mode and the rounding precision is double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0;

wherein, for the real mantissa subtraction, the round addition value is data in which a bit having a weight of $2^{-25}$ has a value 1 and the remaining bits have a value 0 when the rounding mode is a rounding to nearest even mode and the rounding precision is single precision which has a fraction of up to twenty-three binary digits, when the sign of the computation result is positive in a directed rounding toward plus mode in the single precision or when the sign of the computation result is negative in a directed rounding toward minus mode in the single precision, and is data in which a bit having a weight of $2^{-54}$ has a value 1 and the remaining bits have a value 0 when the rounding mode is a rounding to nearest even mode and the rounding precision is double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

4. A data processing apparatus as recited in claim 2, wherein, for the real mantissa addition, the round addition value is data in which a bit having a weight of $2^{-22}$ has a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which a bit having a weight of $2^{-52}$ has a value 1 and the remaining bits have a value 0 when the rounding ode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0; and wherein, for the real mantissa subtraction, the round addition value is data in which a bit having a weight of $2^{-24}$ has a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which a bit having a weight of $2^{-53}$ has a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

5. A data processing apparatus as recited in claim 2, wherein, for the real mantissa addition, the round addition value is data in which bits having a weight of $2^{-24}$ and smaller have a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which bits having a weight of $2^{-53}$ and smaller have a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0; and wherein, for the real mantissa subtraction, the round addition value is data in which bits having a weight of $2^{-25}$ and smaller have a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which bits having a weight of $2^{-54}$ and smaller have a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

6. A data processing apparatus as recited in claim 2, wherein the inspected bits for the real mantissa addition are three bits of the normalized computation result having weights of $2^{-22}$, $2^{-23}$ and $2^{-24}$ and one bit which is the logical OR of bits having a smaller weight when the rounding precision is single precision which has a fraction of up to twenty-three binary digits, wherein the inspected bits for the real mantissa addition are three bits of the normalized computation result having weights of $2^{-51}$, $2^{-52}$ and $2^{-53}$ and one bit which is the logical OR of bits having a smaller weight when the rounding precision is double precision which has a fraction of up to fifty-second binary digits, wherein the inspected bits for the real mantissa subtraction are three bits of the normalized computation result having weights of $2^{-23}$, $2^{024}$ and $2^{-25}$ and one bit which is the logical OR of bits having a smaller weight when the rounding precision is the single precision, wherein the inspected bits for the real mantissa subtraction are three bits of the normalized computation result having weights of $2^{-52}$, $2^{-53}$ and $2^{-54}$ and one bit which is the logical OR of bits having a smaller weight when the rounding precision is the double precision.

7. A data processing apparatus as recited in claim 2, wherein corrected bits of the correction effect in said correction/readdition means are a bit having a weight of $2^{-23}$ or bits having weights of $2^{-22}$ and $2^{-23}$ when the rounding precision is single precision which has a fraction of twenty-three binary digits, and a bit having a weight of $2^{-52}$ or bits having weights of $2^{-51}$ and $2^{-52}$ when the rounding precision is double precision which has a fraction of fifty-two binary digits.

8. A data processing apparatus for subjecting two floating point data to a multiplication computation, the two floating point data respectively constituting a multiplicand and a multiplier and respectively including first and second mantissas and first and second exponents, said apparatus comprising:

an exponent processing means for effecting an operation to obtain a value which is larger by 1 than a value of the addition of the first exponent of the multiplicand and the second exponent portion of the multiplier;

a most significant bit correcting means for inverting the most significant bit of the computation result obtained in said exponent processing means to obtain by a single data processing step an exponent portion of the product of the multiplicand and the multiplier.

9. A data processing apparatus for subjecting two floating point data to a multiplication computation, the two floating point data respectively constituting a multiplicand and a multiplier and respectively including first and second mantissas and first and second exponents, said apparatus comprising:

an exponent processing means for obtaining a product exponent portion by adding 1 to a sum of the respective first and second exponents of the multiplicand and the multiplier of the floating point data having a deflected exponent portion to obtain a product exponent portion;

a most significant bit correcting means for inverting the most significant bit of the product exponent portion obtained by said exponent processing means;

a normalized exponent correcting means for normalizing a product of the mantissas of the multiplicand and the multiplier with respect the product exponent portion having the most significant bit inverted by said most significant bit correcting means; and, an exception detecting means for detecting an overflow and an underflow of the product according to a carry output denoting a carry from the most significant bit of said exponent adding means and an output from said normalized exponent correcting means;

wherein the addition of the two floating point data and a deflection correction are effected at the same time to obtain the exponent portion of the product of the two floating point data deflected as in the multiplicand and the multiplier, and wherein the overflow and the underflow of the product are detected from a predetermined computation precision after normalization of the mantissa portion.

10. A data processing apparatus for subjecting two floating point data to a multiplication computation, the two floating point data respectively constituting a multiplicand and a multiplier and respectively including first and second mantissas and first and second exponents, said apparatus comprising:

a mantissa processing means, in which bits widths of two inputs are together equal to lengths of the first and second mantissas of the multiplicand and the multiplier or are greater than the lengths of the first and second mantissas, for receiving selected bits of the first and second mantissas and outputting a sum and a carry having bit widths which are at least twice that of the inputs;

a round addition value generating means for generating a round addition value uniformly determined according to a rounding precision, a rounding mode and signs of the two floating point data;

a mantissa adding means for simultaneously effecting an addition of the sum and the carry output by said mantissa multiplying means and round addition value generated by said round addition value generating means to obtain computation result, the computation resulting being one of a normalized computation result or a denormalized number;

a normalizing means for bit shifting the computation result obtained by the mantissa adding means to normalize the computation result when the computation result is a denormalized number;

a computation result inspecting means for inspecting a plurality of bits including the least significant bit, determined according to the rounding precision, from among the bits of the normalized computation result so as to judge whether the normalized computation result down to the least significant bit conforms with respect to the product of the first and second mantissas rounded according to the rounding precision, and whether a carry into the upper bit position from the inspected bits conforms and only the inspected bits do not conform, and whether the carry into the upper bit position from the inspected bits and the bits in the upper bit position from the inspected bits also do not conform; and, a round correcting means for correcting at least one portion of the inspected bits according to the judgment carried out by said computation result inspecting means, wherein processing is complete when the normalized computation result down to the least significant bit conforms with respect to the product of the first and second mantissas rounded according to the rounding precision, and wherein round correction of the at least one portion of the inspected bits is effected when the carry into the upper bit position from the inspected bits conforms and only the inspected bits to do no form to complete processing, and wherein addition of the round addition value is effected again when the carry into the upper bit position from the inspected bits and the bits in the upper bit position from the inspected bits also do not conform to complete processing.

11. A data processing apparatus as recited in claim 10, wherein processing of said mantissa processing means, said normalizing means and said inspecting means are effected in a single processing cycle of the data processing apparatus, and wherein the correction and readdition of said round correcting means are effected in a new data processing cycle of the data processing apparatus after completion of the single data processing cycle.

12. A data processing apparatus as recited in claim 11, wherein, for the real mantissa addition, the round addition value is data in which a bit having a weight of $2^{-24}$ has a value 1 and the remaining bits have a value 0, when the rounding mode is a rounding to nearest even mode and the rounding precision is single precision which has a fraction of up to twenty-three binary digits, when the sign of the computation result is positive in a directed rounding toward plus mode in the single precision or when the sign of the computation result is negative in the directed rounding toward minus mode in the single precision, and is data in which the bit having a weight of $2^{-53}$ has a value 1 and the remaining bits have a value 0 when the round mode is a rounding to nearest even mode and the rounding precision is double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

13. A data processing apparatus as recited in claim 10, wherein, for the real mantissa addition, the round addition value is data in which a bit having a weight of $2^{-23}$ has a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which a bit having a weight of $2^{-52}$ has a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

14. A data processing apparatus as recited in claim 10, wherein for the real mantissa addition, the round addition value is data in which bits having a weight of $2^{-24}$ and smaller have a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which bits having a weight of $2^{-53}$ and smaller have a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

15. A data processing apparatus as recited in claim 10, wherein the inspected bits by said inspecting means are 3 bits having a smaller weight when the rounding precision is single precision having a fraction up to twenty-three binary digits, and are 3 bits having weights of $2^{-51}$, $2^{-52}$ and $2^{-53}$ and 1 bit which is the logical OR of bits having a smaller weight when the rounding precision is double precision having a fraction up to fifty-two binary digits.

16. A data processing apparatus as recited in claim 11, wherein bits by said correcting means is a bit having a weight of $-23$ or bits weights of $2^{-22}$ and $2^{-23}$ when the rounding precision is single precision having a fraction up to twenty-three binary digits, and is a bit having a weight of $2^{-52}$ or bits having weights of $2^{-51}$ and $2^{-52}$ when the rounding precision is double precision having a fraction up to fifty-two binary digits.

17. A data processing apparatus for subjecting two floating point data to a multiplication computation, the two floating point data respectively constituting a multiplicand and a multiplier and respectively including first and second mantissas and first and second exponents, said apparatus comprising:

a multiplicand retaining means for retaining the first mantissas;

a multiplier retaining means for retaining the second mantissa;

a mantissa processing means, in which a bit width of at least one of two inputs is smaller that the bit lengths of the first and second mantissas of the multiplicand and the multiplier, for receiving selected bits of the first and second mantissas and outputting a sum and a carry having bit widths which are at least twice that of the inputs;

a partial multiplicand selecting means for selecting bits constituting a portion of the multiplicand retained in said multiplicand retaining means and outputting the selected bits to said mantissa multiplying means;

a partial multiplier selecting means for selecting bits constituting a portion of the multiplier retained in said multiplier retaining means and outputting the selected bits to said mantissa multiplying means;

a round addition value generating means for generating a round addition value uniformly determined according to a rounding precision, a rounding mode and signs of the two floating point data;

a mantissa adding means for simultaneously effecting an addition of the sum and the carry output by said mantissa multiplying means and round addition value generated by said round addition value generating means to generate a first partial product, and for simultaneously effecting an addition of the sum and the carry output by said mantissa multiplying means and a bit shifted partial product to generate a new partial product;

a shifting means for bit shifting, at a first or intermediate processing step, the first partial product in the least significant bit direction according to a number of bits determined in a position of the partial mantissa portions of the multiplicand and the multiplier, and for bit shifting, at a final processing step, when a computation result is a denormalized number;

a partial product retaining means for retaining as the input in the mantissa adding means of the next processing step the output of said shifting means at the first or intermediate processing step;

an operation result inspecting means for inspecting respective bits of a shift overflow in said shifting means in the first or intermediate processing step and a plurality of bits including the least significant bit, determined according to the rounding precision, of the output of said shifting means in the final processing step, so as to judge whether the shifting means output down to the least significant bit conforms with respect to the product of the first and second mantissas rounded according to the rounding precision, and whether a carry into the upper bit position from the inspected bits conforms and only the inspected bits do not conform, and whether the carry into the upper bit position from the inspected bits and the bits in the upper bit position from the inspected bits also do not conform; and, a round correcting means for correcting at least one portion of the bits inspected by said inspecting means with respect to the output of the shifting means, wherein said partial multiplicand selecting means and said partial multiplier selecting means select and output portions of the first and second mantissa portions of the respective multiplicand and the multiplier in order from lower and the combinations, wherein the addition of the sum to be obtained in order and the a carry output and the round addition value or the value retained by said partial product retaining means is obtained by the mantissa adding means, wherein the result is shifted by the shifting means and accommodated again in said partial product retaining means or normalized by the shifting means, wherein thereafter processing is complete when the normalized computation result down to the least significant bit mantissas rounded according to the rounding precision, and wherein round correction of the at least on portion of the inspected bits is effected when the carry into the upper bit position from the inspected bits conform and only the inspected bits do not conform to complete processing, and wherein addition of the round addition value is effected again when the carry into the upper bit position from the inspected bits and the bits in the upper bit position from the inspected bits also do not conform to complete processing.

18. A data processing apparatus as recited in claim 17, wherein the addition of the sum and the carry in said mantissa adding means of the final processing step and the value retained in the partial product retaining means, and the normalization in said shifting means and the inspection in said operation result inspecting means are effected at one first machine cycle, and wherein the correction of the inspected bits in the round correcting means is further effected within the first machine cycle when the carry into the upper bit portion from the inspected bits conforms and only the inspected bits does not conform, the wherein the addition of the round addition value in the mantissa addition means is effected through the insertion of a new machine cycle after the first machine cycle when the carry into the upper bit portion from the inspected bits does not conform.

19. A data processing apparatus as recited in claim 17, wherein, for the real mantissa addition, the round addition value is data in which a bit having a weight of $2^{-24}$ has a value 1 and the remaining bits have a value 0, when the rounding mode is a rounding to nearest even mode and the rounding precision is single precision which has a fraction of up to twenty-three binary digits, when the sign of the computation result is positive in a directed rounding toward plus mode in the single precision or when the sign of the computation result is negative in the directed rounding toward minus mode in the single precision, and is data in which the bit having a weight of $2^{-53}$ has a value 1 and the remaining bits have a value 0 when the round mode is a rounding to nearest even mode and the rounding precision is double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

20. A data processing apparatus as recited in claim 17, wherein, for the real mantissa addition, the round addition value is data in which a bit having a weight of $2^{-23}$ has a value 1 and the remaining bits have a value 0 when the rounding mode is in single precision which as a fraction of up to twenty-three binary digits, when the sign of the computation result is positive in a directed rounding toward plus mode in the single precision or when the sign of the computation result is negative in a directed rounded toward minus mode in the single precision, and is data in which a bit having a weight of $2^{-52}$ has a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

21. A data processing apparatus as recited in claim 17, wherein, for the real mantissa addition, the round addition value is data in which bits having a weight of $2^{-24}$ and smaller have a value 1 and the remaining bits have a value 0 when the rounding mode is in single precision which has a fraction of up to twenty-three binary digits, when the sign of the computation result is positive in a directed rounding toward plus mode in the single precision or when the sign of the computation result is negative in a directed rounding toward minus mode in the single precision, and is data in which bits having a weight of $2^{-53}$ and smaller have a value 1 and the remaining bits have a value 0 when the rounding mode is in double precision which has a fraction of up to fifty-two binary digits, when the sign of the computation result is positive in a directed rounding toward plus mode in the double precision or when the sign of the computation result is negative in a directed rounding toward minus mode in the double precision, and is otherwise data in which all bits have a value 0.

22. A data processing apparatus as recited in claim 17, wherein the inspected bits by said inspecting means are 3 bits having weights of $2^{-22}$, $2^{-23}$ and $2^{-24}$ and 1 bit which is the logical OR of bits having a smaller weight when the rounding precision is single precision having a fraction up to twenty-three binary digits, and are 3 bits having weights of $2^{-51}$, $2^{-52}$ and $2^{-53}$ and 1 bit which is the logical OR of bits having a smaller weight when the rounding precision is double precision having a fraction up to fifty-two binary digits.

23. A data processing apparatus as recited in claim 17, wherein bits by said correcting means is a bit having a weight of $2^{-23}$ or bits having weights of $2^{-22}$ and $2^{-23}$ when the rounding precision is single precision having a fraction up to twenty-three binary digits, and is a bit having a weight of $2^{-52}$ or bits having weights of $2^{-51}$ and $2^{-52}$ when the rounding precision is double precision having a fraction up to fifty-two binary digits.

24. A data processing apparatus for subjecting two floating point data to a division computation, the two floating point data respectively constituting a divisor and a dividend and respectively including first and second mantissas and first and second exponents, said apparatus comprising:
an exponent subtracting means for effecting an operation to obtain a value which is smaller by 1 than a value of the subtraction of the biased exponent of the divisor from the biased exponent of the dividend; and,
a most significant bit correcting means for inverting the most significant bit of the computation result obtained in said exponent subtraction means;
wherein the subtraction of the two floating point data exponent value and the correction of the most significant bit are effected at the same time to obtain an exponent portion of the quotient of the two floating data biased in the divided and the divisor.

25. A data processing apparatus for subjecting two floating point data to a division computation, the two floating point data respectively constituting a divisor and a dividend and respectively including first and second mantissas and first and second exponents, said apparatus comprising:

an exponent subtracting means for effecting an operation to obtain a value which is smaller by 1 than a value of the subtraction of the biased exponent of the divisor from the biased exponent of the dividend; and, a most significant bit correcting means for inverting the most significant bit of the computation result obtained in said exponent subtraction means;

a normalized exponent correcting means for normalizing a quotient of the mantissas of the divisor and the divided with respect the product exponent portion having the most significant bit inverted by said most significant bit correcting means;

an exception detecting means for detecting an overflow and an underflow of the quotient according to a carry output denoting a carry from the most significant bit of said exponent subtracting means and an output from said normalized exponent correcting means;

wherein the subtraction of the exponent value of the two floating point data and the correction of the most significant bit are effected at the same time to obtain the exponent portion of the quotient of the two floating point data biased as in the divisor and the dividend, and wherein the overflow and the underflow of the quotient are detected from a predetermined computation precision after normalized of the mantissa portion.

* * * * *